(12) United States Patent
Shinkai et al.

(10) Patent No.: US 8,059,167 B2
(45) Date of Patent: Nov. 15, 2011

(54) SHOOTING APPARATUS AND SHOOTING METHOD, AND PROGRAM

(75) Inventors: Mitsutoshi Shinkai, Kanagawa (JP); Yoshiaki Shibata, Kanagawa (JP)

(73) Assignee: Sony Corporation (JP)

( * ) Notice: Subject to any disclaimer, the term of this patent is extended or adjusted under 35 U.S.C. 154(b) by 498 days.

(21) Appl. No.: 12/229,551

(22) Filed: Aug. 25, 2008

(65) Prior Publication Data

US 2009/0060449 A1    Mar. 5, 2009

(30) Foreign Application Priority Data

Aug. 31, 2007  (JP) ................ P2007-225207

(51) Int. Cl.
*H04N 5/76* (2006.01)
(52) U.S. Cl. ............ 348/231.4; 348/46; 715/728
(58) Field of Classification Search ............ 348/231.4, 348/46; 375/240.26; 715/723–728
See application file for complete search history.

(56) References Cited

U.S. PATENT DOCUMENTS

| | | | |
|---|---|---|---|
| 6,600,874 B1 * | 7/2003 | Fujita et al. ............ | 386/249 |
| 7,483,061 B2 * | 1/2009 | Fredlund et al. ......... | 348/231.4 |
| 7,586,517 B2 * | 9/2009 | Iguchi et al. ............ | 348/207.1 |
| 7,587,136 B2 * | 9/2009 | Mino et al. ............. | 396/312 |
| 7,668,455 B2 * | 2/2010 | Ono et al. .............. | 396/312 |
| 2004/0244047 A1 | 12/2004 | Shinkai et al. | |
| 2005/0041120 A1 * | 2/2005 | Miller .................. | 348/239 |
| 2005/0212930 A1 * | 9/2005 | Sim et al. .............. | 348/231.4 |
| 2005/0264703 A1 * | 12/2005 | Aoki ................... | 348/701 |

FOREIGN PATENT DOCUMENTS

| | | |
|---|---|---|
| JP | 04240900 A | 8/1992 |
| JP | 11282857 A | 10/1999 |
| JP | 2001143445 A | 5/2001 |
| JP | 2004-180279 A | 6/2004 |
| JP | 2005020605 A | 1/2005 |
| JP | 2005236906 A | 9/2005 |
| JP | 2006268089 A | 10/2006 |
| JP | 2007101945 A | 4/2007 |

OTHER PUBLICATIONS

Office Action from Japanese Application No. 2007-225207, dated May 31, 2011.

* cited by examiner

*Primary Examiner* — Tuan Ho
*Assistant Examiner* — Kent Wang
(74) *Attorney, Agent, or Firm* — Lerner, David, Littenberg, Krumholz & Mentlik, LLP

(57) ABSTRACT

A shooting apparatus includes a shooting section that shoots a subject, an acquiring section that acquires sound of surroundings, and an assigning section that assigns an electronic mark indicating a characteristic feature of the sound to a position in the image with sound corresponding to the sound, in each of a case when a level of the sound has become equal to a first threshold or more for a first period of time or more, and a case when, thereafter, the level of the sound has become less than a second threshold for a second period of time or more.

3 Claims, 42 Drawing Sheets

FIG. 6

```
 1:<?xml version="1.0" encoding="UTF-8"?>
 2:<EssenceMarkTable targetMedia="Original-Material">
 3:   <EssenceMark value="Speaker-X:start" frameCount="0"/>
 4:   <EssenceMark value="Speaker-X:end" frameCount="564"/>
 5:   <EssenceMark value="Speaker-X:start" frameCount="564"/>
 6:   <EssenceMark value="Speaker-X:end" frameCount="924"/>
 7:   <EssenceMark value="Speaker-X:start" frameCount="924"/>
 8:   <EssenceMark value="Speaker-X:end" frameCount="1804"/>
 9:   <EssenceMark value="Speaker-X:start" frameCount="1804"/>
10:   <EssenceMark value="Speaker-X:end" frameCount="2100"/>
11:</EssenceMarkTable>
```

FIG. 7

| STEP | SHOOTING OPERATION | PROCESS | DATA TO BE PROCESSED |
|---|---|---|---|
| S11 | COMMAND START OF SHOOTING | CREATE NRT FILE OF CLIP | NRT FILE OF CLIP |
| | | CREATE CLIP FILE | CLIP FILE |
| | | START RECORDING OF MATERIAL DATA | CLIP FILE |
| | | DETECT CONTINUATION FOR PREDETERMINED TIME OR MORE OF STATE IN WHICH LEVEL OF SOUND DATA IS EQUAL TO THRESHOLD OR MORE | SOUND DATA |
| | | DESCRIBE SPEAKER-UNDETERMINED EM(start) INTO ELECTRONIC MARK DATA OF NRT FILE OF CLIP | NRT FILE OF CLIP |
| | | DETECT CONTINUATION FOR PREDETERMINED TIME OR MORE OF STATE IN WHICH LEVEL OF SOUND DATA IS LESS THAN THRESHOLD | SOUND DATA |
| | | DESCRIBE SPEAKER-UNDETERMINED EM(end) INTO ELECTRONIC MARK DATA OF NRT FILE OF CLIP | NRT FILE OF CLIP |
| S12 | COMMAND END OF SHOOTING | END RECORDING OF MATERIAL DATA | |

FIG. 12

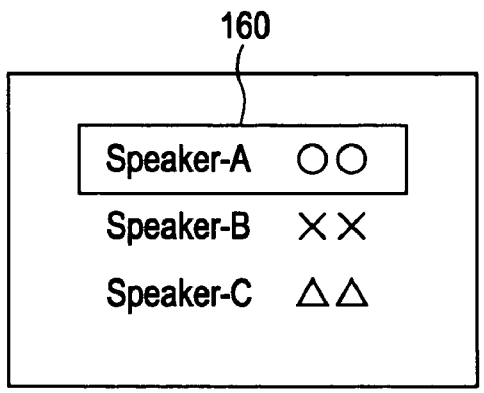

FIG. 13

```
1:<?xml version="1.0" encoding="UTF-8"?>
2:<EssenceMarkTable targetMedia="Original-Material">
3:   <EssenceMark value="Speaker-A:start" frameCount="0"/>
4:   <EssenceMark value="Speaker-A:end" frameCount="564"/>
5:   <EssenceMark value="Speaker-B:start" frameCount="564"/>
6:   <EssenceMark value="Speaker-B:end" frameCount="924"/>
7:   <EssenceMark value="Speaker-A:start" frameCount="924"/>
8:   <EssenceMark value="Speaker-A:end" frameCount="1804"/>
9:   <EssenceMark value="Speaker-B:start" frameCount="1804"/>
10:  <EssenceMark value="Speaker-B:end" frameCount="2100"/>
11:</EssenceMarkTable>
```

FIG. 16

```
1: <?xml version="1.0" encoding="UTF-8"?>
2: <smil name="Initial-EditList">
3:   <body>
4:     <par>
5:       <!-- Cut 1 -->
6:       <video src="Cam1-Clip1.mxf" clipBegin="284" clipEnd="564" begin="0" end="280"/>
7:       <!-- Cut 2 -->
8:       <video src="Cam2-Clip4.mxf" clipBegin="454" clipEnd="1054" begin="280" end="880"/>
9:       <!-- Cut 3 -->
10:      <video src="Cam1-Clip1.mxf" clipBegin="1164" clipEnd="1644" begin="880" end="1360"/>
11:      <!-- Cut 4 -->
12:      <video src="Cam2-Clip4.mxf" clipBegin="1534" clipEnd="1974" begin="1360" end="1800"/>
13:      <!-- audio in Cam1-Clip1.mxf -->
14:      <audio src="Cam1-Clip1.mxf" channel="1" clipBegin="284" clipEnd="2084" begin="0" end="1800"/>
15:    </par>
16:  </body>
17: </smil>
```

FIG. 18

```
1:<?xml version="1.0" encoding="UTF-8"?>
2:<EssenceMarkTable targetMedia="Initial-EditList">
3:   <EssenceMark value="Speaker-A:start" frameCount="0"/>
4:   <EssenceMark value="Speaker-A:end" frameCount="280"/>
5:   <EssenceMark value="Speaker-B:start" frameCount="280"/>
6:   <EssenceMark value="Speaker-B:end" frameCount="640"/>
7:   <EssenceMark value="Speaker-A:start" frameCount="640"/>
8:   <EssenceMark value="Speaker-A:end" frameCount="1520"/>
9:   <EssenceMark value="Speaker-B:start" frameCount="1520"/>
10:  <EssenceMark value="Speaker-B:end" frameCount="1800"/>
11:</EssenceMarkTable>
```

FIG. 19

```
1: <?xml version="1.0" encoding="UTF-8"?>
2: <smil name="Initial-EditList">
3:   <body>
4:     <par>
5:       <!-- Cut 1 -->
6:       <video src="Cam1-Clip.mxf" clipBegin="284" clipEnd="564" begin="0" end="280"/>
7:       <!-- Cut 2 -->
8:       <video src="Cam2-Clip.mxf" clipBegin="454" clipEnd="1054" begin="280" end="880"/>
9:       <!-- Cut 3 -->
10:      <video src="Cam1-Clip.mxf" clipBegin="1164" clipEnd="1644" begin="880" end="1360"/>
11:      <!-- Cut 4 -->
12:      <video src="Cam2-Clip.mxf" clipBegin="1534" clipEnd="1974" begin="1360" end="1800"/>
13:      <!-- audio in Cam1-Clip.mxf -->
14:      <audio src="Cam1-Clip.mxf" channel="1" clipBegin="284" clipEnd="2084" begin="0" end="1800">
15:        <audioFilter type="duckVoice" begin="280" end="640">
16:          <param name="pitch" value="0.5"/>
17:          <param name="formant" value="1.0"/>
18:        </audioFilter>
19:        <audioFilter type="duckVoice" begin="1520" end="1800">
20:          <param name="pitch" value="0.5"/>
21:          <param name="formant" value="1.0"/>
22:        </audioFilter>
23:      </audio>
24:    </par>
25:  </body>
26: </smil>
```

FIG. 20

```
1: <?xml version="1.0" encoding="UTF-8"?>
2: <EssenceMarkTable targetMedia="Initial-EditList">
3:   <EssenceMark value="Speaker-A:start:normal" frameCount="0"/>
4:   <EssenceMark value="Speaker-A:end:normal" frameCount="280"/>
5:   <EssenceMark value="Speaker-B:start:duckVoice" frameCount="280"/>
6:   <EssenceMark value="Speaker-B:end:duckVoice" frameCount="640"/>
7:   <EssenceMark value="Speaker-A:start:normal" frameCount="640"/>
8:   <EssenceMark value="Speaker-A:end:normal" frameCount="1520"/>
9:   <EssenceMark value="Speaker-B:start:duckVoice" frameCount="1520"/>
10:  <EssenceMark value="Speaker-B:end:duckVoice" frameCount="1800"/>
11: </EssenceMarkTable>
```

FIG. 21

| STEP | EDITING OPERATION | PROCESS | DATA TO BE PROCESSED |
|---|---|---|---|
| S51 | MOUNT OPTICAL DISC IN EDITING DEVICE, AND COMMAND DISPLAY OF INPUT SCREEN | DISPLAY INPUT SCREEN ON BASIS OF SPEAKER LIST REGISTERED IN ADVANCE | SPEAKER LIST |
| S52 | COMMAND PLAYBACK OF CLIP | PLAY BACK CLIP FILE | CLIP FILE |
| S53 | INPUT SPEAKER ID OF EACH SPEAKER UPON HEARING SPEECH OF THAT SPEAKER | ADD SPEAKER ID TO SPEAKER-UNDETERMINED EM(start) AND SPEAKER-UNDETERMINED EM(end) | ESSENCE MARK DATA OF CLIP |
| S54 | COMMAND DISPLAY OF EDITING SCREEN | DISPLAY EDITING SCREEN, AND OUTPUT SOUND | PROXY FILE |
| S55 | PERFORM EDITING | CREATE EDIT LIST | EDIT LIST FILE |
| | | INTERPOLATE SPEAKER EM(start) OR SPEAKER EM(end) AT CUT POINT, AND COPY SPEAKER EM(start) AND SPEAKER EM(end) ASSIGNED FROM IN POINT TO OUT POINT OF SOUND TO CREATE ELECTRONIC MARK DATA OF EDITED RESULT | NRT FILE FOR EDIT LIST |
| S56 | SPECIFY SPEAKER ID OF SPEECH TO WHICH DUCK VOICE PROCESSING IS TO BE APPLIED | LOCATE SEGMENT TO WHICH DUCK VOICE PROCESSING IS TO BE APPLIED, ON BASIS OF SPECIFIED SPEAKER ID AND ELECTRONIC MARK DATA OF EDITED RESULT, AND DESCRIBE IN EDIT LIST THAT DUCK VOICE PROCESSING IS TO BE APPLIED TO THAT SEGMENT | EDIT LIST FILE |
| S57 | COMMAND PLAYBACK OF EDITED RESULT TO WHICH DUCK VOICE PROCESSING HAS BEEN APPLIED | PLAY BACK EDITED RESULT ON BASIS OF EDIT LIST | CLIP FILE |

FIG. 27

| STEP | SHOOTING OPERATION | PROCESS | DATA TO BE PROCESSED |
|---|---|---|---|
| S101 | COMMAND DISPLAY OF INPUT SCREEN | DISPLAY INPUT SCREEN ON BASIS OF SPEAKER LIST REGISTERED IN ADVANCE | SPEAKER LIST |
| S102 | COMMAND START OF SHOOTING | CREATE NRT FILE OF CLIP | NRT FILE OF CLIP |
|  |  | CREATE CLIP FILE | CLIP FILE |
|  |  | START RECODING OF MATERIAL DATA | CLIP FILE |
| S103 | INPUT SPEAKER ID OF EACH SPEAKER AT START OF SPEECH OF THAT SPEAKER | DESCRIBE SPEAKER EM(start) INTO ELECTRONIC MARK DATA OF NRT FILE OF CLIP | NRT FILE OF CLIP |
| S104 | COMMAND END OF SHOOTING | END RECORDING OF MATERIAL DATA |  |

FIG. 33

```
1:<?xml version="1.0" encoding="UTF-8"?>
2:<EssenceMarkTable targetMedia="Original-Material">
3:   <EssenceMark value="Speaker-A" frameCount="100"/>
4:   <EssenceMark value="Speaker-B" frameCount="350"/>
5:   <EssenceMark value="Speaker-C" frameCount="600"/>
6:</EssenceMarkTable>
```

FIG. 34

```
1:<?xml version="1.0" encoding="UTF-8"?>
2:<EssenceMarkTable targetMedia="Initial-EditList">
3:   <EssenceMark value="Speaker-A" frameCount="0"/>
4:   <EssenceMark value="Speaker-B" frameCount="100"/>
5:   <EssenceMark value="Speaker-C" frameCount="300"/>
6:   <EssenceMark value="Speaker-C" frameCount="450"/>
7:</EssenceMarkTable>
```

FIG. 35

| STEP | EDITING OPERATION | PROCESS | DATA TO BE PROCESSED |
|---|---|---|---|
| S131 | MOUNT OPTICAL DISC IN EDITING DEVICE, AND COMMAND DISPLAY OF EDITING SCREEN | DISPLAY EDITING SCREEN, AND OUTPUT SOUND | PROXY FILE |
| S132 | PERFORM EDITING | CREATE EDIT LIST | EDIT LIST FILE |
|  |  | INTERPOLATE SPEAKER EM (start) AT CUT POINT, AND COPY SPEAKER EM (start) ASSIGNED FROM IN POINT TO OUT POINT OF SOUND TO CREATE ESSENCE MARK DATA OF EDITED RESULT | NRT FILE FOR EDIT LIST |
| S133 | SPECIFY SPEAKER ID OF SPEECH TO WHICH DUCK VOICE PROCESSING IS TO BE APPLIED | LOCATE SEGMENT TO WHICH DUCK VOICE PROCESSING IS TO BE APPLIED, ON BASIS OF SPECIFIED SPEAKER ID AND ESSENCE MARK DATA OF EDITED RESULT, AND DESCRIBE IN EDIT LIST THAT DUCK VOICE PROCESSING IS TO BE APPLIED TO THAT SEGMENT | EDIT LIST FILE |
| S134 | COMMAND PLAYBACK OF EDITED RESULT TO WHICH DUCK VOICE PROCESSING HAS BEEN APPLIED | PLAY BACK EDITED RESULT ON BASIS OF EDIT LIST | CLIP FILE |

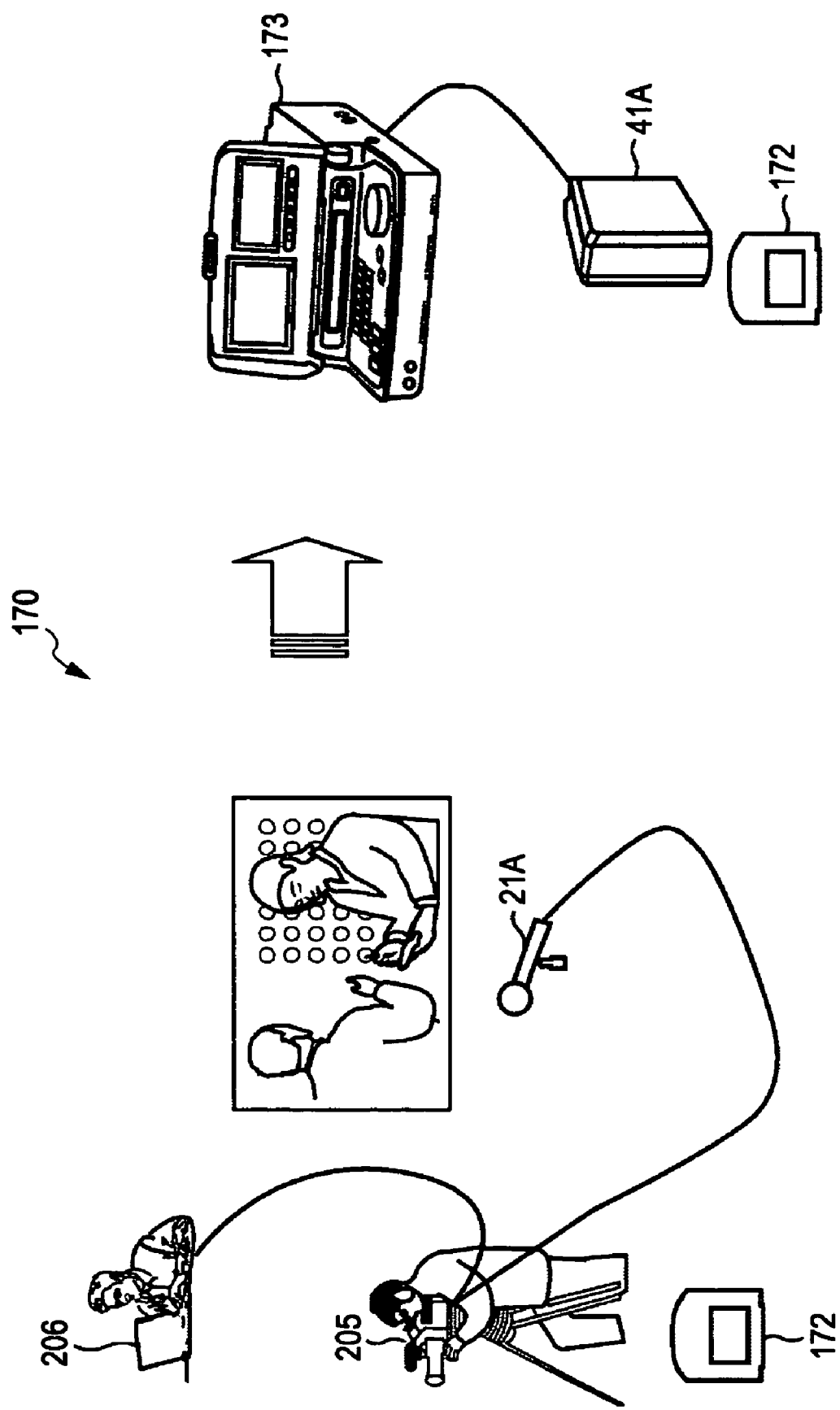

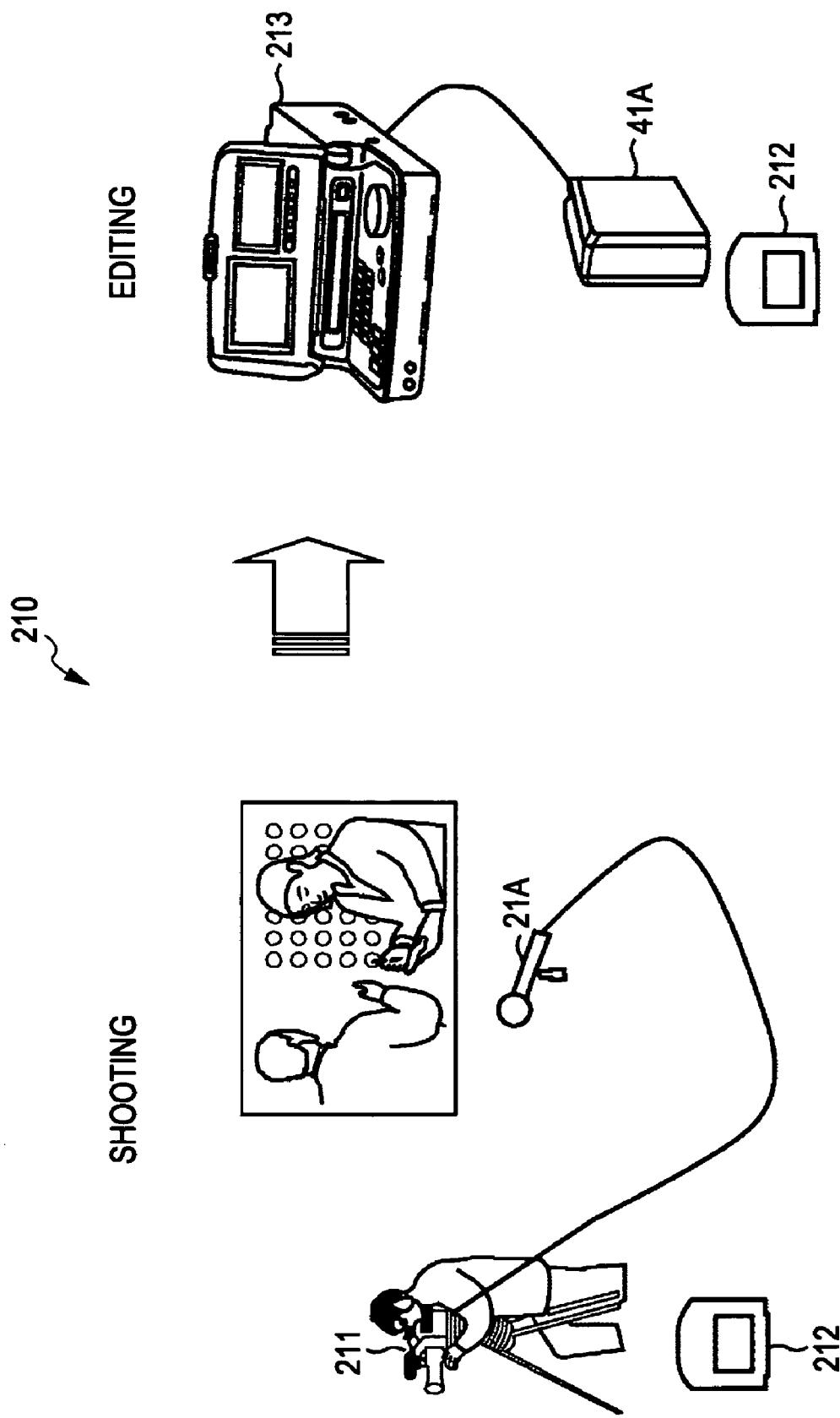

FIG. 40

| STEP | SHOOTING OPERATION | PROCESS | DATA TO BE PROCESSED |
|---|---|---|---|
| S171 | COMMAND START OF SHOOTING | CREATE NRT FILE OF CLIP | NRT FILE OF CLIP |
| | | CREATE CLIP FILE | CLIP FILE |
| S172 | COMMAND END OF SHOOTING | END RECORDING OF MATERIAL DATA | |

FIG. 44

| STEP | EDITING OPERATION | PROCESS | DATA TO BE PROCESSED |
|---|---|---|---|
| S211 | MOUNT OPTICAL DISC IN EDITING DEVICE, AND COMMAND DISPLAY OF EDITING SCREEN | DISPLAY EDITING SCREEN, AND OUTPUT SOUND | PROXY FILE |
| S212 | PERFORM EDITING | CREATE EDIT LIST | EDIT LIST FILE |
| S213 | COMMAND DISPLAY OF INPUT SCREEN | DISPLAY INPUT SCREEN ON BASIS OF SPEAKER LIST REGISTERED IN ADVANCE | SPEAKER LIST |
| S214 | COMMAND PLAYBACK OF EDITED RESULT | PLAY BACK EDITED RESULT ON BASIS OF EDIT LIST | CLIP FILE |
| S215 | INPUT SPEAKER ID OF EACH SPEAKER AT START OF SPEECH OF THAT SPEAKER | DESCRIBE SPEAKER EM(start) TO WHICH SPEAKER ID HAS BEEN ADDED, INTO ELECTRONIC MARK DATA OF NRT FILE FOR EDIT LIST | NRT FILE FOR EDIT LIST |
| S216 | SPECIFY SPEAKER OF SPEECH TO WHICH DUCK VOICE PROCESSING IS TO BE APPLIED | LOCATE SEGMENT TO WHICH DUCK VOICE PROCESSING IS TO BE APPLIED, ON BASIS OF SPECIFIED SPEAKER ID AND ELECTRONIC MARK DATA OF EDITED RESULT, AND DESCRIBE IN EDIT LIST THAT DUCK VOICE PROCESSING IS TO BE APPLIED TO THAT SEGMENT | EDIT LIST FILE |
| S217 | COMMAND PLAYBACK OF EDITED RESULT TO WHICH DUCK VOICE PROCESSING HAS BEEN APPLIED | PLAY BACK EDITED RESULT ON BASIS OF EDIT LIST | CLIP FILE |

SHOOTING APPARATUS AND SHOOTING METHOD, AND PROGRAM

CROSS-REFERENCE TO RELATED APPLICATIONS

The present application claims priority from Japanese Patent Application No. JP 2007-225207, filed in the Japanese Patent Office on Aug. 31, 2007, the entire content of which is incorporated herein by reference.

BACKGROUND OF THE INVENTION

1. Field of the Invention

The present invention relates to a shooting apparatus and a shooting method, an information processing apparatus and an information processing method, and a program. More specifically, the present invention relates to a shooting apparatus and a shooting method, an information processing apparatus and an information processing method, and a program, which make it readily possible to apply predetermined processing to the sound of a desired speaker of the edited result in a case where nondestructive editing is performed to an image with sound.

2. Description of the Related Art

In the related art, in news programs or documentary programs, processing for changing the pitch or format of the sound of a speaker is often applied in cases where, for example, it is necessary to conceal the identity of the speaker. Although the sound after the processing sometimes resembles the voice of a big man or child, in many cases, the sound resembles the voice of Donald Duck and hence is called duck voice. In the following description, processing for changing sound into duck voice will be referred to as duck voice processing.

Also, in order to enhance the efficiency of editing operation, recent years have seen widespread adoption of editing devices that perform nondestructive editing in which a Cut point is described while leaving a shot image or sound as it is. It should be noted that a Cut point refers to an In point indicating the start position of a segment of a shot image or sound which is to be included in the edited result, or an Out point indicating the end position of the segment.

As an editing device of this type, there is one in which, for example, when a Cut point is specified by the user, an electronic mark indicating the Cut point is added to an electronic mark list, which is a list of electronic marks such as Essence-Mark® representing a characteristic feature of an image, and an edit list for editing an image or sound on the basis of the Cut point is generated. For example, U.S. Patent No. 2004/0244047 describes an example of such an editing device.

SUMMARY OF THE INVENTION

However, no consideration has been made for a situation where, in an editing device that performs nondestructive editing, predetermined processing such as duck voice processing is applied to the sound of a predetermined speaker of the edited result. Therefore, no consideration has been made for an electronic mark that is useful for easily applying predetermined processing such as duck voice processing to the sound of a desired speaker of the edited result.

It is desirable to allow predetermined processing to be easily applied to the sound of a desired speaker of the edited result, in a case where nondestructive editing is performed to an image with sound.

According to an embodiment of the present invention, there is provided a shooting apparatus which shoots an image with sound, including: a shooting section that shoots a subject; an acquiring section that acquires sound of surroundings; and an assigning section that assigns an electronic mark indicating a characteristic feature of the sound to a position in the image with sound corresponding to the sound, in each of a case when a level of the sound has become equal to a first threshold or more for a first period of time or more, and a case when, thereafter, the level of the sound has become less than a second threshold for a second period of time or more.

According to an embodiment of the present invention, there is provided a shooting method for a shooting apparatus that shoots an image with sound, including the steps of: shooting a subject; acquiring sound of surroundings; and assigning an electronic mark indicating a characteristic feature of the sound to a position in the image with sound corresponding to the sound, in each of a case when a level of the sound has become equal to a first threshold or more for a first period of time or more, and a case when, thereafter, the level of the sound has become less than a second threshold for a second period of time or more.

According to an embodiment of the present invention, there is provided a program for causing a computer to perform a shooting process of shooting an image with sound, the shooting process including the steps of: shooting a subject; acquiring sound of surroundings; and assigning an electronic mark indicating a characteristic feature of the sound to a position in the image with sound corresponding to the sound, in each of a case when a level of the sound has become equal to a first threshold or more for a first period of time or more, and a case when, thereafter, the level of the sound has become less than a second threshold for a second period of time or more.

According to an embodiment of the present invention, there is provided an information processing apparatus which performs a predetermined process with respect to an electronic mark assigned to an image with sound and indicating a characteristic feature of sound, including: an accepting section that accepts an input of unique information, which is information unique to a speaker of sound in the image with sound, from a user; and a unique-information adding section that adds the unique information whose input has been accepted by the accepting section, to an electronic mark assigned to a position in the image with sound corresponding to the input.

The information processing apparatus may further include an electronic-mark assigning section that assigns the electronic mark in response to an input of the unique information, to a position in the image with sound corresponding to the input.

According to an embodiment of the present invention, there is provided an information processing method for an information processing apparatus that performs a predetermined process with respect to an electronic mark assigned to an image with sound and indicating a characteristic feature of sound, including the steps of: accepting an input of unique information, which is information unique to a speaker of sound in the image with sound, from a user; and adding unique information whose input has been accepted by the accepting section, to an electronic mark assigned to a position in the image with sound corresponding to the input.

According to an embodiment of the present invention, there is provided a program for causing a computer to perform a process with respect to an electronic mark assigned to an image with sound and indicating a characteristic feature of sound, the process including the steps of: accepting an input of unique information, which is information unique to a speaker of sound in the image with sound, from a user; and adding unique information whose input has been accepted by the accepting section, to an electronic mark assigned to a position in the image with sound corresponding to the input.

According to an embodiment of the present invention, a subject is shot, sound of the surroundings is acquired, and in each of a case when the level of the sound has become equal to a first threshold or more for a first period of time or more, and a case when, thereafter, the level of the sound has become less than a second threshold for a second period of time or more, electronic mark indicating a characteristic feature of the sound is assigned to a position in the image with sound corresponding to the sound.

According to an embodiment of the present invention, an input of unique information, which is information unique to the speaker of sound in an image with sound, from a user is accepted, and the unique information whose input has been accepted by the accepting section is added to an electronic mark assigned to a position in the image with sound corresponding to the input.

BRIEF DESCRIPTION OF THE DRAWINGS

FIG. 6 is a diagram showing an example of electronic mark data describing speaker-undetermined EMs(start) and speaker-undetermined EMs(end);

FIG. 7 is a diagram illustrating a shooting operation performed using a video camera shown in FIG. 1;

FIG. 12 is a diagram showing an example of an input screen;

FIG. 13 is a diagram showing an example of electronic mark data describing speaker EMs(start) or speaker EMs (end);

FIG. 16 is a diagram showing an edit list of the edited result shown in FIG. 15;

FIG. 18 a diagram showing an example of electronic mark data describing speaker EMs(start) and speaker EMs(end) assigned to the edited result;

FIG. 19 is a diagram showing an example of an edit list in a case where duck voice processing is applied;

FIG. 20 is a diagram showing an example of the electronic mark data of the edited result in a case where duck voice processing is applied;

FIG. 21 is a diagram illustrating a shooting operation performed using an editing device shown in FIG. 1;

FIG. 27 is a diagram illustrating a shooting operation performed using a video camera shown in FIG. 24;

FIG. 33 is a diagram showing the electronic mark data of a first clip;

FIG. 34 is a diagram showing the electronic mark data of the edited result;

FIG. 35 is a diagram illustrating an editing operation performed using an editing device;

FIG. 36 is a view showing an example of another configuration of the shooting and editing system shown in FIG. 24;

FIG. 37 is a view showing an example of the configuration of a shooting and editing system according to a third embodiment of the present invention;

FIG. 40 is a diagram illustrating a shooting operation performed using a video camera shown in FIG. 37;

FIG. 44 is a diagram illustrating an editing operation performed using an editing device shown in FIG. 37.

DESCRIPTION OF THE PREFERRED EMBODIMENTS

Hereinbelow, specific embodiments of the present invention will be described in detail with reference to the drawings.

Figure 1:
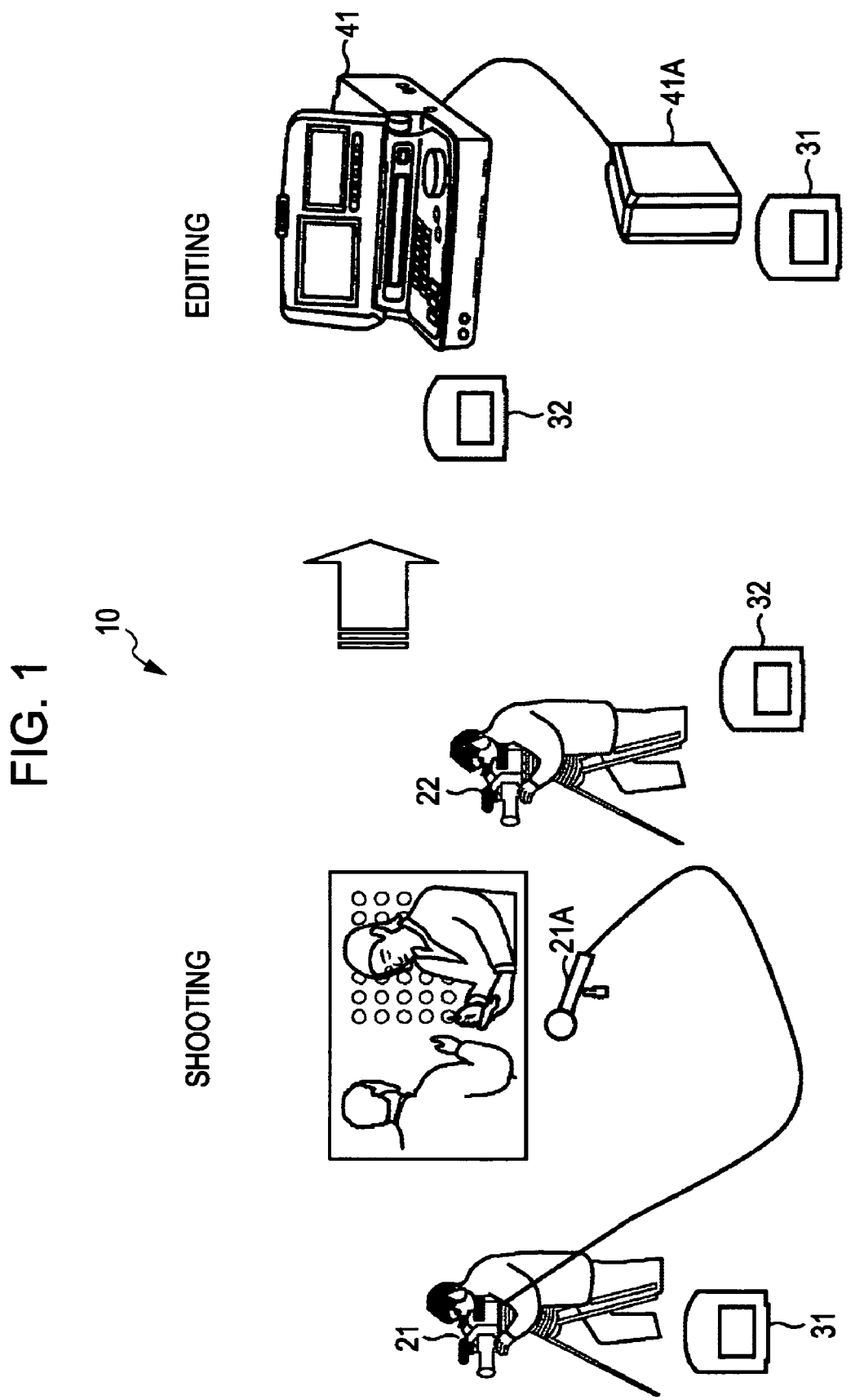
FIG. 1 is a view showing an example of the configuration of a shooting and editing system according to a first embodiment of the present invention.

FIG. 1 shows an example of the configuration of a shooting and editing system according to a first embodiment of the present invention.

A shooting and editing system 10 shown in FIG. 1 is a shooting and editing system used for, for example, shooting and editing a television material that is the original material for a television program.

The shooting and editing system 10 includes a video camera 21 having a microphone 21A, a video camera 22, and an editing device 41.

The video cameras 21 and 22 are devices used for videotape recording of a television material for a news program or documentary program as a television program. The video camera 21 shoots the image of a television material, and acquires the sound of the surroundings by the microphone 21A. The video camera 21 records the resulting data of an image with sound onto an optical disc 31 as material data representing the data of the television material.

The video camera 22 shoots the image of a television material, and records the resulting image data as material data onto the optical disc 32. Further, on the basis of an input of the user, the video cameras 21 and 22 generate, for example, information or the like that will become useful at the time of editing performed later, such as information or the like related to videotape recording, and associate the generated information as metadata with material data.

The optical disc 31 or 32 on which material data and metadata associated with the material are recorded is mounted in an optical disc drive 41A of the editing device 41.

The editing device 41 is a device used for compiling pieces of material data recorded on the optical discs 31 and 32 mounted in the optical disc drive 41A onto a single optical disc 31, and editing the material data complied on the optical disc 31.

The editing device 41 copies the material data recorded on the optical disc 32 onto the optical disc 31 as necessary. Also, in accordance with an input of the user, the editing device 41 performs nondestructive editing of the material data complied on the optical disc 31, and creates an edit list representing information related to the edited result and records the edit list onto the optical disc 31. Further, in accordance with an input of the user, the editing device 41 applies duck voice processing to the sound of a desired speaker of the edited result.

While the video camera 21 or 22 and the editing device 41 are separate devices in the shooting and editing system 10 shown in FIG. 1, these devices may be integrated together.

In the shooting and editing system 10 mentioned above, the optical discs 31 and 32 are mounted in the optical disc drive 41A of the editing device 41, and reading or recording of data is performed with respect to the optical discs 31 and 32. However, a configuration is also possible in which the editing device 41 is connected via a network to the video camera 21 with the optical disc 31 mounted therein, and the video camera 22 with the optical disc 32 mounted therein, and reading or recording of data with respect to the optical discs 31 and 32 is performed via the network.

Figure 2:
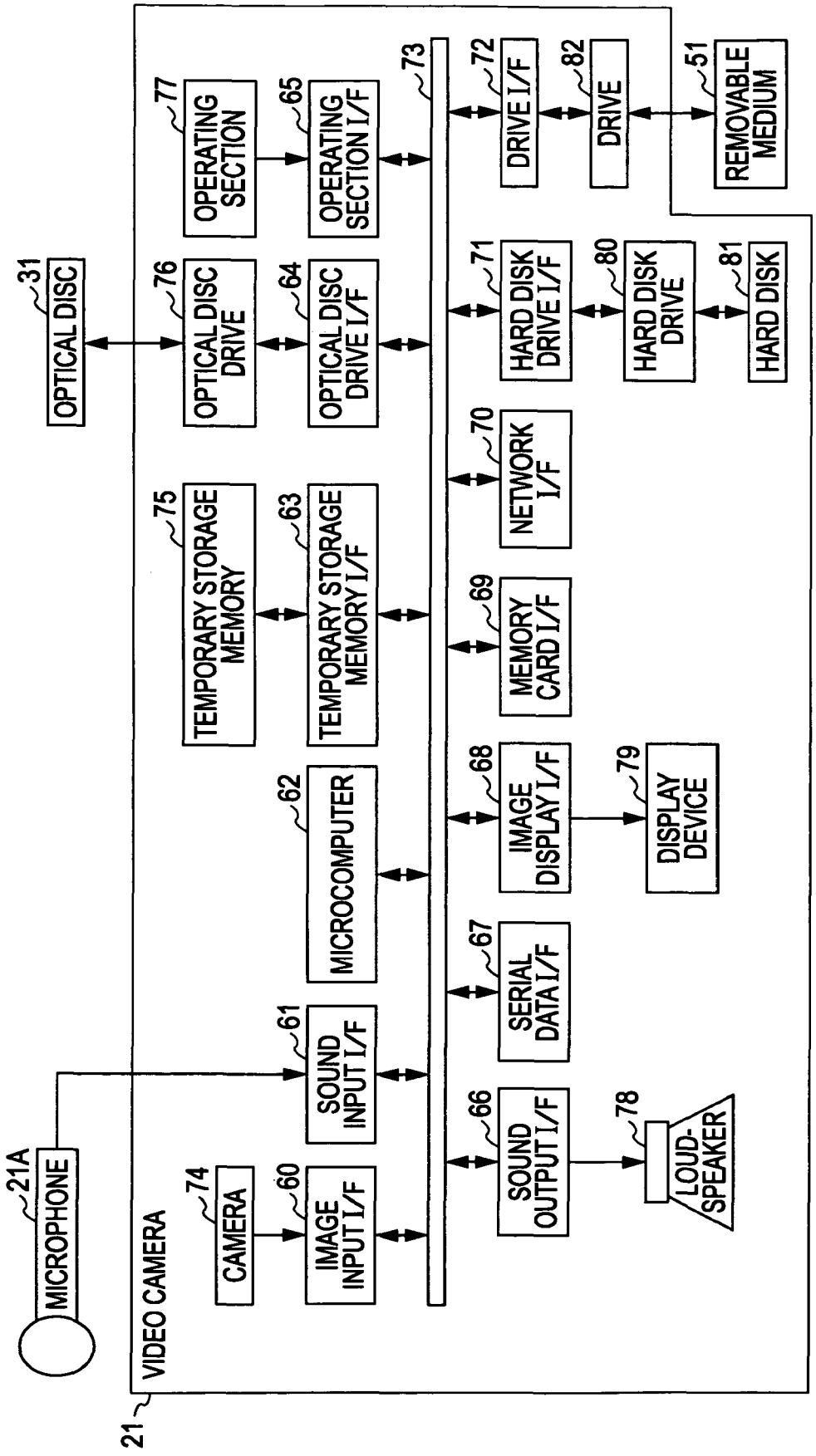
FIG. 2 is a block diagram showing an example of the hardware configuration of a video camera shown in FIG. 1.

FIG. 2 is a block diagram showing an example of the hardware configuration of the video camera 21 shown in FIG. 1.

In the video camera 21 shown in FIG. 2, an image input I/F (Interface) 60, a sound input I/F 61, a microcomputer 62, a temporary storage memory I/F 63, an optical disc drive I/F 64, an operating section I/F 65, a sound output I/F 66, a serial data I/F 67, an image display I/F 68, a memory card I/F 69, a network I/F 70, a hard disk drive I/F 71, and a drive I/F 72 are connected to a system bus 73.

The image input I/F 60 is connected with a camera 74. An image signal obtained as a result of shooting with the camera 74 is inputted from the camera 74. The image input I/F 60 applies A/D (Analog/Digital) conversion to synchronizing signals such as a signal conforming to the SDI (Serial Digital Interface) standard, a composite signal, and a component signal, which are included in the image signal, and supplies the resulting digital signals as image data to the microcomputer 62, the image display I/F 68, or the temporary storage memory I/F 63 via the system bus 73.

The sound input I/F 61 is connected with the microphone 21A provided on the outside. A sound signal as an analog signal of sound of the surroundings acquired by the microphone 21A is inputted to the sound input I/F 61. The sound input I/F 61 applies A/D conversion to the sound signal, and supplies the resulting digital signal as sound data to the microcomputer 62 or the temporary storage memory I/F 63 via the system bus 73.

The microcomputer 62 includes a CPU (Central Processing Unit), a ROM (Read Only Memory), and a RAM (Random Access Memory). The CPU of the microcomputer 62 controls the respective sections of the video camera 21 in accordance with a program recorded in the ROM or a hard disk 81, in response to an operation signal or the like from the operating section I/F 65.

For example, by using material data including image data supplied from the image input I/F 60, and sound data supplied from the sound input I/F 61, the CPU creates proxy data as a low-resolution version of the image data. The CPU supplies the proxy data and the material data to the temporary storage memory I/F 63 for storage into the temporary storage memory 75. Also, in accordance with the level of the sound data supplied from the sound input I/F 61, the CPU creates electronic mark data describing an electronic mark indicating a characteristic feature of the sound, and supplies the electronic mark data to the optical disc drive I/F 64.

Further, the CPU supplies sound data in the material data or proxy data supplied from the temporary storage memory I/F 63 to the sound output I/F 66 via the system bus 73, and causes a sound corresponding to the sound data to be outputted from a loudspeaker 78.

Also, the CPU supplies image data in the material data or proxy data supplied from the temporary storage memory I/F 63 to the image display I/F 68 via the system bus 73, and causes an image corresponding to the image data to be displayed on a display device 79. A program, data, and the like to be executed by the CPU are stored in the RAM as appropriate.

The temporary storage memory I/F 63 is connected with the temporary storage memory 75 such as a buffer. The temporary storage memory I/F 63 stores material data including image data from the image input I/F 60, and sound data from the sound input I/F 61, into the temporary storage memory 75. Also, the temporary storage memory I/F 63 stores proxy data supplied from the microcomputer 62 into the temporary storage memory 75.

Further, the temporary storage memory I/F 63 reads material data including image data from the image input I/F 60 and sound data from the sound input I/F 61, and proxy data which are stored in the temporary storage memory 75. Then, the temporary storage memory I/F 63 supplies the material data and the proxy data to the optical disc drive I/F 64 via the system bus 73 for recording onto the optical disc 31.

Also, the temporary storage memory I/F 63 stores material data or proxy data of a clip (details of which will be described later) supplied from the optical disc drive I/F 64, into the temporary storage memory 75. Further, the temporary storage memory I/F 63 reads material data or proxy data supplied from the optical disc drive I/F 64 and stored in the temporary storage memory 75, and supplies the read data to the microcomputer 62 via the system bus 73.

It should be noted that the term clip refers to, for example, an aggregate of material data, metadata, proxy data, and the like obtained by a single shooting process (shooting process from the start of shooting to the end of shooting).

The optical disc drive I/F 64 is connected with the optical disc drive 76 in which the optical disc 31 is mounted. The optical disc drive I/F 64 controls the optical disc drive 76 to read material data or proxy data of a clip, and supplies the read data to the temporary storage memory I/F 63 via the system bus 73.

Also, the optical disc drive I/F 64 controls the optical disc drive 76 to record material data, proxy data, or the like from the temporary storage memory I/F 63 onto the optical disc 31 on a clip-by-clip basis. Further, the optical disc drive I/F 64 controls the optical disc drive 76 to record electronic mark data from the microcomputer 62 onto the optical disc 31.

The operating section I/F 65 is connected with an operating section 77 such as a receiving section for receiving a command transmitted from an operation button or remote controller. In response to a user's operation on the operating section 77, the operating section I/F 65 generates an operation signal indicative of the operation, and supplies the operation signal to the microcomputer 62 via the system bus 73.

The sound output I/F 66 is connected with the loudspeaker 78. The sound output I/F 66 applies D/A (Digital/Analog) conversion to sound data supplied from the microcomputer 62, and amplifies the resulting analog signal and supplies the amplified analog signal to the loudspeaker 78. The loudspeaker 78 outputs a sound to the outside on the basis of the analog signal from the sound output I/F 66. It should be noted that a configuration is also possible in which the sound output I/F 66 supplies sound data to the loudspeaker 78 as it is, and the loudspeaker 78 performs D/A conversion or the like and outputs a sound to the outside on the basis of the resulting analog signal.

The serial data I/F 67 exchanges data with digital equipment such as an external computer (not shown) as necessary. The image display I/F 68 is connected with the display device 79. The image display I/F 68 applies D/A conversion to image data from the image input I/F 60 or the microcomputer 62, and amplifies the resulting analog signal such as a composite signal or component signal and supplies the amplified analog signal to the display device 79. The display device 79 displays an image on the basis of the analog signal from the image display I/F 68.

It should be noted that a configuration is also possible in which the image display I/F 68 supplies image data to the display device 79 as it is, and the display device 79 performs D/A conversion or the like and outputs an image to the outside on the basis of the resulting analog signal.

The memory card I/F 69 reads and writes material data, various kinds of setting data, and the like with respect to a memory card (not shown) mounted in the video camera 21, as necessary. The network I/F 70 exchanges data with another device connected via a wired or wireless network such as the Internet or the local area network, as necessary.

For example, the network I/F 70 acquires a program from another device via a network, and records the program onto the hard disk 81 via the system bus 73, the hard disk drive I/F 71, and a hard disk drive 80.

The hard disk drive I/F 71 is connected with the hard disk drive 80 in which the hard disk 81 is mounted. The hard disc drive I/F 71 controls the hard disk drive 80 to perform reading and writing of data with respect to the hard disk 81. For example, the hard disk drive I/F 71 controls the hard disk drive 80 to record a program supplied via the network I/F 70 and the system bus 73 onto the hard disk 81.

The drive I/F 72 is connected with a drive 82. The drive I/F 72 controls the drive 82, drives a removable medium 51 such as a magnetic disc, an optical disc, a magneto-optical disc, or a semiconductor memory when the removable medium 51 is mounted in the drive 82, and acquires a program, data, or the like recorded on the removable medium 51. As necessary, the acquired program or data is transferred to and recorded on the hard disk 81 via the hard disk drive I/F 71 or the like.

The system bus 73 mediates exchange of data between the respective sections connected to the system bus 73.

It should be noted that while the video camera 22 in FIG. 1 is configured similarly to the video camera 21 in FIG. 2, the video camera 22 is not connected with a microphone, and a sound signal from a microphone is not inputted to the video camera 22. That is, the video camera 22 shoots only the image of a television material. Therefore, the video camera 22 is the same as the video camera 21 except for the portion of sound. Thus, in the following, description of the video camera 22 is omitted.

Next, in the video camera 21 in FIG. 2, the microcomputer 62 serves as a shooting processing section that shoots an image with sound of a television material by executing a predetermined program.

Figure 3:
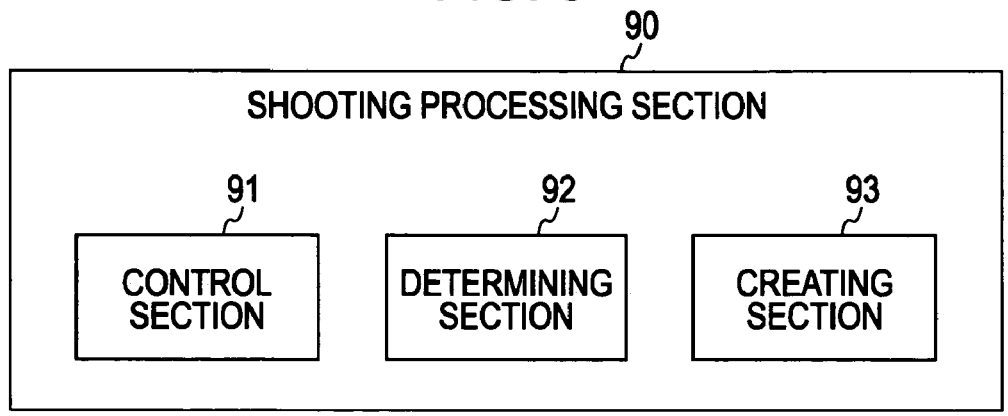
FIG. 3 is a block diagram showing an example of the functional configuration of a shooting processing section of a video camera shown in FIG. 1.

FIG. 3 shows an example of the functional configuration of such a shooting processing section.

A shooting processing section 90 in FIG. 3 includes a control section 91, a determining section 92, and a creating section 93.

The control section 91 performs various kinds of control related to shooting. For example, the control section 91 controls the image input I/F 60 and the sound input I/F 61 in accordance with an operation signal indicative of an operation for commanding the start of shooting, which is supplied from the operating section I/F 65, and starts acquisition of material data. Also, the control section 91 supplies sound data in the acquired material data to the determining section 92.

Also, the control section 91 creates proxy data using the acquired material data. Further, the control section 91 supplies the material data and the proxy data to the temporary storage memory I/F 63 for storage into the temporary storage memory 75.

The determining section 92 determines, in accordance with the level of the sound data supplied from the control section 91, whether the sound data is sound data at the start of speech, or sound data at the end of speech, of an undetermined speaker in the television material. On the basis of the determination result, the determining section 92 supplies a frame number corresponding to the sound data at the start or end of speech of the undetermined speaker to the creating section 93.

The creating section 93 creates, on the basis of the frame number corresponding to sound data at the start or end of speech of an undetermined speaker supplied from the determining section 92, an electronic mark that is assigned to a frame of the frame number and indicates the start position or end position of speech of an undetermined speaker as a characteristic feature of a sound. The creating section 93 supplies electronic mark data describing the electronic mark to the optical disc drive I/F 64 for recording onto the optical disc 31.

Figure 4:
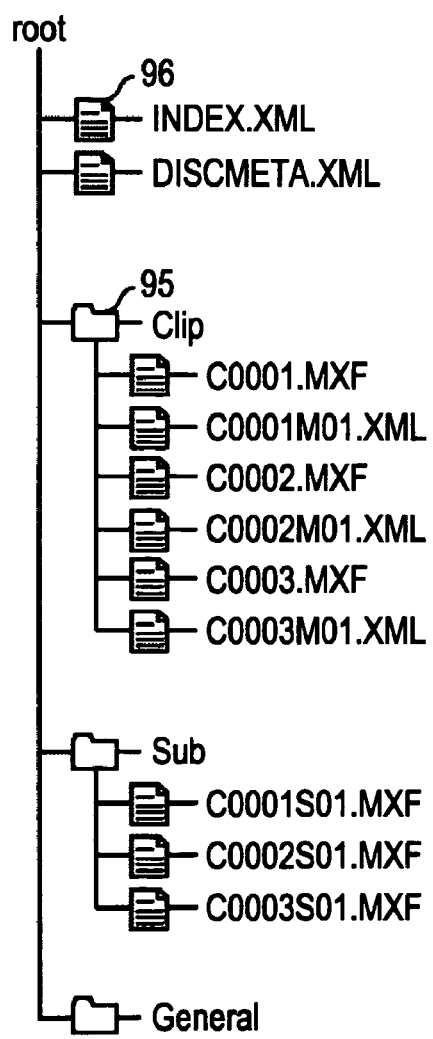
FIG. 4 is a diagram showing an example of the directory structure of files recorded on an optical disc shown in FIG. 1.

FIG. 4 shows an example of the directory structure of files recorded on the optical disc 31 shown in FIG. 1.

In FIG. 4, symbol 95 represents a single directory. Although not denoted by reference numerals, other symbols identical to the symbol (directory) 95 also each represent a single directory. Also, symbol 96 represents a single file.

Although not denoted by reference numerals, other symbols identical to the symbol (file) 96 also each represent a single file.

In the following description, unless otherwise specifically stated, a symbol of a directory and a symbol of a directory are regarded identical. Likewise, a symbol of a file and a symbol of a file are regarded identical. To easily distinguish between individual directories and individual files, in the following, the name of each file or directory is written in the parentheses behind the file or directory.

In the example of FIG. 4, on the optical disc 31, there are provided an index file (INDEX.XML) 96, which is a file of data describing the table of contents and describes information for managing clips, and a disc metadata file (DISC-META.XML) that is a file of disc metadata including the path to the representative image of the optical disc 31, the title of the optical disc 31, comments, and the like.

Also, on the optical disc 31, there are provided a clip directory (Clip) 95 under which files of material data and metadata of clips are provided, and a proxy directory (Sub) under which files of proxy data of clips are provided.

In the clip directory (Clip) 95, material data and metadata of clips recorded on the optical disc 31 are recorded as files that differ for each clip.

Specifically, for example, FIG. 4 shows a case in which pieces of data on three clips are recorded on the optical disc 31.

That is, for example, under the clip directory 95, there are provided a first clip file (C0001.MXF) that is a file of material data of the first clip recorded on the optical disc 31, and a first NRT file (C0001M01.XML) that is a file containing metadata corresponding to the material data of the clip, such as electronic mark data that may not be processed in real time (hereinafter, referred to as non-real time metadata (NRT data)).

Also, under the clip directory 95, a second clip file (C0002.MXF) and a second NRT file (C0002M01.XML), and a third clip file (C0003.MXF) and a third NRT file (C0003M01.XML) are provided similarly to the first clip file (C0001.MXF) and the first NRT file (C0001M01.XML).

In FIG. 4, in the proxy directory (Sub) shown below the clip directory (Clip) mentioned above, pieces of proxy data of clips recorded on the optical disc 31 are recorded as files that differ for each clip.

For example, in the example of FIG. 4, under the proxy directory (Sub), there are provided a first proxy file (C0001S01.MXF) that is a file of proxy data of the first clip recorded on the optical disc 31, a second proxy file (C0002S01.MXF) that is a file of proxy data of the second clip, and a third proxy file (C0003S01.MXF) that is a file of proxy data of the third clip.

Further, on the optical disc 31, there is provided a general directory (General) in which files of data other than clips are provided.

Figures 5A, 5B:
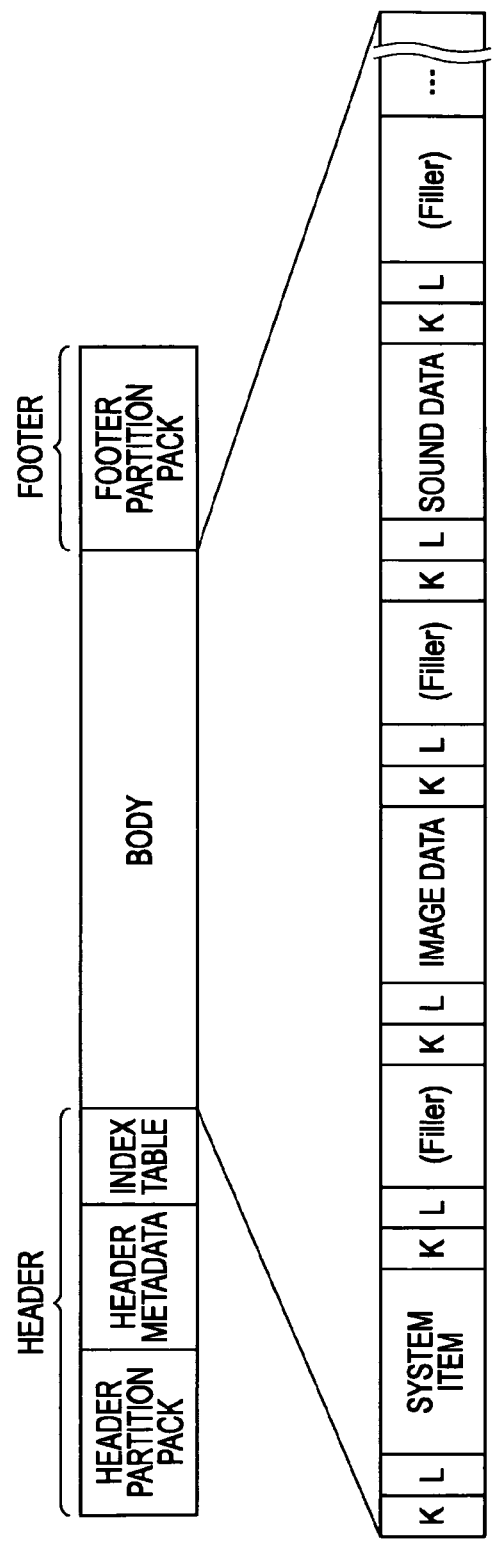
FIGS. 5A and 5B are diagrams each showing an example of the format of a clip file shown in FIG. 4.

FIGS. 5A and 5B each show an example of the format of a clip file shown in FIG. 4.

As shown in FIG. 5A, in a clip file, pieces of material data corresponding to one clip are arranged collectively in a body, and a header and a footer are added to the body.

In the header, Header Partition Pack, Header Metadata, and Index Table are arranged in order from the beginning. In the Header Partition Pack, partition metadata as data indicating a file format (for example, MXF (Material exchange Format)), data indicating the length of the body, the start position of the body, and the format of data arranged in the body, and the like are arranged. In the Header Metadata, for example, a UMID (Unique Material Identifier), a beginning time code, file creation date, information related to data arranged in the body (for example, image pixel count, aspect ratio, and the like), and the like are arranged.

It should be noted that a UMID refers to a unique identifier for a file which is used for identifying each individual file in a globally unique manner and which is specified by the SMPTE (Society of Motion Picture and Television Engineers). That is, a UMID added to material data indicates that the material in question is unique in the world.

In the Index Table, data for managing data arranged in the body, and the like are arranged. The footer is made up of Footer Partition Pack. Data for identifying the footer and the like are arranged in the Footer Partition Pack.

As shown in FIG. 5B, in the body of a clip file, System Item in which one frame of metadata to be processed in real time (hereinafter, referred to as real-time metadata) is arranged, image data coded in the MPEG (Moving Picture Experts Group) IMX format called D10, and uncompressed sound data in the AES (Audio Engineering Society) 3 format are arranged while being KLV-coded into a KLV (Key, Length, Value) structure.

The KLV structure is a structure in which Key, Length, and Value are arranged sequentially from the beginning. Arranged in the Key is a 16-byte label conforming to the SMPTE 298M standard and indicating the type of data arranged in the Value. Arranged in the Length is the data length of the data arranged in the Value. Arranged in the Value is real data, which in this example is the System Item, image data, or sound data.

The data lengths of the KLV-coded System Item, image data, and sound data are fixed lengths based on KAG (KLV Alignment Grid). To make the KLV-coded System Item, image data, and sound data fixed lengths, Filler as stuffing data is also converted into the KLV structure, and arranged behind each of the System Item, image data, and sound data.

FIG. 6 shows an example of electronic mark data describing electronic marks each indicating the start position and end position of speech of an undetermined speaker.

It should be noted that in the example of FIG. 6, electronic mark data is described in XML (Extensible Markup Language). Also, in FIG. 6, the numeral at the beginning of each line is added for the convenience of description and does not constitute a part of XML description. The same applies to FIGS. 13, 18, 20, 33, and 34 described later.

As shown in FIG. 6, the XML description of electronic mark data is mainly made up of an electronic mark table portion enclosed by electronic mark tables (<EssenceMark Table></EssenceMark Table>). In the example of FIG. 6, this electronic mark table portion is described on the 2nd to 11th lines.

It should be noted that the description "targetMedia="Original-Material"" on the 2nd line indicates that this electronic mark data is electronic mark data describing an electronic mark assigned to material data of a clip.

Specifically, in the electronic mark table portion, pieces of information of all electronic marks assigned to material data of clips are collectively described in the form of a list. In the example of FIG. 6, the Essencemark element corresponds to each electronic mark, the value attribute represents a characteristic feature indicated by an electronic mark, and the frameCount attribute represents the frame count from the beginning of a clip, at an assigned position where an electronic mark is assigned.

For example, the description "EssenceMark value="Speaker-X:start"frameCount="0""" on the 3rd line in FIG. 6 indicates that the characteristic feature indicated by this electronic mark is the start position of speech of an undetermined speaker, and the assigned position of the electronic mark is the 0th frame from the beginning of a clip.

Also, the description "EssenceMark value="Speaker-X:end"frameCount="564"" on the 4th line in FIG. 6 indicates that the characteristic feature indicated by this electronic mark is the end position of speech of an undetermined speaker, and the assigned position of the electronic mark is the 564th frame from the beginning of a clip.

Likewise, the descriptions "EssenceMark value="Speaker-X:start"frameCount="564"" on the 5th line, "EssenceMark value="Speaker-X:start"frameCount="924"" on the 7th line, and "EssenceMark value="Speaker-X:start-"frameCount="1804"" on the 9th line indicate that the characteristic feature indicated by each of these electronic marks is the start position of speech of an undetermined speaker, and the assigned positions of the electronic marks are the 564th frame, 924th frame, and 1804th frame from the beginning of a clip, respectively.

Also, the descriptions "EssenceMark value="Speaker-X:end"frameCount="924"" on the 6th line, "EssenceMark value="Speaker-X:end"frameCount="1804"" on the 8th line, and "EssenceMark value="Speaker-X:end"frameCount="2100"" on the 10th line indicate that the characteristic feature indicated by each of these electronic marks is the end position of speech of an undetermined speaker, and the assigned positions of the electronic marks are respectively the 924th frame, 1804th frame, and 2100th frame from the beginning of a clip.

Next, referring to FIG. 7, a description will be given of a shooting operation performed using the video camera 21 by the user.

The table of FIG. 7 describes, in association with the number of each step of shooting operation, the contents of shooting operation in that step, the contents of main processing by the video camera 21, and data to which the processing is applied.

As shown in FIG. 7, in step S11, the user operates the operating section 77 to command the start of shooting. At this time, the control section 91 of the video camera 21 creates an NRT file (see FIG. 4) of a clip on the optical disc 31. Also, the control section 91 creates a clip file on the optical disc 31. Further, the control section 91 starts recording of material data supplied from the image input I/F 60 and the sound input I/F 61 into the clip file, and starts supply of the sound data of the material data to the determining section 92.

The determining section 92 detects continuation for a predetermined time or more of a state in which the level of sound data supplied from the control section 91 is equal to a predetermined threshold or more. Then, when a state in which the level of sound data is equal to a predetermined threshold or more has continued for a predetermined time or more, the determining section 92 determines that the sound data is sound data at the start of speech of an undetermined speaker in a television material, and supplies a frame number corresponding to the start point of the continuation segment to the creating section 93.

On the basis of the frame number corresponding to sound data at the start of speech of an undetermined speaker supplied from the determining section 92, the creating section 93 creates an electronic mark assigned to the frame of that frame number and indicating the start position of speech of an undetermined speaker as a characteristic feature of sound (hereinafter, referred to as speaker-undetermined EM(start)). Then, the creating section 93 describes the speaker-undetermined EM(start) into the electronic mark data of the NRT file of the clip.

Also, the determining section 92 detects continuation for a predetermined time or more of a state in which the level of sound data is less than a predetermined threshold. Then, when a state in which the level of sound data is less than a predetermined threshold has continued for a predetermined time or more, the determining section 92 determines that the sound data is sound data at the end of speech of an undetermined speaker in a television material, and supplies a frame number corresponding to the start point of the continuation segment to the creating section 93.

On the basis of the frame number corresponding to sound data at the end of speech of an undetermined speaker supplied from the determining section 92, the creating section 93 creates an electronic mark assigned to the frame of that frame number and indicating the end position of speech of an undetermined speaker as a characteristic feature of a sound (hereinafter, referred to as speaker-undetermined EM(end)). Then, the creating section 93 describes the speaker-undetermined EM(end) into the electronic mark data of the NRT file of the clip.

In step S12, the user operates the operating section 77 to command the end of shooting. At this time, the control section 91 ends the recording of material data into the clip file, and ends the supply of the sound data of the material data to the determining section 92.

Next, referring to the flowchart of FIG. 8, a shooting process by the shooting processing section 90 shown in FIG. 3 will be described. This shooting process is started when, for example, the user commands the start of shooting by operating the operating section 77.

In step S31, the control section 91 of the shooting processing section 90 creates an NRT file of a clip on the optical disc 31. In step S32, the control section 91 creates a clip file on the optical disc 31. In step S33, the control section 91 starts recording of material data supplied from the image input I/F 60 and the sound input I/F 61 into the clip file. Also, the control section 91 starts supply of the sound data of the material data to the determining section 92.

In step S34, the determining section 92 determines whether or not a state in which the level of sound data supplied from the control section 91 is equal to a threshold or more has continued for a predetermined time or more, that is, whether or not the level of sound data has been equal to a threshold or more for a predetermined time or more. If it is determined in step S34 that a state in which the level of sound data is equal to a threshold or more has not continued for a predetermined time or more, the determining section 92 waits until a state in which the level of sound data is equal to a threshold or more continues for a predetermined time or more.

If it is determined in step S34 that a state in which the level of sound data is equal to a threshold or more has continued for a predetermined time or more, the determining section 92 determines that the sound data is sound data at the start of speech of an undetermined speaker in a television material, and supplies a frame number corresponding to the start point of the continuation segment to the creating section 93.

Then, in step S35, on the basis of the frame number corresponding to sound data at the start of speech of an undetermined speaker supplied from the determining section 92, the creating section 93 creates a speaker-undetermined EM(start) to be assigned to the frame of that frame number, and describes the speaker-undetermined EM(start) into the electronic mark data of the NRT file of the clip.

In step S36, the determining section 92 determines whether or not a state in which the level of sound data supplied from the control section 91 is less than a threshold has continued for a predetermined time or more, that is, whether or not the level of sound data has been less than a threshold for a predetermined time or more. If it is determined in step S36 that a state in which the level of sound data is less than a threshold has not continued for a predetermined time or more, the determining section 92 waits until a state in which the level of sound data is less than a threshold continues for a predetermined time or more.

On the other hand, if it is determined in step S36 that a state in which the level of sound data is less than a threshold has continued for a predetermined time or more, the determining section 92 determines that the sound data is sound data at the end of speech of an undetermined speaker in a television material, and supplies a frame number corresponding to the start point of the continuation segment to the creating section 93.

Then, in step S37, on the basis of the frame number corresponding to sound data at the end of speech of an undetermined speaker supplied from the determining section 92, the creating section 93 creates a speaker-undetermined EM(end) to be assigned to the frame of that frame number, and describes the speaker-undetermined EM(end) into the electronic mark data of the NRT file of the clip.

In step S38, the control section 91 determines whether or not the end of shooting has been commanded by the user, on the basis of an operation signal from the operating section 77. If it is determined in step S38 that the end of shooting has not been commanded, the processing returns to step S34, and the above-mentioned processing is repeated.

If it is determined in step S38 that the end of shooting has been commanded by the user, in step S39, the control section 91 ends the recording of material data into the clip file. Also, the control section 91 ends the supply of the sound data of the material data to the determining section 92. Then, the processing ends.

In this way, if the level of sound data has been equal to a threshold or more for a predetermined time or more, or if the level of sound data has been less than a threshold for a predetermined time or more, the video camera 21 assigns a speaker-undetermined EM(start) or a speaker-undetermined EM(end) to the frame corresponding to the sound data. This makes it possible for the editing device 41 described later to easily recognize the start position and end position of speech on the basis of the speaker-undetermined EM(start) and the speaker-undetermined EM(end).

Figure 9:
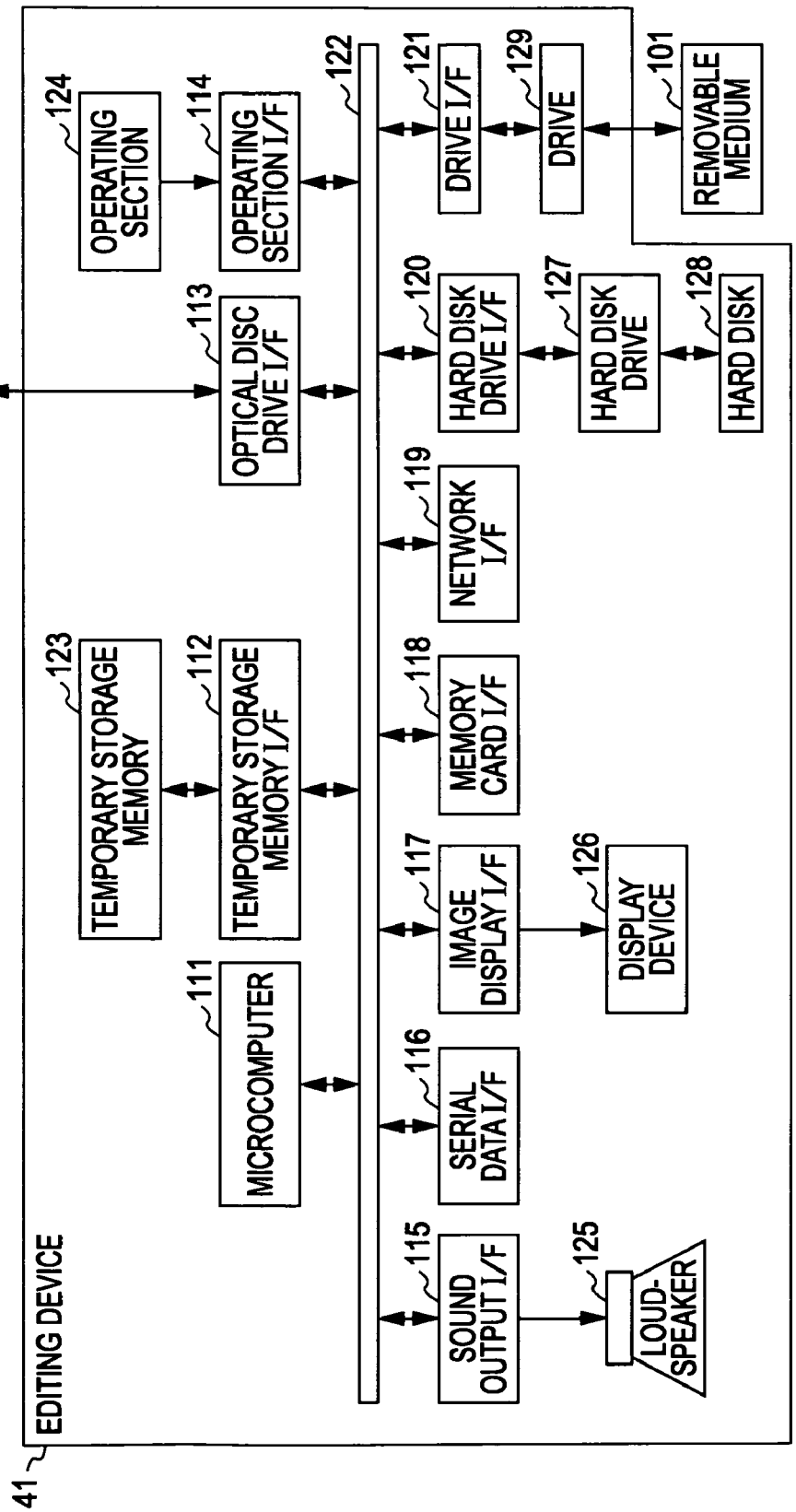
FIG. 9 is a block diagram showing an example of the hardware configuration of an editing device shown in FIG. 1.

FIG. 9 is a block diagram showing an example of the hardware configuration of the editing device 41 shown in FIG. 1.

In the editing device 41 shown in FIG. 9, a microcomputer 111, a temporary storage memory I/F 112, an optical disc drive I/F 113, an operating section I/F 114, a sound input I/F 115, a serial data I/F 116, an image display I/F 117, a memory card I/F 118, a network I/F 119, a hard disk drive I/F 120, and a drive I/F 121 are connected to a system bus 122.

The microcomputer 111 includes a CPU, a ROM, and a RAM. The CPU of the microcomputer 111 controls the respective sections of the editing device 41 in accordance with a program recorded in the ROM or a hard disk 128, in response to an operation signal or the like from the operating section I/F 114.

For example, the CPU supplies clips read from the optical disc 31 or the optical disc 32 mounted in the optical disc drive 41A and supplied from the optical disc drive I/F 113, to the temporary storage memory I/F 112. Also, the CPU supplies clips recorded on the optical disc 32 and supplied from the temporary storage memory I/F 112, to the optical disc drive 41A via the optical disc drive I/F 113, and compiles the clips onto the optical disc 31.

Further, the CPU performs nondestructive editing by creating an edit list in response to an operation signal. The CPU supplies the edit list to the optical disc drive 41A via the optical disc drive I/F 113, and records the edit list onto the optical disc 31.

Also, in response to an operation signal, the CPU adds a speaker ID as speaker-unique information inputted by the user, to a speaker-undetermined EM(start) and a speaker-undetermined EM(end), which are described in the electronic mark data of a clip supplied from the temporary storage memory I/F 112. Then, the CPU supplies electronic mark data describing a speaker EM(start) that is the speaker-undetermined EM(start) with the speaker ID added thereto, and a speaker EM(end) that is the speaker-undetermined EM(end) with the speaker ID added thereto, to the optical disc drive I/F 113, and records the electronic mark data into an NRT file of a clip on the optical disc 31.

Further, the CPU creates electronic mark data of the edited result on the basis of the edit list and the electronic mark data of the NRT file of the clip. Then, the CPU supplies the electronic mark data to the optical disc drive I/F 113 for recording onto the optical disc 31.

Also, on the basis of an operation signal and electronic mark data of the edited result, the CPU changes the edit list in such a way that duck voice processing is applied to the speech of a speaker with a speaker ID specified by the user, of the sound of the edited result.

Further, the CPU supplies the sound data of a clip supplied from the temporary storage memory I/F 112 to the sound output I/F 115 via the system bus 122, and causes the sound of the clip to be outputted from a loudspeaker 125. Also, the CPU supplies the image data of a clip supplied from the temporary storage memory I/F 112 to the image display I/F 117 via the system bus 122, and causes the image of the clip to be displayed on a display device 126. A program, data, and the like to be executed by the CPU are stored in the RAM as appropriate.

The temporary storage memory I/F 112 is connected with a temporary storage memory 123 such as a buffer. The temporary storage memory I/F 112 stores a clip recorded on the optical disc 31 or the optical disc 32 and supplied from the microcomputer 111, into the temporary storage memory 123. Also, the temporary storage memory I/F 112 reads a clip stored in the temporary storage memory 123, and supplies the clip to the microcomputer 111.

The optical disc drive I/F 113 is connected with the optical disc drive 41A in which the optical disc 31 or the optical disc 32 is mounted. The optical disc drive I/F 113 controls the optical disc drive 41A to read a clip from the optical disc 31 or the optical disc 32 mounted in the optical disc drive 41A, and supplies the clip to the temporary storage memory I/F 112 via the system bus 122.

Also, the optical disc drive I/F 113 controls the optical disc drive 41A to record a clip recorded on the optical disc 32, an edit list, electronic mark data describing a speaker EM(start) and a speaker EM(end), and electronic mark data of the edited result, which are supplied from the microcomputer 111, onto the optical disc 31.

The operating section I/F 114 is connected with an operating section 124 such as a receiving section for receiving a command transmitted from an operation button, a keyboard, a mouse, or a remote controller. In response to a user's operation on the operating section 124, the operating section I/F 114 generates an operation signal indicative of the operation, and supplies the operation signal to the microcomputer 111 via the system bus 122.

The sound output I/F 115 is connected with the loudspeaker 125. The sound output I/F 115 applies D/A conversion to sound data supplied from the microcomputer 111, and amplifies the resulting analog signal and supplies the amplified analog signal to the loudspeaker 125. The loudspeaker 125 outputs a sound to the outside on the basis of the analog signal from the sound output I/F 115. It should be noted that a configuration is also possible in which the sound output I/F 115 supplies sound data to the loudspeaker 125 as it is, and the loudspeaker 125 performs D/A conversion or the like and outputs a sound to the outside on the basis of the resulting analog signal.

The serial data I/F 116 exchanges data with digital equipment such as an external computer (not shown) as necessary. The image display I/F 117 is connected with the display device 126. The image display I/F 117 applies D/A conversion to image data from the microcomputer 111, and amplifies the resulting analog signal such as a composite signal or component signal and supplies the amplified analog signal to the display device 126. The display device 126 displays an image on the basis of the analog signal from the image display I/F 117.

It should be noted that a configuration is also possible in which the image display I/F 117 supplies image data to the display device 126 as it is, and the display device 126 performs D/A conversion or the like and outputs an image to the outside on the basis of the resulting analog signal.

The memory card I/F 118 reads and writes material data, various kinds of setting data, and the like with respect to a memory card (not shown) mounted in the editing device 41, as necessary. The network I/F 119 exchanges data with another device connected via a wired or wireless network such as the Internet or the local area network, as necessary.

For example, the network I/F 119 acquires a program from another device via a network, and records the program onto the hard disk 128 via the system bus 122, the hard disk drive I/F 120, and a hard disk drive 127.

The hard disk drive I/F 120 is connected with the hard disk drive 127 in which the hard disk 128 is mounted. The hard disc drive I/F 120 controls the hard disk drive 127 to perform reading and writing of data with respect to the hard disk 128. For example, the hard disk drive I/F 120 controls the hard disk drive 127 to record a program supplied via the network I/F 119 and the system bus 122 onto the hard disk 128.

The drive I/F 121 is connected with a drive 129. The drive I/F 121 controls the drive 129, drives a removable medium 101 such as a magnetic disc, an optical disc, a magneto-optical disc, or a semiconductor memory when the removable medium 101 is mounted in the drive 129, and acquires a program, data, or the like recorded on the removable medium 101. As necessary, the acquired program or data is transferred to and recorded on the hard disk 128 via the hard disk drive I/F 120 or the like.

The system bus 122 mediates exchange of data between the respective sections connected to the system bus 122.

Next, in the editing device 41 shown in FIG. 9, the microcomputer 111 serves as an editing processing section that edits the image with sound of a television material by executing a predetermined program.

Figure 10:
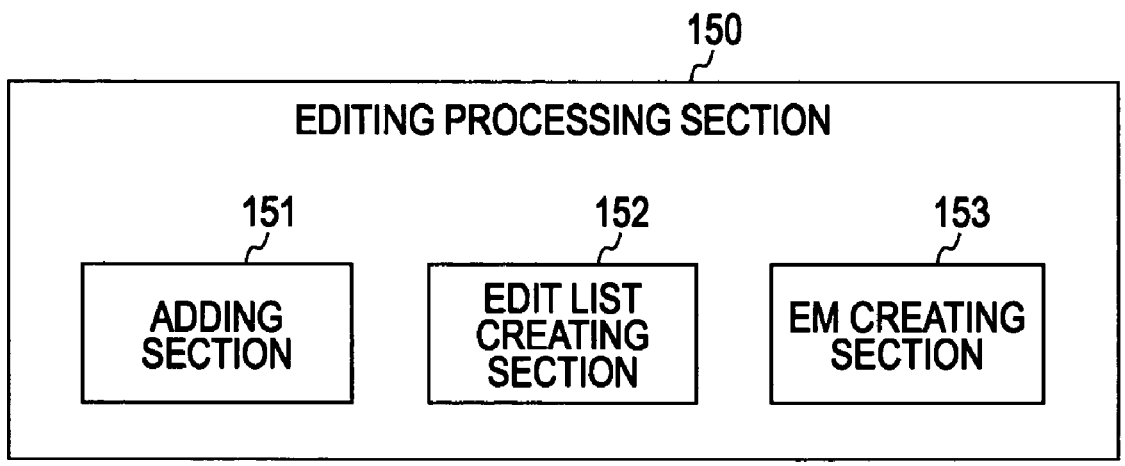
FIG. 10 is a block diagram showing an example of the functional configuration of a shooting processing section of the editing device shown in FIG. 9.

FIG. 10 shows an example of the functional configuration of such an editing processing section 150.

The editing processing section 150 shown in FIG. 10 includes an adding section 151, an edit list creating section 152, and an EM creating section 153.

The adding section 151 reads a speaker list which is recorded on the hard disk 128 and in which speaker IDs and the names of speakers are associated with each other. The adding section 151 generates image data of an input screen (FIG. 12 described later) for inputting a speaker ID, on the basis of the speaker list. The adding section 151 supplies the image data of the input screen to the image display I/F 117, and causes the input screen to be displayed on the display device 126.

Also, in response to an operation signal supplied from the operating section I/F 114 by the user operating the operating section 124 on the input screen, the adding section 151 adds a speaker ID corresponding to the operation signal to a speaker-undetermined EM(start) and a speaker-undetermined EM(end) that are described in the electronic mark data of a clip supplied from the temporary storage memory I/F 112. Then, the EM creating section 153 supplies the electronic mark data to which the speaker ID has been added, to the optical disc drive I/F 113 for recording into an NRT file on the optical disc 31.

The edit list creating section 152 supplies clips read from the optical disc 31 or the optical disc 32 and supplied from the optical disc drive I/F 113, to the temporary storage memory I/F 112. Also, the edit list creating section 152 supplies clips recorded on the optical disc 32 and supplied from the temporary storage memory I/F 112, to the optical disc drive 113, and compiles the clips onto the optical disc 31.

Further, the edit list creating section 152 supplies the sound data of proxy data supplied from the temporary storage memory I/F 112 to the sound output I/F 115, and causes the sound of a clip to be outputted from the loudspeaker 125. Also, the edit list creating section 152 supplies the image data of proxy data to the image display I/F 117, and causes a low-resolution image of a clip to be displayed on the display device 126 as an editing screen for performing editing. At this time, the user performs an editing operation by operating the operating section 124 while listening to the sound from the loudspeaker 125 and looking at the editing screen.

The edit list creating section 152 performs nondestructive editing by creating an edit list, in response to an operation signal that is supplied from the operating section I/F 114 due to a user's editing operation. Then, the edit list creating section 152 supplies the edit list to the optical disc drive I/F 113 for storage onto the optical disc 31, and also supplies the edit list to the EM creating section 153.

Also, on the basis of an operation signal supplied from the operating section I/F 114, and electronic mark data of the edited result supplied from the EM creating section 153, the edit list creating section 152 changes the edit list in such a way that duck voice processing is applied to the speech of a speaker with a speaker ID specified by the user, of the sound of the edited result.

The EM creating section 153 creates electronic mark data of the edited result on the basis of the edit list supplied from the edit list creating section 152, and electronic mark data of a clip, which is stored in the temporary storage memory I/F 112. Then, the EM creating section 153 supplies the electronic mark data to the optical disc drive I/F 113 for recording onto the optical disc 31, and also supplies the electronic mark data to the edit list creating section 152.

Also, in response to an operation signal supplied from the operating section I/F 114, the EM creating section 153 adds information indicating whether or not duck voice processing is applied, to a speaker EM(start) and a speaker EM(end) to which a speaker ID specified by the user has been added and which are described in the electronic mark data of the edited result.

Figure 11:
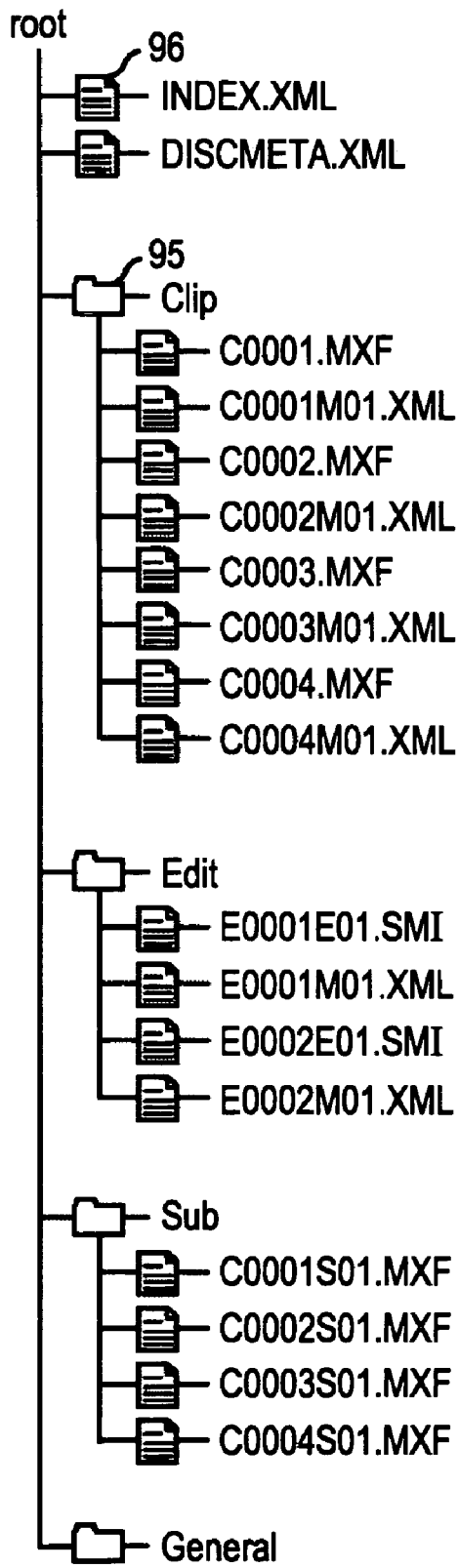
FIG. 11 is a diagram showing an example of the directory structure of files recorded on an optical disc to which nondestructive editing has been performed.

FIG. 11 shows an example of the directory structure of files recorded on the optical disc 31 after nondestructive editing.

It should be noted that in FIG. 11, the same reference numerals are attached to the same components as those in FIG. 4, and hence description thereof is omitted to avoid repetition.

In the example of FIG. 11, on the optical disc 31, there are provided the index file (INDEX.XML) 96 and a disc metadata file (DISCMETA.XML). In the index file 96 in FIG. 11, not only information for managing clips but also information for edit list management is described.

Also, on the optical disc 31, there are provided the clip directory (Clip) 95, an edit list directory (Edit) under which edit list files are provided, and a proxy directory (Sub).

In the example of FIG. 11, pieces of data on four clips shot by the video camera 21 or the video camera 22 are compiled on the optical disc 31.

That is, for example, under the clip directory 95, there are provided a first clip file (C0001.MXF) and a first NRT file (C0001M01.XML), a second clip file (C0002.MXF) and a second NRT file (C0002M01.XML), and a third clip file (C0003.MXF) and a third NRT file (C0003M01.XML) which are shot by the video camera 21, and a fourth clip file (C0004.MXF) and a fourth NRT file (C0004M01.XML) shot by the video camera 22.

In FIG. 11, in the edit directory (Edit) shown below the clip directory 95 mentioned above, edit lists are recorded as files that differ for each editing process.

For example, in the example of FIG. 11, under the edit directory (Edit), there are provided an edit list file (E0001E01.SMI) that is a file containing edit lists related to the edited result of the first editing process of the first to fourth clips recorded on the optical disc 31, and an NRT file for edit list (E0001M01.XML) that is a file containing NRT data corresponding to material data constituting the first edited result, or NRT data newly generated on the basis of that NRT data. Likewise, there are provided an edit list file (E0002E01.SMI) and an NRT file for edit list (E0002M01.XML) for the second editing process.

Also, in FIG. 11, pieces of proxy data on four clips recorded on the optical disc 31 are compiled into the proxy directory (Sub) shown below the clip directory (Clip) mentioned above.

For example, in the example of FIG. 11, under the proxy directory (Sub), there are provided a proxy file of the first clip (C0001S01.MXF), a proxy file of the second clip (C0002S01.MXF), and a proxy file of the third clip (C0003S01.MXF) which are shot by the video camera 21, and a proxy file of the fourth clip (C0004S01.MXF) shot by the video camera 22.

Further, on the optical disc 31, there is provided a general directory (General). Files of data other than clips are provided in the general directory (General).

Next, FIG. 12 shows an example of an input screen.

The input screen shown in FIG. 12 displays speaker IDs and the names of speakers in association with each other. In the example of FIG. 12, "Speaker-A" indicating a speaker ID "A" and the name of a speaker "◯◯", "Speaker-B" indicating a speaker ID "B" and the name of a speaker "××", and "Speaker-C" indicating a speaker ID "C" and the name of a speaker "ΔΔ" are displayed in association with each other, respectively.

Also, a cursor 160 is placed at the display position of one of the speaker IDs and speaker names. The cursor 160 is operated when adding a speaker ID to a speaker-undetermined EM(start) and a speaker-undetermined EM(end).

Specifically, the user operates the operating section 124 while listening to the sound of a clip outputted from the loudspeaker 125, for example, moves the cursor 160 to the display position of the speaker ID and name of the speaker who uttered the sound, and provides a determination command. In response to an operation signal indicative of this operation, the adding section 151 adds a speaker ID corresponding to the position of the cursor 160 to a speaker-undetermined EM(start) assigned immediately before a frame corresponding to the sound being played back at the time of the determination command, and to a speaker-undetermined EM(end) assigned immediately after the frame.

Next, FIG. 13 shows an example of electronic mark data describing speaker EMs(start) or speaker EMs(end). It should be noted that FIG. 13 shows electronic mark data describing speaker EMs(start) and speaker EMs(end) that are the speaker-undetermined EMs(start) and speaker-undetermined EMs(end) shown in FIG. 6 to which speaker IDs have been added.

In the example of FIG. 13, an electronic mark table portion enclosed by electronic mark tables (<EssenceMark Table></EssenceMark Table>) is described on the 2nd to 11th lines.

"targetMedia="Original-Material"" on the 2nd line in FIG. 13 indicates that this electronic mark data is electronic mark data describing an electronic mark assigned to the material data of a clip.

Also, the description "EssenceMark value="Speaker-A: start"frameCount="0"" on the 3rd line indicates that the characteristic feature indicated by this electronic mark is the start position of speech by a speaker with a speaker ID "A", and the assigned position of the electronic mark is the 0th frame from the beginning of a clip. That is, the description on the 3rd line in FIG. 13 indicates a speaker EM(start) with the speaker ID "A" added to the speaker-undetermined EM(start) indicated by the description on the 3rd line in FIG. 6.

Also, the description "EssenceMark value="Speaker-A: end"frameCount="564"" on the 4th line indicates that the characteristic feature indicated by this electronic mark is the end position of speech by a speaker with a speaker ID "A", and the assigned position of the electronic mark is the 564th frame from the beginning of a clip.

Likewise, the descriptions "EssenceMark value="Speaker-B:start"frameCount="564"" on the 5th line, "EssenceMark value="Speaker-A:start"frameCount="924"" on the 7th line, and "EssenceMark value="Speaker-B:start-"frameCount="1804"" on the 9th line indicate that the characteristic features indicated by these electronic marks are the start positions of speech by a speaker with a speaker ID "B", a speaker with a speaker ID "A", and a speaker with a speaker ID "B", respectively, and the assigned positions of the electronic marks are the 564th frame, 924th frame, and 1804th frame from the beginning of a clip, respectively.

Also, the descriptions "EssenceMark value="Speaker-B: end"frameCount="924"" on the 6th line, "EssenceMark value="Speaker-A:end"frameCount="1804"" on the 8th line, and "EssenceMark value="Speaker-B:end"frameCount="2100"" on the 10th line indicate that the characteristic features indicated by these electronic marks are the end positions of speech by a speaker with a speaker ID "B", a speaker with a speaker ID "A", and a speaker with a speaker ID "B", respectively, and the assigned positions of the electronic marks are the 924th frame, 1804th frame, and 2100th frame from the beginning of a clip, respectively.

Next, referring to FIGS. 14A to 20, nondestructive editing in the editing device 41 will be described.

It should be noted that in this example, the video camera 21 shoots two persons, a speaker "◯◯" with a speaker ID "A" and a speaker "××" with a speaker ID "B", as subjects and acquires the sound of their dialogue, and the video camera 22 shoots only the speaker "xx" as a subject. Thus, a dialogue between two speakers is shot as a television material using the two video cameras 21 and 22.

Then, the user cuts out the sound of a predetermined continuous segment of the television material for use as the sound of the edited result and also cuts out the image of a predetermined segment for use as the image of the edited result, and performs nondestructive editing in such a way as to apply duck voice processing to the speech of the speaker "xx".

First, referring to FIGS. 14A and 14B and FIG. 15, a description will be given of clips to be edited which are recorded on the optical disc 31, and the edited result. It should be noted that in FIG. 14A, the horizontal axis represents the shooting time, and in FIGS. 14B and 15, the horizontal axis represents the frame number.

Figure 14A:
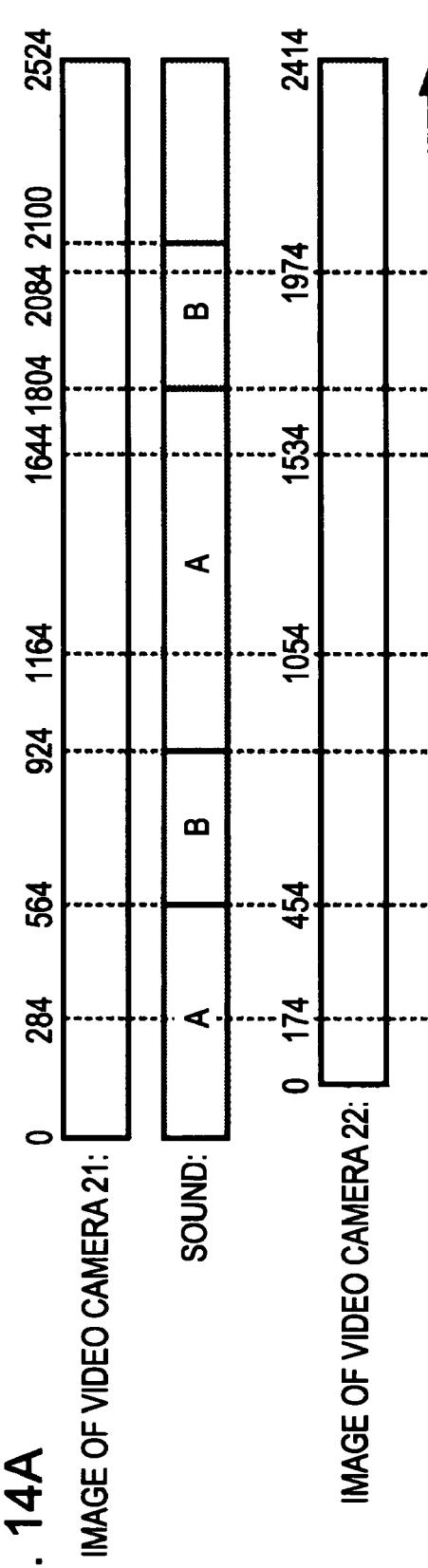
FIGS. 14A and 14B are diagrams illustrating clips to be edited and the edited result.

The bar at the top of FIG. 14A represents the length of the first clip to be edited which is shot by the video camera 21, and each numeral described above the bar represents the frame number of an image shot at the shooting time corresponding to its described position. That is, in the example of FIGS. 14A and 14B, the frame count of the image of the first clip is 2525 frames, and frame numbers are assigned to the individual frames in order from "0" to "2524".

The bar at the middle of FIG. 14A represents the length of the sound of the first clip, and each alphabet within the bar indicates the speaker ID of a speaker who uttered the sound corresponding to that position.

Figure 14B:
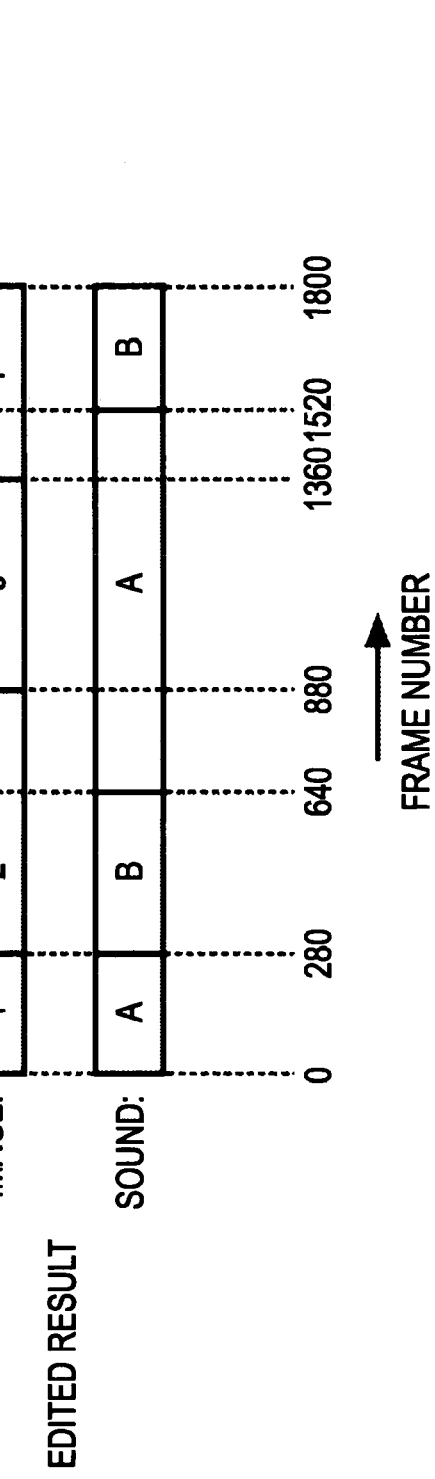

It should be noted that in the example of FIGS. 14A and 14B, the speaker EMs(start) and the speaker EMs(end) shown in FIG. 13 are assigned to the first clip. Accordingly, in the bar at the middle of FIG. 14A, at the position corresponding to a segment from the frame number "0" of the frame to which the speaker EM(start) indicated by the description on the 3rd line in FIG. 13 is assigned, to the frame number "564" of the frame to which the speaker EM(end) indicated by the description on the 4th line in FIG. 13 is assigned, the speaker ID "A" of the speaker of the sound in that segment is described.

Likewise, in the bar at the middle of FIG. 14A, at the position corresponding to a segment from the frame number "564" of the frame to which the speaker EM(start) indicated by the description on the 5th line in FIG. 13 is assigned, to the frame number "924", of the frame to which the speaker EM(end) indicated by the description on the 6th line in FIG. 13 is assigned, the speaker ID "B" of the speaker of the sound in that segment is described.

Also, in the bar at the middle of FIG. 14A, at the position corresponding to a segment from the frame number "924" of the frame to which the speaker EM(start) indicated by the description on the 7th line in FIG. 13 is assigned, to the frame number "1804" of the frame to which the speaker EM(end) indicated by the description on the 8th line in FIG. 13 is assigned, the speaker ID "A" of the speaker of the sound in that segment is described.

Further, in the bar at the middle of FIG. 14A, at the position corresponding to a segment from the frame number "1804", of the frame to which the speaker EM(start) indicated by the description on the 9th line in FIG. 13 is assigned, to the frame number "2100" of the frame to which the speaker EM(end) indicated by the description on the 10th line in FIG. 13 is assigned, the speaker ID "B" of the speaker of the sound in that segment is described.

The bar at the bottom of FIG. 14A represents the length of the image of the fourth clip to be edited which is shot by the video camera 22, and each numeral described above the bar represents the frame number of an image shot at the shooting time corresponding to its described position. That is, in the example of FIGS. 14A and 14B, the frame count of the image of the fourth clip is 2415 frames, and frame numbers are assigned to the individual frames in order from "0" to "2414".

The bar at the top of FIG. 14B represents the length of the image of the edited result obtained as a result of nondestructive editing performed with respect to the first clip and the fourth clip shown in FIG. 14A, and each numeral described above the bar represents the frame number of an image on the edited result corresponding to its described position.

That is, in the example of FIGS. 14A and 14B, the user specifies the frame number "284" of the first clip shown in FIG. 14A as the In point of image, and specifies the frame number "564" as the Out point of image. Thus, as shown at the top of FIG. 14B, in the edited result, the image data in an editing segment from the frame numbers "284" to "564" of the first clip is included as image data from the frame numbers "0" to "280" of the edited result (hereinafter, referred to as first image sub-clip).

Also, in the example of FIGS. 14A and 14B, the user specifies the frame number "454" of the fourth clip shown in FIG. 14A as the In point of image, and specifies the frame number "1054" as the Out point of image. Thus, as shown at the top of FIG. 14B, in the edited result, the image data in an editing segment from the frame numbers "454" to "1054" of the fourth clip is included as image data from the frame numbers "280" to "880" of the edited result (hereinafter, referred to as second image sub-clip).

Further, in the example of FIGS. 14A and 14B, the user specifies the frame number "1164" of the first clip shown in FIG. 14A as the In point of image, and specifies the frame number "1644" as the Out point of image. Thus, as shown at the top of FIG. 14B, in the edited result, the image data in an editing segment from the frame numbers "1164" to "1644" of the first clip is included as image data from the frame numbers "880" to "1360" of the edited result (hereinafter, referred to as third image sub-clip).

Also, in the example of FIGS. 14A and 14B, the user specifies the frame number "1534" of the fourth clip shown in FIG. 14A as the In point of image, and specifies the frame number "1974" as the Out point of image. Thus, as shown at the top of FIG. 14B, in the edited result, the image data in an editing segment from the frame numbers "1534" to "1974" of the fourth clip is included as image data from the frame numbers "1360" to "1800", of the edited result (hereinafter, referred to as fourth image sub-clip).

Further, in the example of FIGS. 14A and 14B, the user specifies the frame number "284" of the first clip shown in FIG. 14A as the In point of sound, and specifies the frame number "2084" as the Out point of sound. Thus, as shown at the bottom of each of FIG. 14B and FIG. 15, in the edited result, the sound data in an editing segment from the frame numbers "284" to "2084" of the first clip is included as sound data from the frame numbers "0" to "1800" of the edited result (hereinafter, referred to as sound sub-clip).

Now, as shown in FIG. 14A, the speaker ID corresponding to the sound data from the frame numbers "0" to "564" of the first clip is "A". Thus, as shown at the bottom of FIG. 14B, the speaker ID corresponding to the sound data from the frame numbers "0" to "280" of the edited result, which is the sound data from the frame numbers "284" to "564" of the first clip, is "A".

Also, as shown in FIG. 14A, the speaker ID corresponding to the sound data from the frame numbers "564" to "924" of the first clip is "B". Thus, as shown at the bottom of FIG. 14B, the speaker ID corresponding to the sound data from the frame numbers "280" to "640" of the edited result, which is the sound data from the frame numbers "564" to "924" of the first clip, is "B".

Further, as shown in FIG. 14A, the speaker ID corresponding to the sound data from the frame numbers "924" to "1804" of the first clip is "A". Thus, as shown at the bottom of FIG. 14B, the speaker ID corresponding to the sound data from the frame numbers "640" to "1520" of the edited result, which is the sound data from the frame numbers "924" to "1804" of the first clip, is "A".

Also, as shown in FIG. 14A, the speaker ID corresponding to the sound data from the frame numbers "1804" to "2100" of the first clip is "B". Thus, as shown at the bottom of FIG. 14B, the speaker ID corresponding to the sound data from the frame numbers "1520" to "1800" of the edited result, which is the sound data from the frame numbers "1804" to "2084" of the first clip, is "B".

As described above, in the example of FIGS. 14A and 14B, the In point and Out point of the third image sub-clip, and the switching points of speakers differ from each other. That is, in the edited result shown in FIG. 14B, as shown in FIG. 15, the image of only the speaker "xx" is displayed at the beginning and end of speech of the speaker "○○", from the frame numbers "640" to "1520" of the edited result.

Figure 15:
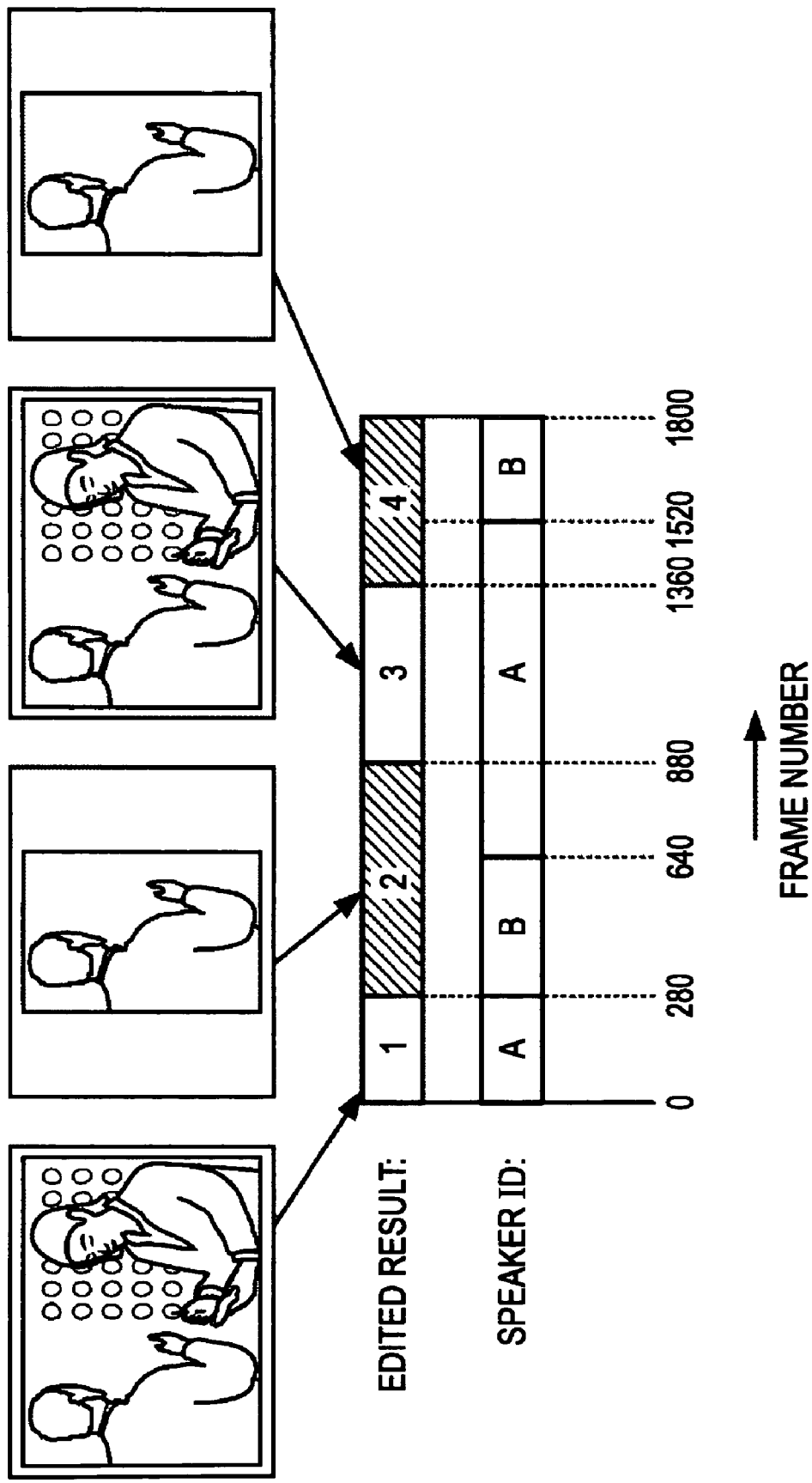
FIG. 15 is a diagram illustrating the edited result.

FIG. 16 shows the edit list of the edited result shown in FIGS. 14B and 15.

That is, FIG. 16 is a diagram showing an example of the specific description of an edit list file (FIG. 11) described in XML.

An edit list file is a file containing edit lists related to the edited result, and also describes the method of playing back the edited result.

As shown in FIG. 16, the XML description of an edit list file mainly includes the body portion enclosed by a smile tag (<smil></smil>) and a body tag (<body></body>). In the example of FIG. 16, the body portion is described on the 3rd to 16th lines. It should be noted that the description "name="Initial-EditList"" on the 2nd line indicates that this file is an edit list file.

In the body portion, information related to the temporal behavior of the edit description is described. In the example of FIG. 16, a "par" element described between a start tag "<par>" on the 4th line and an end tag "</par>" on the 15th line defines a simple time group for simultaneous playback of a plurality of elements.

In the example of FIG. 16, it is defined that a first cut (which in the example of FIG. 16 is described as Cut1 and is the first image sub-clip shown in FIG. 14B), a second cut (which in the example of FIG. 16 is described as Cut2 and is the second image sub-clip shown in FIG. 14B), a third cut (which in the example of FIG. 16 is described as Cut3 and is the third image sub-clip shown in FIG. 14B), a fourth cut (which in the example of FIG. 16 is described as Cut4 and is the fourth image sub-clip shown in FIG. 14B), and sound (which in the example of FIG. 16 is described as audio in Cam1-Clip.mxf and is the sound sub-clip shown in FIG. 14B) be played back simultaneously.

It should be noted, however, that in the example of FIG. 16, as will be described later, the playback start time differs between the four, first to fourth image sub-clips, and in actuality, the first to fourth image sub-clips are played back successively.

Specifically, in FIG. 16, in a "video" element on each of the 6th, 8th, 10th, and 12th lines, a clip file to be referred to as the image of the edited result, and the playback range of the clip file to be referred to, and the like are described.

The description "src="Cam1-Clip1.mxf"" on the 6th line indicates that a clip file to be referred to is the first clip recorded with the video camera 21.

Also, the description "clipBegin="284"" on the 6th line indicates the position where playback of image is started in the first image sub-clip, by the frame number of the first clip. The description "clipBegin="564"" on the 6th line indicates the position where playback of image is ended in the first image sub-clip, by the frame number of the first clip.

Further, the description "begin="0"" on the 6th line succeeding the above description indicates the position where the first image sub-clip is started on the edited result, by the frame number on the edited result. The description "begin="280"" on the 6th line indicates the position where the first image sub-clip is ended on the edited result, by the frame number on the edited result.

In this way, in the example of FIG. 16, it is described in the edit list that the image from the frame of the frame number "284" to the frame of the frame number "564" of the first clip is played back as the image from the frame of the frame number "0" to the frame of the frame number "280" of the edited result.

Also, the second image sub-clip is described on the 8th line in a manner similar to the first image sub-clip. In the example of FIG. 16, it is described in the edit list that the image from the frame of the frame number "454" to the frame of the frame number "1054" of the fourth clip recorded with the video camera 22 is played back as the image from the frame of the frame number "280" to the frame of the frame number "880" of the edited result.

Further, the third image sub-clip is described on the 10th line in a manner similar to the first and second image sub-clips. In the example of FIG. 16, it is described in the edit list that the image from the frame of the frame number "1164" to the frame of the frame number "1644" of the first clip is played back as the image from the frame of the frame number "880" to the frame of the frame number "1360" of the edited result.

Also, the fourth image sub-clip is described on the 12th line in a manner similar to the first to third image sub-clips. In the example of FIG. 16, it is described in the edit list that the image from the frame of the frame number "1534" to the frame of the frame number "1974" of the fourth clip is played back as the image from the frame of the frame number "1360", to the frame of the frame number "1800" of the edited result.

Further, in FIG. 16, in an "audio" element on the 14th line, a clip file to be referred to as sound of the edited result, the playback range of the clip file to be referred to, and the like are described.

Also, the description "channel=1" on the 14th line indicates a channel for playing back the sound of the first clip. The description "clipBegin="284"" on the 14th line indicates the position where playback of sound is started as the sound sub-clip, by the frame number of the first clip. The description "clipEnd="2084"" on the 14th line indicates the position where playback of sound is ended as the sound sub-clip, by the frame number of the first clip.

Further, the description "begin="0"" on the 14th line succeeding the above description indicates the position where the sound sub-clip is started on the edited result, by the frame number on the edited result. The description "end="1800"" on the 14th line indicates the position where the sound sub-clip is ended on the edited result, by the frame number on the edited result.

In this way, in the example of FIG. 16, it is described in the edit list that the sound from the frame of the frame number "284" to the frame of the frame number "2084" is played back as the sound of one channel from the frame of the frame number "0" to the frame of the frame number "1800" of the edited result.

Therefore, according to the edit list shown in FIG. 16, as shown in FIG. 14B, the first to fourth sub-clips are played back successively as the image from the frame of the frame number "0" to the frame of the frame number "1800" of the edited result. Also, at the same time, the sound sub-clip is played back as the sound of one channel from the frame of the frame number "0" to the frame of the frame number "1800" of the edited result.

Next, referring to FIG. 17, a description will be given of speaker EMs(start) and speaker EMs(end) assigned to the edited result shown in FIGS. 14B and 15. It should be noted that in FIG. 17, the horizontal axis represents the frame number.

Figure 17:
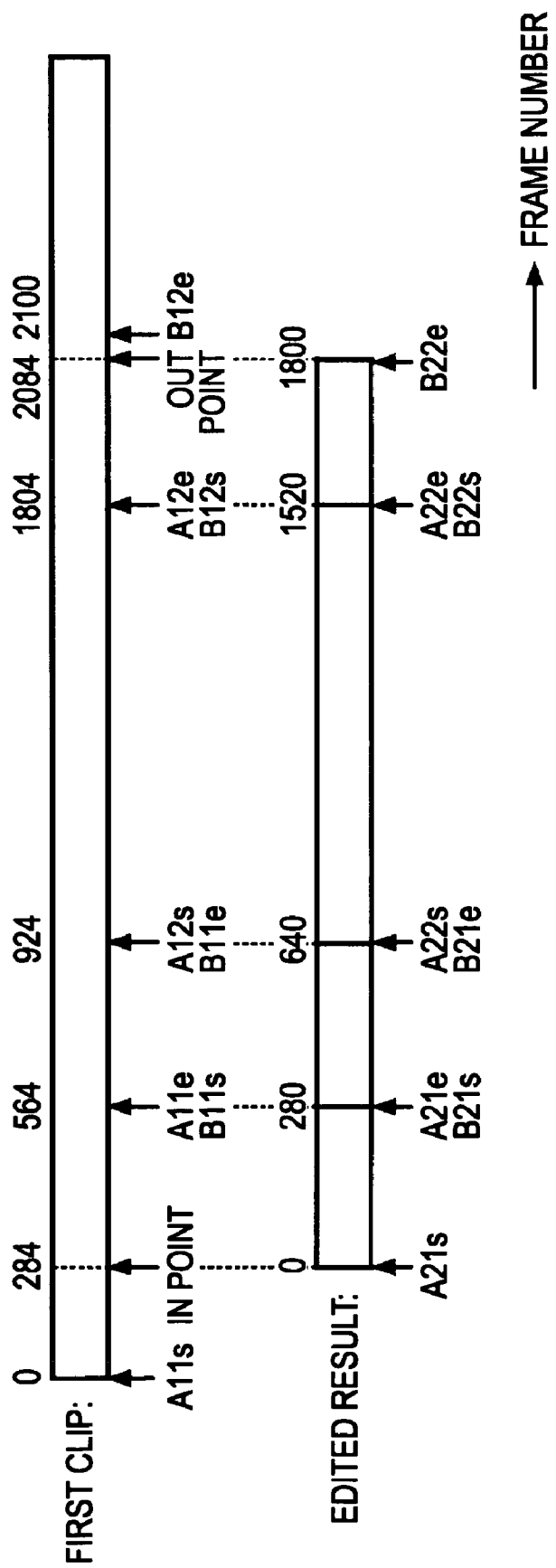
FIG. 17 is a diagram illustrating speaker EMs(start) and speaker EMs(end) assigned to the edited result shown in FIG. 15.

Shown at the top of FIG. 17 are speaker EMs(start) and speaker EMs(end) assigned to the first clip, which are described in the electronic mark data shown in FIG. 13. That is, as shown at the top of FIG. 17, a speaker EM(start) with a speaker ID "A" added to the frame of the frame number "0" is assigned (A11s) to the first clip, and a speaker EM(end) with a speaker ID "A" added to the frame of the frame number "564" is assigned (A11e) to the first clip.

Also, as shown at the top of FIG. 17, a speaker EM(start) with a speaker ID "B" added to the frame of the frame number "564" is assigned (B11s) to the first clip, and a speaker EM(end) with a speaker ID "B" added to the frame of the frame number "924", is assigned (B11e) to the first clip.

Further, as shown at the top of FIG. 17, a speaker EM(start) with a speaker ID "A" added to the frame of the frame number "924" is assigned (A12s) to the first clip, and a speaker EM(end) with a speaker ID "A" added to the frame of the frame number "1804", is assigned (A12e) to the first clip.

Also, as shown at the top of FIG. 17, a speaker EM(start) with a speaker ID "B" added to the frame of the frame number "1804", is assigned (B12s) to the first clip, and a speaker EM(end) with a speaker ID "B" added to the frame of the frame number "2100", is assigned (B12e) to the first clip.

In a case where nondestructive editing for obtaining the edited result shown in FIGS. 14B and 15 is performed with respect to the first clip to which the speaker EMs(start) and the speaker EMs(end) mentioned above are assigned, a speaker EM(start) assigned to the frame immediately preceding the frame of the frame number of the first clip which is specified as the In point of sound, is assigned to a frame on the edited result corresponding to the In point.

In the example of FIG. 17, a speaker EM(start) with a speaker ID "A" added thereto, which is assigned to the frame of the frame number "0" immediately preceding the frame of the frame number "284" of the first clip which is specified as the In point of sound, is assigned to the frame of the frame number "0" on the edited result corresponding to the In point (A21s).

Also, an electronic mark assigned to each frame from the frame of the frame number of the first clip which is specified as the In point of sound to the frame of the frame number of the first clip which is specified as the Out point of sound, is assigned to a frame on the edited result which corresponds to that frame.

In the example of FIG. 17, a speaker EM(end) to which a speaker ID "A" has been added and which is assigned to the frame of the frame number "564" located between the frame of the frame number "284" of the first clip which is specified as the In point of sound, and the frame of the frame number "2084", of the first clip which is specified as the Out point of sound, is assigned to the frame of the frame number "280" on the edited result which corresponds to that frame.

Also, a speaker EM(start) with a speaker ID "A" added thereto, and a speaker EM(end) with a speaker ID "B" added thereto, which are assigned to the frame of the frame number "924", are assigned to the frame of the frame number "640" on the edited result which corresponds to that frame (A22s, B21e). Further, a speaker EM(start) with a speaker ID "A" added thereto, and a speaker EM(end) with a speaker ID "B" added thereto, which are assigned to the frame of the frame number "1804", are assigned to the frame of the frame number "1520" on the edited result which corresponds to that frame (A22e, B22s).

Further, a speaker EM(end) assigned to the frame immediately following the frame of the frame number of the first clip which is specified as the Out point of sound, is assigned to a frame on the edited result corresponding to the Out point. In the example of FIG. 17, a speaker EM(end) with a speaker ID "B" added thereto, which is assigned to the frame of the frame number "2100" immediately following the frame of the frame number "2084" of the first clip which is specified as the Out point of sound, is assigned to the frame of the frame number "1800" on the edited result corresponding to the Out point (B22e).

The electronic mark data describing the speaker EMs(start) and the speaker EMs(end) assigned to the edited result in this way is as shown in FIG. 18.

In the example of FIG. 18, an electronic mark table portion enclosed by electronic mark tables (<EssenceMark Table></EssenceMark Table>) is described on the 2nd to 11th lines.

It should be noted that the description "targetMedia="Initial-EditList"" on the 2nd line in FIG. 18 indicates that this electronic mark data is electronic mark data describing an electronic mark assigned to the edited result.

Also, the description "EssenceMark value="Speaker-A:start"frameCount="0"" on the 3rd line indicates that the characteristic feature indicated by this electronic mark is the start position of speech by a speaker with a speaker ID "A", and the assigned position of the electronic mark is the 0th frame from the beginning of the edited result.

The description "EssenceMark value="Speaker-A:end"frameCount="280"" on the 4th line indicates that the characteristic feature indicated by this electronic mark is the end position of speech by a speaker with a speaker ID "A", and the assigned position of the electronic mark is the 280th frame from the beginning of the edited result.

Likewise, the descriptions "EssenceMark value="Speaker-B:start"frameCount="280"" on the 5th line, "EssenceMark value="Speaker-A:start "frameCount="640"" on the 7th line, and "EssenceMark value="Speaker-B:start"frameCount="1520"" on the 9th line indicate that the characteristic features indicated by these electronic marks are the start positions of speech by a speaker with a speaker ID "B", a speaker with a speaker ID "A", and a speaker with a speaker ID "B", respectively, and the assigned positions of the electronic marks are the 280th frame, 640th frame, and 1520th frame from the beginning of the edited result, respectively.

Also, the descriptions "EssenceMark value="Speaker-B:end"frameCount="640"" on the 6th line, "EssenceMark value="Speaker-A:end"frameCount="1520"" on the 8th line, and "EssenceMark value="Speaker-B:end"frameCount="1800"" on the 10th line indicate that the characteristic features indicated by these electronic marks are the end positions of speech by a speaker with a speaker ID "B", a speaker with a speaker ID "A", and a speaker with a speaker ID "B", respectively, and the assigned positions of the electronic marks are the 640th frame, 1520th frame, and 1800th frame from the beginning of the edited result, respectively.

FIG. 19 shows an example of an edit list, in a case where duck voice processing is applied to the sound of a speaker with a speaker ID "B" of the edited result shown in FIGS. 14B and 15.

In the edit list shown in FIG. 19, an audio filter portion enclosed by audio filter tags (<audioFilter></audioFilter>) is provided after the "audio" element on the 14th line shown in FIG. 16. In the audio filter portion, information specifying a segment of sound to which predetermined processing is applied is described.

Specifically, the first audio filter portion provided after the "audio" element on the 14th line is described on the 15th to 18th lines, and the second audio filter portion is described on the 19th to 22nd lines.

The description "type="duckVoice"" on the 15th line indicates that duck voice processing is applied. The description "begin="280"" on the 15th line succeeding the above description indicates the start position of the sound to which duck voice processing is applied on the edited result, by the frame number on the edited result. Since, as shown in FIG. 18, the first speaker EM(start) indicating the start position of speech of a speaker with a speaker ID "B" is assigned to the frame of the frame number "280" of the edited result, in the description "begin="280"" on the 15th line, the frame number "280" is indicated as the start position of the sound to which duck voice processing is applied on the edited result.

Also, the description "end="640"" on the 15th line indicates the end position of the sound to which duck voice processing is applied on the edited result, by the frame number on the edited result. Since, as shown in FIG. 18, the first speaker EM(end) indicating the end position of speech of a speaker with a speaker ID "B" is assigned to the frame of the frame number "640" of the edited result, in the description "end="640"" on the 15th line, the frame number "640", is indicated as the end position of the sound to which duck voice processing is applied on the edited result.

In this way, the description "begin="280"" on the 15th line and the description "end="640"" on the 15th line specifies a segment from the 280th frame to the 640th frame, which is the segment of the sound of a speaker with a speaker ID "B", as the segment to which duck voice processing is applied.

Further, in "param" elements on the 16th and 17th lines, set values of parameters related to duck voice processing are described. Specifically, the description "name="pitch"" on the 16th line indicates that the parameter for which a set value is set is the pitch. Also, the description "value="0.5"" on the 16th line indicates that the set value is 0.5.

Also, the description "name="format"" on the 17th line indicates that the parameter for which a set value is set is the format. Also, the description "value="1.0"" on the 17th line indicates that the set value is 1.0.

Likewise, on the 19th line, the frame number of the frame to which the second speaker EM(start) with a speaker ID "B" added thereto is assigned, and the frame number of the frame to which the speaker EM(end) is assigned, which are described in the electronic mark data shown in FIG. 18, are described as the start position and end position of the sound to which duck voice processing is applied, respectively.

FIG. 20 shows an example of the electronic mark data of the edited result, in a case where duck voice processing is applied to the sound of a speaker with a speaker ID "B" of the edited result shown in FIGS. 14B and 15.

In the example of FIG. 20, an electronic mark table portion enclosed by electronic mark tables (<EssenceMark Table></EssenceMark Table>) is described on the 2nd to 11th lines.

"targetMedia="Initial-EditList"" on the 2nd line in FIG. 20 indicates that this electronic mark data is electronic mark data describing an electronic mark assigned to the edited result.

Also, the description "EssenceMark value="Speaker-A: start:normal"frameCount="0"" on the 3rd line indicates that the characteristic feature indicated by this electronic mark is the start position of speech by a speaker with a speaker ID "A", the speech is outputted as it is without being subjected to duck voice processing, and the assigned position of the electronic mark is the 0th frame from the beginning of the edited result.

The description "EssenceMark value="Speaker-A:end: normal"frameCount="280"" on the 4th line indicates that the characteristic feature indicated by this electronic mark is the end position of speech by a speaker with a speaker ID "A", the speech is outputted as it is without being subjected to duck voice processing, and the assigned position of the electronic mark is the 280th frame from the beginning of the edited result.

Also, the description "EssenceMark value="Speaker-B: start:duckVoice"frameCount="280"" on the 5th line indicates that the characteristic feature indicated by this electronic mark is the start position of speech by a speaker with a speaker ID "B", the speech is outputted after being subjected to duck voice processing, and the assigned position of the electronic mark is the 280th frame from the beginning of the edited result.

The description "EssenceMark value="Speaker-B:end: duckVoice"frameCount="640"" on the 6th line indicates that the characteristic feature indicated by this electronic mark is the end position of speech by a speaker with a speaker ID "B", the speech is outputted after being subjected to duck voice processing, and the assigned position of the electronic mark is the 640th frame from the beginning of the edited result.

Likewise, the descriptions from the 7th to 10th lines indicate that duck voice processing is not applied to the speech by a speaker with a speaker ID "A" from the frame number "640" to the frame number "1520", and duck voice processing is applied to the speech by a speaker with a speaker ID "B" from the frame number "1520" to the frame number "1800".

Next, referring to FIG. 21, a description will be given of an editing operation performed by the user using the editing device 41.

The table of FIG. 21 describes, in association with the number of each step of editing operation, the contents of editing operation in that step, the contents of main processing by the editing device 41, and data to which the processing is applied.

As shown in FIG. 21, in step S51, the user mounts the optical disc 31 in the optical disc drive 41A of the editing device 41, and commands display of the input screen (FIG. 12). At this time, the adding section 151 of the editing device 41 causes the input screen to be displayed on the display device 126, on the basis of a speaker list that is registered on the hard disk 128 in advance.

In step S52, the user operates the operating section 124 to command playback of a clip recorded on the optical disc 31. At this time, the adding section 151 of the editing device 41 plays back the clip file of that clip from the optical disc 31. As a result, the sound of the clip is outputted from the loudspeaker 125, and the image is displayed on the display device 126.

In step S53, the user listens to the sound of the clip, and upon hearing the speech of each speaker, the user operates the operating section 124 to input the speaker ID of that speaker. At this time, the adding section 151 adds the inputted speaker ID to a speaker-undetermined EM(start) and a speaker-undetermined EM(end) which are respectively assigned to the frames immediately preceding and immediately following the frame corresponding to the sound being played back and which are described in the electronic mark data of the clip.

In step S54, the user commands display of an editing screen by operating the operating section 124. At this time, on the basis of proxy data of a proxy file, the edit list creating section 152 causes the editing screen to be displayed on the display device 126, and causes the sound of the clip to be outputted from the loudspeaker 125.

In step S55, the user operates the operating section 124 to perform editing by specifying the In point and Out point of image and sound on the editing screen. At this time, the edit list creating section 152 creates an edit list on the basis of the In point and Out point of image and sound specified by the user. Then, the edit list creating section 152 records the edit list into an edit list file on the optical disc 31, and supplies the edit list to the EM creating section 153.

Also, the EM creating section 153 interpolates a speaker EM(start) or a speaker EM(end) at the Cut point of sound, on the basis of the edit list supplied from the edit list creating section 152, and electronic mark data in which the speaker EM(start) and speaker EM(end) of a clip are described, and copies the speaker EM(start) or the speaker EM(end) assigned to a position from the In point to the Out point of sound, to a corresponding position on the edited result, thereby creating electronic mark data of the edited result.

That is, electronic mark data of the edited result is created by copying, of the description of electronic mark data of a clip, the description of a speaker EM(start) or a speaker EM(end) assigned to a position from the In point to the Out point of sound, changing the description at the assigned position of the speaker EM(start) or the speaker EM(end), and further newly describing a speaker EM(start) or a speaker EM(end) assigned to a position on the edited result corresponding to the Cut point of sound.

Then, the EM creating section 153 records the electronic mark data of the edited result into an NRT file for edit list on the optical disc 31.

In step S56, the user operates the operating section 124 to specify the speaker ID of the speaker of a speech to which duck voice processing is applied on the edited result. At this time, the edit list creating section 152 locates a segment to which duck voice processing is applied, on the basis of the speaker ID specified by the user, and the electronic mark data of the edited result created by the EM creating section 153, and describes in an edit list in an edit list file that duck voice processing is to be applied to that section.

In step S57, the user operates the operating section 124 to command playback of the edited result in which duck voice processing has been applied to the speech of a desired speaker. At this time, the CPU of the microcomputer 111 plays back the edited result from the optical disc 31, in accordance with the edit list in which it has been described that duck voice processing is to be applied.

Specifically, in accordance with the edit list in which it has been described that duck voice processing is to be applied, the CPU reads from the optical disc 31 the image data and sound data of a predetermined segment of a predetermined clip. Then, the CPU applies duck voice processing to sound data corresponding to the speech of a predetermined speaker of the read sound data, and supplies the resulting sound data to the sound output I/F 115, thereby causing the sound of the edited result to be outputted from the loudspeaker 125. Also, the CPU supplies the read image data to the image display I/F 117, thereby causing the image of the edited result to be displayed on the display device 126.

Figure 22:
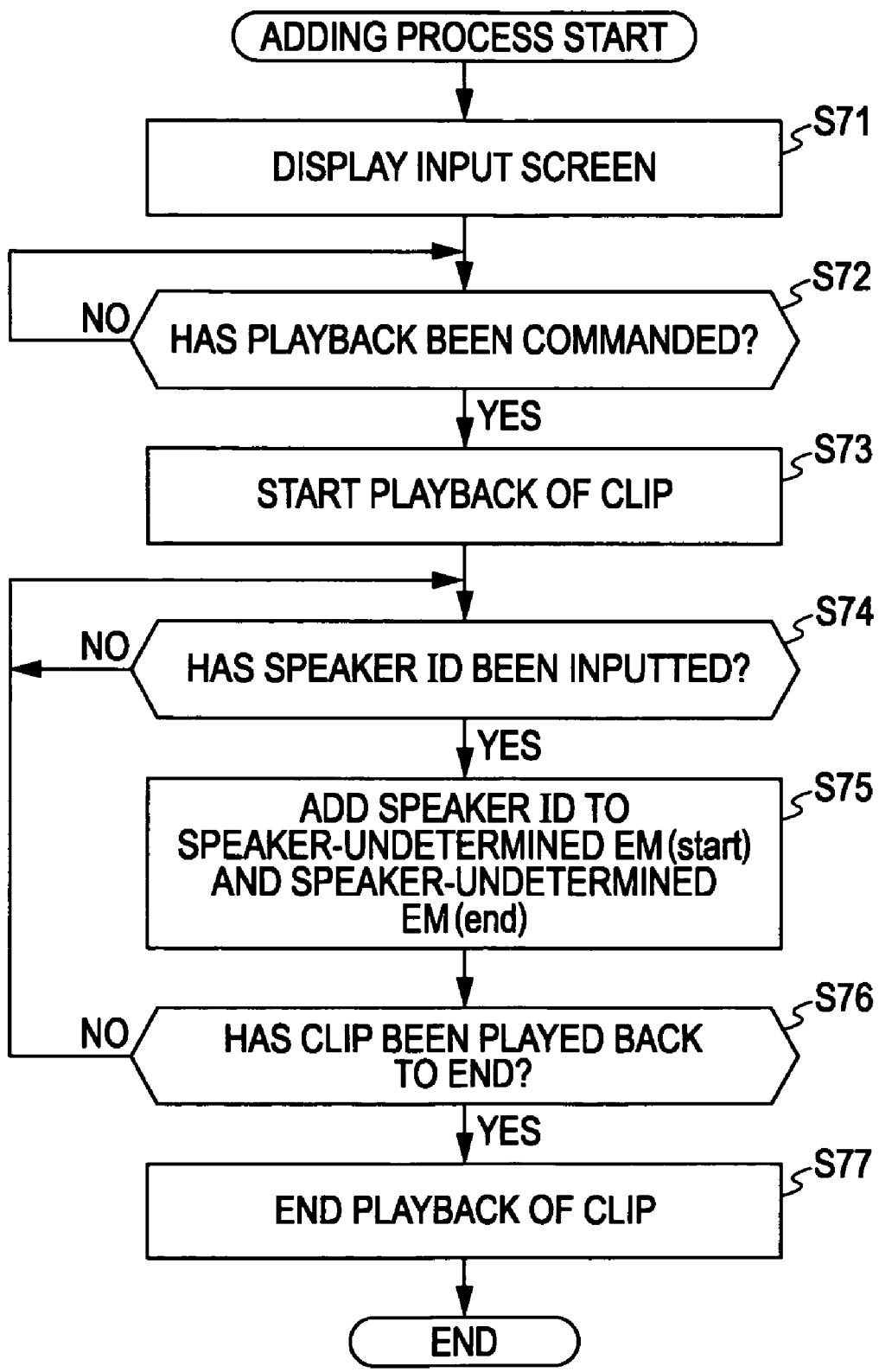
FIG. 22 is a flowchart illustrating an adding process by an adding section shown in FIG. 10.

Next, referring to the flowchart of FIG. 22, a description will be given of an adding process performed by the adding section 151 shown in FIG. 10 in which a speaker ID is added to a speaker-undetermined EM(start) and a speaker-undetermined EM(end). This adding process is started when, for example, the user commands display of the input screen shown in FIG. 12 by operating the operating section 124.

In step S71, the adding section 151 causes the input screen to be displayed on the display device 126, on the basis of a speaker list that is registered on the hard disk 128 in advance. In step S72, the adding section 151 determines whether or not playback of a clip recorded on the optical disc 31 has been commanded by the user. If it is determined in step S72 that the playback has not been commanded, the adding section 151 waits until the playback is commanded.

On the other hand, if it is determined in step S72 that the playback of a clip has been commanded, in step S73, the adding section 151 starts the playback of the clip. In step S74, the adding section 151 determines whether or not a speaker ID has been inputted by the user, in accordance with an operation signal supplied from the operating section I/F 114.

Specifically, by operating the operating section 124, the user moves the cursor 160 on the input screen and provides a determination command. The operating section I/F 114 accepts an input of a speaker ID through this operation, and supplies an operation signal indicative of the operation to the adding section 151. The adding section 151 determines that a speaker ID has been inputted by the user, if this operation signal is supplied.

If it is determined in step S74 that a speaker ID has not been inputted by the user, the adding section 151 waits until a speaker ID is inputted. If it is determined in step S74 that a speaker ID has been inputted by the user, the processing advances to step S75.

In step S75, on the basis of the frame number of the frame being currently played back and the inputted speaker ID, the adding section 151 adds the inputted speaker ID to a speaker-undetermined EM(start) and a speaker-undetermined EM(end) which immediately precede and immediately follow the frame being currently played back, respectively, and which are assigned to the position corresponding to the input of the speaker ID. As a result, for example, the electronic mark data of a clip shown in FIG. 6 is changed the electronic mark data of a clip shown in FIG. 13.

In step S76, the adding section 151 determines whether or not the clip being currently played back has been played back to the end. If it is determined that the clip has not been played back to the end, the processing returns to step S74, and the above-mentioned processing is repeated.

On the other hand, if it is determined in step S76 that the clip being played back has been played back to the end, in step S77, the adding section 151 ends the playback of the clip. Then, the processing ends.

Since the editing device 41 adds the speaker-undetermined EM(start) and the speaker-undetermined EM(end) to the speaker ID in this way, in a case where duck voice processing is applied to the sound of a desired speaker of the edited result, the segment of sound to which duck voice processing is to be applied can be easily recognized by means of the speaker EM(start) and the speaker EM(end) added to the speaker ID.

Therefore, it can be said that the speaker EM(start) and the speaker EM(end) are electronic marks that are useful for easily applying duck voice processing to the sound of a desired speaker of the edited result.

Next, referring to FIG. 23, a description will be given of a sound editing process for nondestructive editing of sound, which is performed by the editing processing section 150 shown in FIG. 10. This sound editing process is started when, for example, the user commands display of an editing screen by operating the operating section 124.

In step S81, the edit list creating section 152 starts playback of the proxy data of a clip to be edited, from the optical disc 31. As a result, a low-resolution image of the clip to be edited is displayed as an editing screen on the display device 126, and the sound of the clip is outputted from the loudspeaker 125.

In step S82, the edit list creating section 152 determines whether or not the In point of sound has been inputted on the editing screen by the user. If it is determined that the In point of sound has not been inputted, the edit list creating section 152 waits until the In point of sound is inputted.

On the other hand, if it is determined in step S82 that the In point of sound has been inputted, in step S83, the edit list creating section 152 describes the frame number of the frame being currently played back as the position where playback of sound is started as a sound sub-clip, into the edit list. For example, in the example of FIGS. 14A and 14B, the In point of sound is inputted by the user while the frame of the frame number "284" of the first clip is played back, and the edit list creating section 152 describes the frame number "284" into the edit list.

In step S84, the edit list creating section 152 determines whether or not the Out point of sound has been inputted on the editing screen by the user. If it is determined that the Out point of sound has not been inputted, the edit list creating section 152 waits until the Out point of sound is inputted.

On the other hand, if it is determined in step S84 that the Out point of sound has been inputted, in step S85, the edit list creating section 152 describes the frame number of the frame being currently played back as the position where playback of sound is ended as a sound sub-clip, into the edit list. For example, in the example of FIGS. 14A and 14B, the Out point of sound is inputted by the user while the frame of the frame number "2084" of the first clip is played back, and the edit list creating section 152 describes the frame number "2084" into the edit list.

In step S86, the edit list creating section 152 determines whether or not change of a clip to be edited has been command by the user. It should be noted that in the example of FIGS. 14A and 14B, of the clips to be edited, only the first clip includes sound, so the determination result of the determination in step S86 becomes negative (No) at all times.

If it is determined in step S86 that change of a clip to be edited has been commanded, in step S87, the edit list creating section 152 ends playback of the proxy data of the current clip to be edited. Then, the processing returns to step S81 where playback of the proxy data of a clip to be edited anew is started, and the subsequent processing is repeated.

On the other hand, if it is determined in step S86 that change of a clip to be edited has not been commanded, in step S88, the edit list creating section 152 determines whether or not end of editing of sound has been commanded by the user. If it is determined in step S88 that end of editing of sound has not been commanded by the user, the processing returns to step S82, and the above-mentioned processing is repeated.

If it is determined in step S88 that end of editing of sound has been commanded, in step S89, the edit list creating section 152 ends playback of the proxy data of the clip to be edited, and supplies the edit list to the EM creating section 153.

In step S90, the EM creating section 153 creates electronic mark data of the edited result, on the basis of the edit list supplied from the edit list creating section 152, and the electronic mark data of the clip.

For example, the EM creating section 153 creates electronic mark data of the edited result shown in FIG. 18, on the basis of the edit list shown in FIG. 16, and the electronic mark data of a clip shown in FIG. 13. Then, the EM creating section 153 records the electronic mark data of the edited result into an NRT file for edit list on the optical disc 31, and supplies the electronic mark data to the edit list creating section 152.

In step S91, the edit list creating section 152 determines whether or not the speaker ID of the speaker of a speech to which duck voice processing is to be applied has been inputted by the user, in accordance with an operation signal from the operating section I/F 114.

Specifically, the user operates the operating section 124 to input the speaker ID of the speaker of a speech to which duck voice processing is to be applied. The operating section I/F 114 supplies an operation signal indicative of this operation to the edit list creating section 152, thereby specifying the speaker ID of the speaker of a speech to which duck voice processing is to be applied. The edit list creating section 152 determines that the speaker ID of the speaker of a speech to which duck voice processing is to be applied has been inputted by the user, if this operation signal is supplied from the operating section I/F 114.

If it is determined in step S91 that the speaker ID of the speaker of a speech to which duck voice processing is to be applied has been inputted, in step S92, on the basis of the inputted speaker ID, and the electronic mark data of the edited result created in step S90, the edit list creating section 152 adds to the edit list a description indicating application of duck voice processing to the sound of a segment corresponding to the speech of the speaker. As a result, for example, the edit list shown in FIG. 16 is changed the edit list shown in FIG. 19.

In step S93, on the basis of the speaker ID inputted by the user as the speaker ID of the speaker of a speech to which duck voice processing is to be applied, the EM creating section 153 adds "duckvoice" or "normal" as information indicating whether or not duck voice processing is applied, to the speaker EM(start) and the speaker EM(end) described in the electronic mark data of the edited result created in step S91. As a result, for example, the electronic mark data of the edited result shown in FIG. 18 is changed the electronic mark data of the edited result shown in FIG. 20. Then, the processing ends.

While a sound editing process for nondestructive editing of sound has been described with reference to FIG. 23, an image editing process for nondestructive editing of image is performed in a similar manner. In that case, in the edit list, information indicating the position where playback of image is started or ended as an image sub-clip, or the like is described in correspondence to the In point or Out point of image inputted by the user. It should be noted, however, that the processing of steps S90 to S93 in FIG. 23 is not performed in the editing process of image.

In the shooting and editing system 10 in FIG. 1, since the speaker EM(start) and the speaker EM(end) are described in the electronic mark data of the edited result in this way, on the basis of the electronic mark data, the segment of a speech of each speaker in the sound of the edited result can be easily recognized.

Therefore, by inputting the speaker ID of the speaker of a speech to which duck voice processing is to be applied, the user can easily add to the edit list a description indicating the application of duck voice processing to the sound of a segment corresponding to the speech of the speaker. As a result, the user can easily apply duck voice processing to the speech of a specific speaker in the sound of the edited result.

Also, in a case where the speaker of a speech to which duck voice processing is applied is to be changed or deleted, the speaker of a speech to which duck voice processing is applied in the sound of the edited result can be easily changed or deleted by inputting the speaker ID of the changed or deleted speaker. In the case of news programs, in particular, since it is necessary to complete editing in a short time, the ability to easily change or delete the speaker of a speech to which duck voice processing is applied proves particularly useful.

While in the shooting and editing system 10 in FIG. 10 a television material is shot by the two video cameras 21 and 22, a television material may be shot by a single video camera. In this case, there is no need for the editing device 41 to compile clips onto a single optical disc.

Also, while in the shooting and editing system 10 sound is acquired by the single video camera 21, sound may be acquired by the two video cameras 21 and 22. In this case, the editing device 41 can perform nondestructive editing of image and sound simultaneously.

Figure 24:
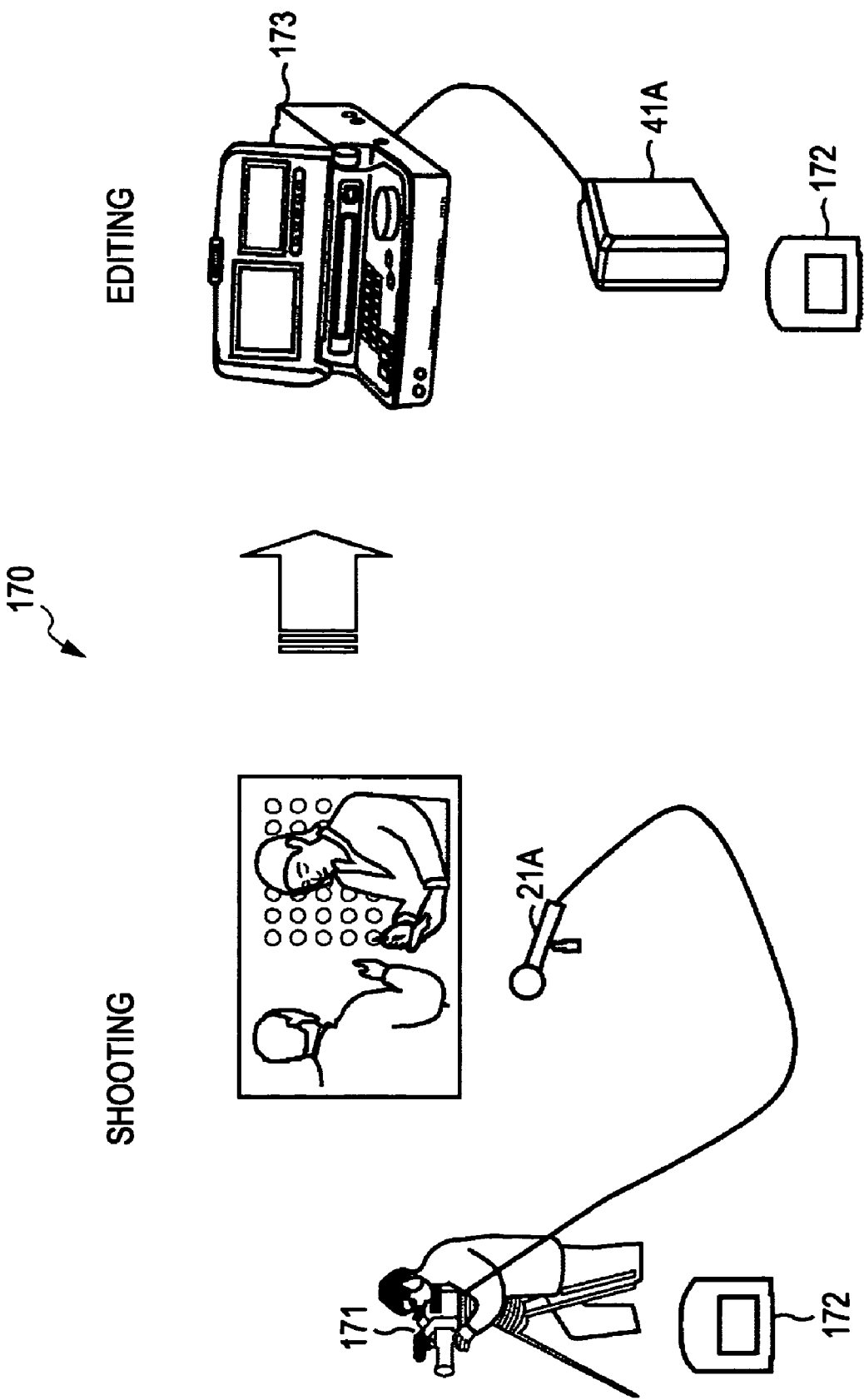
FIG. 24 is a view showing an example of the configuration of a shooting and editing system according to a second embodiment of the present invention.

Next, FIG. 24 shows an example of the configuration of a shooting and editing system according to a second embodiment of the present invention. It should be noted that the same reference numerals are attached to the same components as those in FIG. 1, and hence description thereof is omitted to avoid repetition.

In a shooting and editing system 170 in FIG. 24, the user inputs a speaker ID to a video camera 171 during shooting.

Specifically, like the video camera 21 and the video camera 22 in FIG. 1, the video camera 171 is a device used for videotape recording of a television material. Like the video camera 21, the video camera 171 shoots the image of a television material, and acquires sound by the microphone 21A. Like the video camera 21, the video camera 171 records the resulting image data with sound into a clip file on an optical disc 172.

Also, the video camera 171 acquires the speaker ID of a speaker who uttered the sound, which is inputted by the user during acquisition of the sound of the television material. In accordance with the speaker ID inputted by the user, the video camera 171 assigns a speaker EM(start) to which the speaker ID has been added, to the frame of the sound being acquired. The video camera 171 records electronic mark data describing the speaker EM(start) onto an NRT file of a clip on the optical disc 172. The optical disc 172 is mounted in the optical disc drive 41A of an editing device 173.

Like the editing device 41, the editing device 173 is a device used for editing or the like of material data recorded on the optical disc 172 mounted in the optical disc drive 41A. Like the editing device 41, in response to an input of the user, the editing device 173 performs nondestructive editing of material data recorded on the optical disc 172 to create an edit list, and records the edit list into an edit list file on the optical disc 172.

Also, the editing device 173 assigns a speaker EM(start) to the edited result on the basis of an edit list and the electronic mark data of a clip. Then, the editing device 173 records electronic mark data describing the speaker EM(start) into an NRT file for edit list on the optical disc 172, as electronic mark data of the edited result. Further, like the editing device 41, the editing device 173 applies duck voice processing to the sound of a predetermined speaker of the edited result, in response to an input of the user.

While in FIG. 24 the video camera 171 and the editing device 173 are separate devices, the video camera 171 and the editing device 173 may be integrated together.

Also, in FIG. 24, the optical disc 172 is mounted in the optical disc drive 41A of the editing device 173, and reading or recording with respect to the optical disc 172 is performed. However, a configuration is also possible in which the editing device 173 is connected via a network to the video camera 171 in which the optical disc 172 is mounted, and reading or recording with respect to the optical disc 172 is performed via the network.

Figure 25:
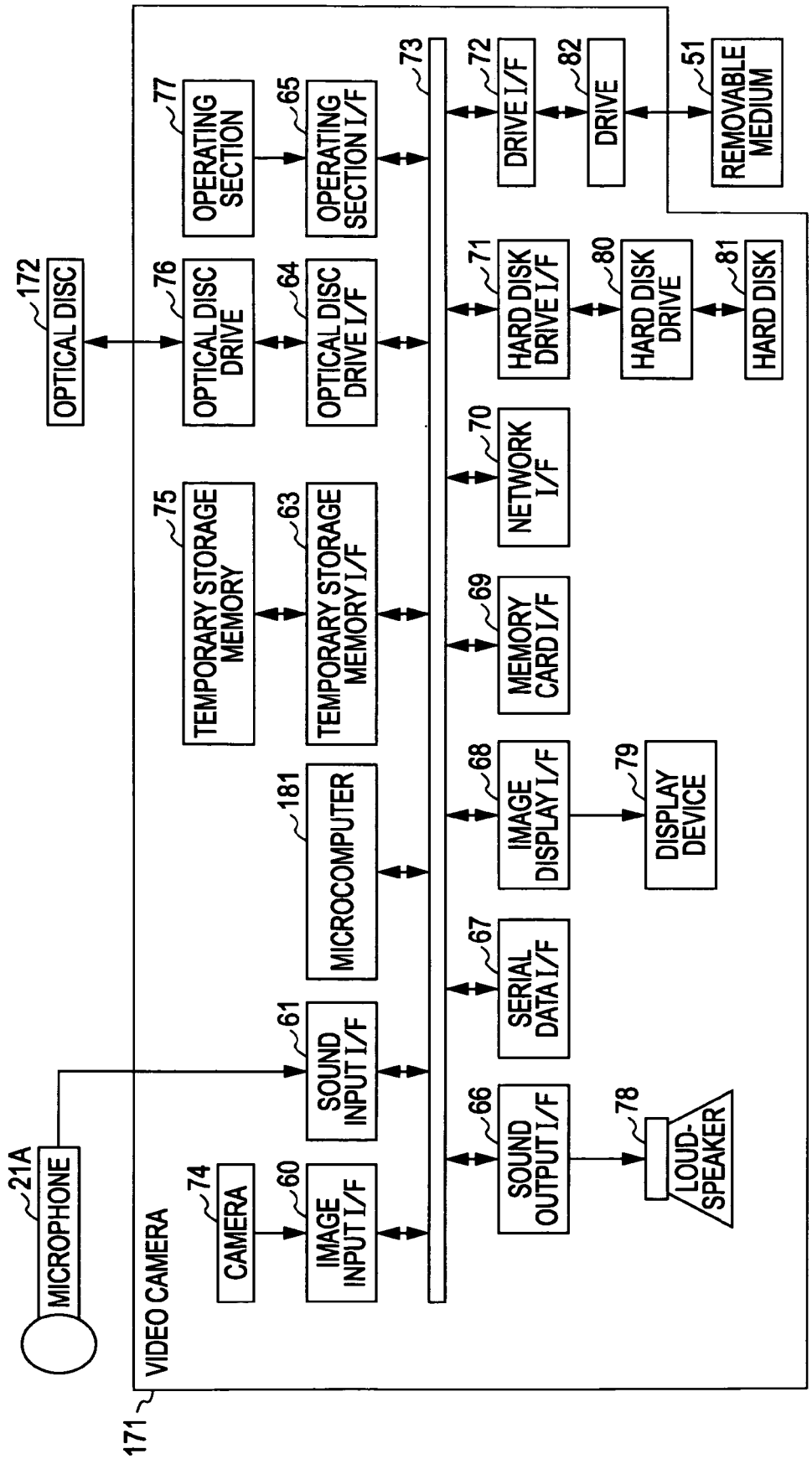
FIG. 25 is a block diagram showing an example of the hardware configuration of a video camera shown in FIG. 24.

FIG. 25 is a block diagram showing an example of the hardware configuration of the video camera 171 in FIG. 24.

In the video camera 171 in FIG. 25, the image input I/F 60, the sound input I/F 61, the temporary storage memory I/F 63, the optical disc drive I/F 64, the operating section I/F 65, the sound output I/F 66, the serial data I/F 67, the image display I/F 68, the memory card I/F 69, the network I/F 70, the hard disk drive I/F 71, the drive I/F 72, and a microcomputer 181 are connected to the system bus 73.

It should be noted that in FIG. 25, the same reference numerals are attached to the same components as those in FIG. 2, and hence description thereof is omitted to avoid repetition.

The microcomputer 181 includes a CPU, a ROM, and a RAM. The CPU of the microcomputer 181 controls the respective sections of the video camera 171 in accordance with a program recorded in the ROM or the hard disk 81, in response to an operation signal or the like from the operating section I/F 65.

For example, like the CPU of the microcomputer 62 shown in FIG. 2, the CPU creates proxy data by using material data including image data supplied from the image input I/F 60, and sound data supplied from the sound input I/F 61, and stores the proxy data into the temporary storage memory 75. Also, in response to an operation signal inputted from the operating section I/F 65, the CPU assigns a speaker EM(start) to the frame being shot. Then, the CPU creates electronic mark data describing the speaker EM(start), and supplies the electronic mark data to the optical disc drive I/F 64 for recording into an NRT file of a clip on the optical disc 172.

Further, like the CPU of the microcomputer 62, the CPU supplies sound data in the material data or proxy data supplied from the temporary storage memory I/F 63 to the sound output I/F 66 via the system bus 73, and causes a sound corresponding to the sound data to be outputted from the loudspeaker 78.

Also, like the CPU of the microcomputer 62, the CPU supplies image data in the material data or proxy data supplied from the temporary storage memory I/F 63 to the image display I/F 68 via the system bus 73, and causes an image corresponding to the image data to be displayed on the display device 79. A program, data, and the like to be executed by the CPU are stored in the RAM as appropriate.

Figure 26:
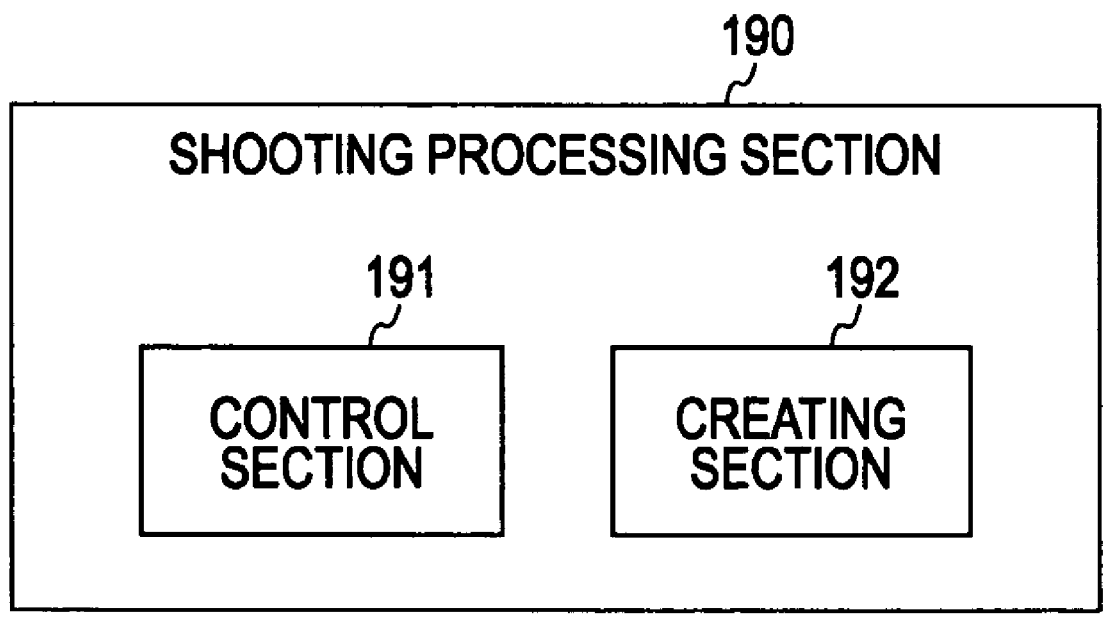
FIG. 26 is a block diagram showing an example of the functional configuration of a shooting processing section of the video camera shown in FIG. 25.

FIG. 26 shows an example of the functional configuration of a shooting processing section in the video camera 171 shown in FIG. 25.

A shooting processing section 190 shown in FIG. 26 includes a control section 191 and a creating section 192.

The control section 191 performs various kinds of control related to shooting. For example, like the control section 91 in FIG. 3, the control section 191 controls the image input I/F 60 and the sound input I/F 61 in response to an operation signal indicative of an operation for commanding the start of shooting, which is supplied from the operating section I/F 65, and starts acquisition of material data.

Also, like the control section 91, the control section 191 creates proxy data using the acquired material data. Further, the control section 191 supplies the material data and the proxy data to the temporary storage memory I/F 63 for storage into the temporary storage memory 75.

In response to an operation signal indicative of an operation for inputting a speaker ID, which is supplied from the operating section I/F 65, the creating section 192 assigns a speaker EM(start) to which the speaker ID has been added, to the frame being shot. Then, the creating section 192 creates electronic mark data describing the speaker EM(start), and supplies the electronic mark data to the optical disc drive I/F 64 for storage into an NRT file of a clip on the optical disc 172.

Next, referring to FIG. 27, a description will be given of a shooting operation performed using the video camera 21 by the user.

The table of FIG. 27 describes, in association with the number of each step of shooting operation, the contents of shooting operation in that step, the contents of main processing by the video camera 171, and data to which the processing is applied.

As shown in FIG. 27, in step S101, the user operates the operating section 77 to command display of the input screen shown in FIG. 12. At this time, the creating section 192 of the video camera 171 causes the input screen to be displayed on the display device 79, on the basis of a speaker list that is registered on the hard disk 81 in advance.

In step S102, the user operates the operating section 77 to command the start of shooting. At this time, the control section 191 of the video camera 171 creates an NRT file of a clip on the optical disc 172. Also, the control section 191 creates a clip file on the optical disc 172. Further, the control section 191 starts recording of material data supplied from the image input I/F 60 and the sound input I/F 61 into the clip file.

In step S103, at the start of speech of each speaker, the user operates the operating section 77 on the input screen to input the speaker ID of that speaker. At this time, the creating section 192 assigns a speaker EM(start) to which the speaker ID has been added, to the frame being shot, and describes the speaker EM(start) into the electronic mark data of the NRT file of the clip.

In step S104, the user operates the operating section 77 to command the end of shooting. At this time, the control section 191 ends the recording of material data into the clip file.

Next, referring to the flowchart of FIG. 28, a shooting process by the shooting processing section 190 shown in FIG. 26 will be described. This shooting process is started when, for example, the user commands the start of shooting by operating the operating section 77.

In step S111, the creating section 192 of the video camera 171 causes the input screen to be displayed on the display device 79, on the basis of a speaker list that is registered on the hard disk 81 in advance. In step S112, the control section 191 determines whether or not the start of shooting has been commanded by the user, in accordance with an operation signal supplied from the operating section I/F 65. If it is determined in step S112 that the start of shooting has not been commanded, the control section 191 waits until the start of shooting is commanded.

Figure 8:
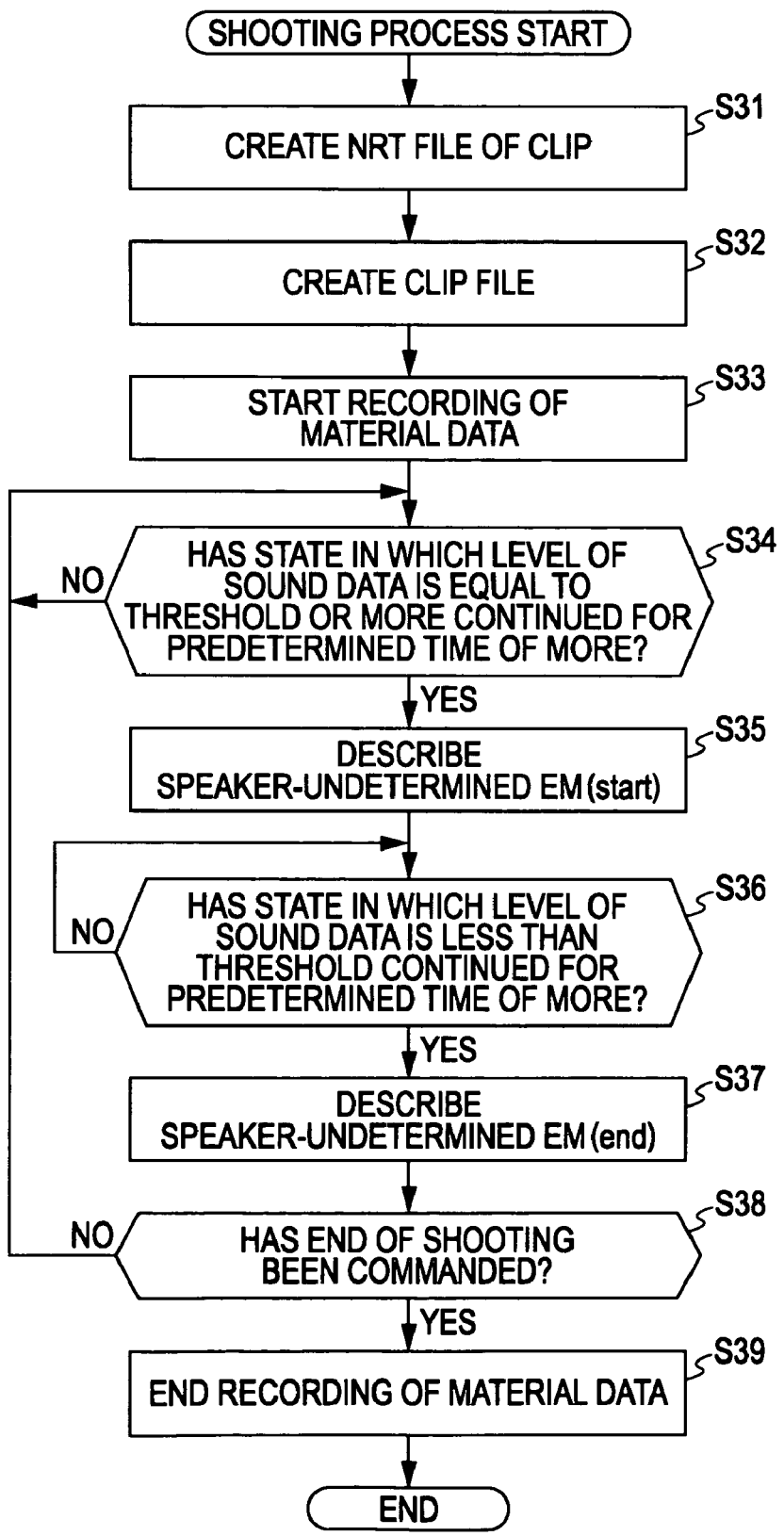
FIG. 8 is a flowchart illustrating a shooting process by the shooting processing section shown in FIG. 3.

On the other hand, if it is determined in step S112 that the start of shooting has been commanded, in step S113, as in the processing of step S31 in FIG. 8, the control section 191 creates an NRT file of a clip on the optical disc 172. In step S114, as in the processing of step S32 in FIG. 8, the control section 191 creates a clip file on the optical disc 172. In step S115, the control section 191 starts recording of material data supplied from the image input I/F 60 and the sound input I/F 61 into the clip file.

In step S116, the creating section 192 determines whether or not a speaker ID has been inputted by the user, in accordance with an operation signal supplied from the operating section I/F 65. If it is determined in step S116 that a speaker ID has not been inputted by the user, the processing skips step S117 and proceeds to step S118.

If it is determined in step S116 that a speaker ID has been inputted, in step S117, on the basis of the frame number of the frame being currently shot, the creating section 192 assigns a speaker EM(start) to which the speaker ID inputted by the user has been added, to the frame of the frame number. Then, the creating section 192 describes the speaker EM(start) into the electronic mark data of the NRT file of the clip.

In step S118, the control section 191 determines whether or not the end of shooting has been commanded by the user, in response to an operation signal from the operating section 77. If it is determined in step S118 that the end of shooting has not been commanded, the processing returns to step S116, and the above-mentioned processing is repeated.

If it is determined in step S118 that the end of shooting has been commanded, in step S119, the control section 191 ends the recording of material data into the clip file. Then, the processing ends.

Figure 29:
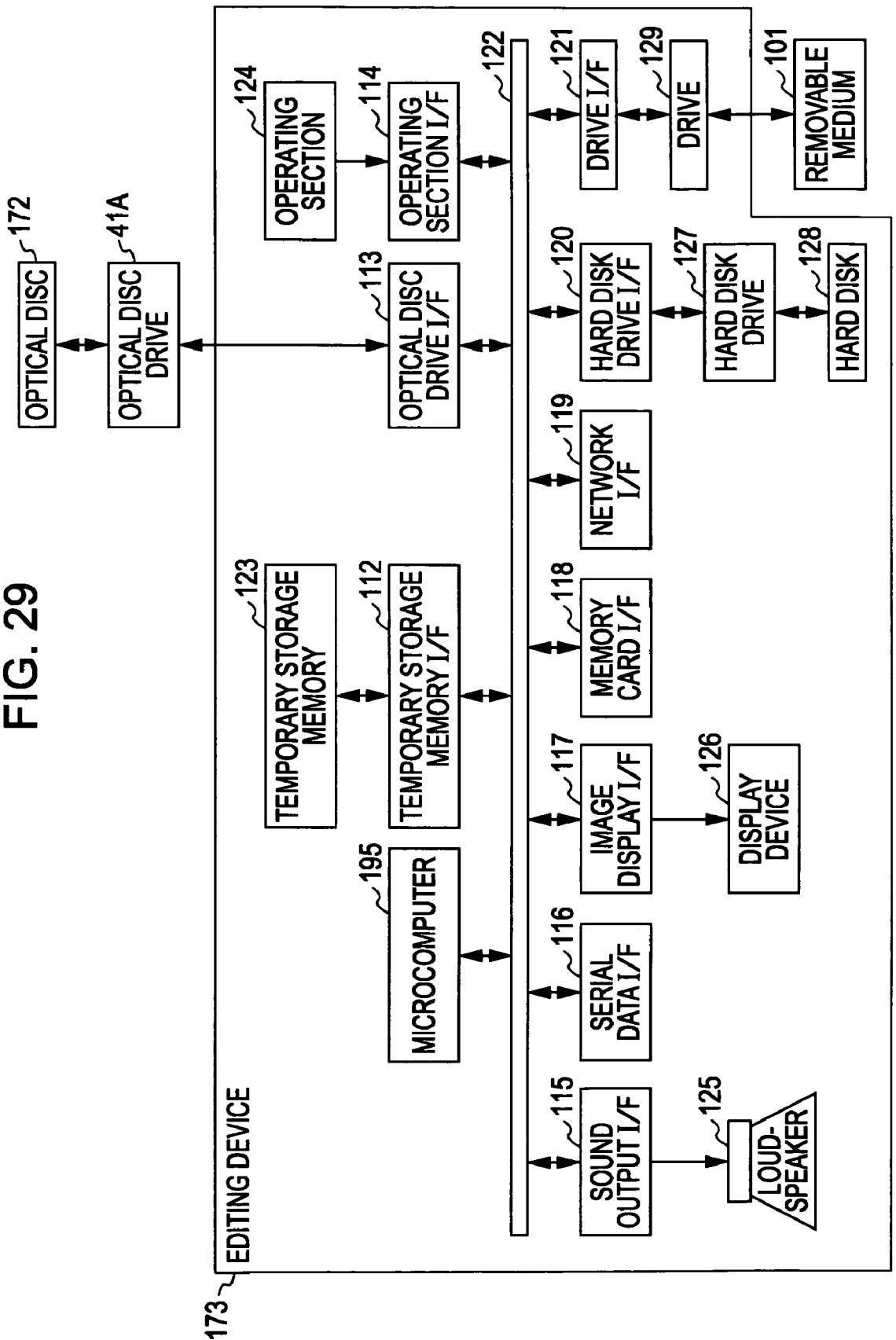
FIG. 29 is a block diagram showing an example of the hardware configuration of an editing device shown in FIG. 24.

FIG. 29 is a block diagram showing an example of the hardware configuration of the editing device 173 shown in FIG. 24.

In the editing device 173 shown in FIG. 29, the temporary storage memory I/F 112, the optical disc drive I/F 113, the operating section I/F 114, the sound input I/F 115, the serial data I/F 116, the image display I/F 117, the memory card I/F 118, the network I/F 119, the hard disk drive I/F 120, the drive I/F 121, and a microcomputer 195 are connected to the system bus 122. It should be noted that in FIG. 29, the same reference numerals are attached to the same components as those in FIG. 9, and hence description thereof is omitted to avoid repetition.

The microcomputer 195 includes a CPU, a ROM, and a RAM. The CPU of the microcomputer 195 controls the respective sections of the editing device 173 in accordance with a program recorded in the ROM or the hard disk 128, in response to an operation signal or the like from the operating section I/F 114.

For example, like the CPU of the microcomputer 111 shown in FIG. 9, the CPU supplies a clip read from the optical disc 172 mounted in the optical disc drive 41A and supplied from the optical disc drive I/F 113, to the temporary storage memory I/F 112.

Also, like the CPU of the microcomputer 111, the CPU performs nondestructive editing by creating an edit list in response to an operation signal. Like the CPU of the microcomputer 111, the CPU records the edit list onto the optical disc 172.

Further, like the CPU of the microcomputer 111, the CPU creates electronic mark data of the edited result on the basis of an edit list and electronic mark data of an NRT file of a clip. Then, like the CPU of the microcomputer 111, the CPU records the electronic mark data into an NRT file for edit list on the optical disc 172.

Also, like the CPU of the microcomputer 111, on the basis of an operation signal and electronic mark data of the edited result, the CPU changes the edit list in such a way that duck voice processing is applied to the speech of a speaker with a speaker ID specified by the user, of the sound of the edited result.

Further, like the CPU of the microcomputer 111, the CPU supplies the sound data of a clip supplied from the temporary storage memory I/F 112 to the sound output I/F 115 via the system bus 122, and causes the sound of the clip to be outputted from the loudspeaker 125. Also, the CPU supplies the image data of a clip supplied from the temporary storage memory I/F 112 to the image display I/F 117 via the system bus 122, and causes the image of the clip to be displayed on the display device 126. A program, data, and the like to be executed by the CPU are stored in the RAM as appropriate.

Figure 30:
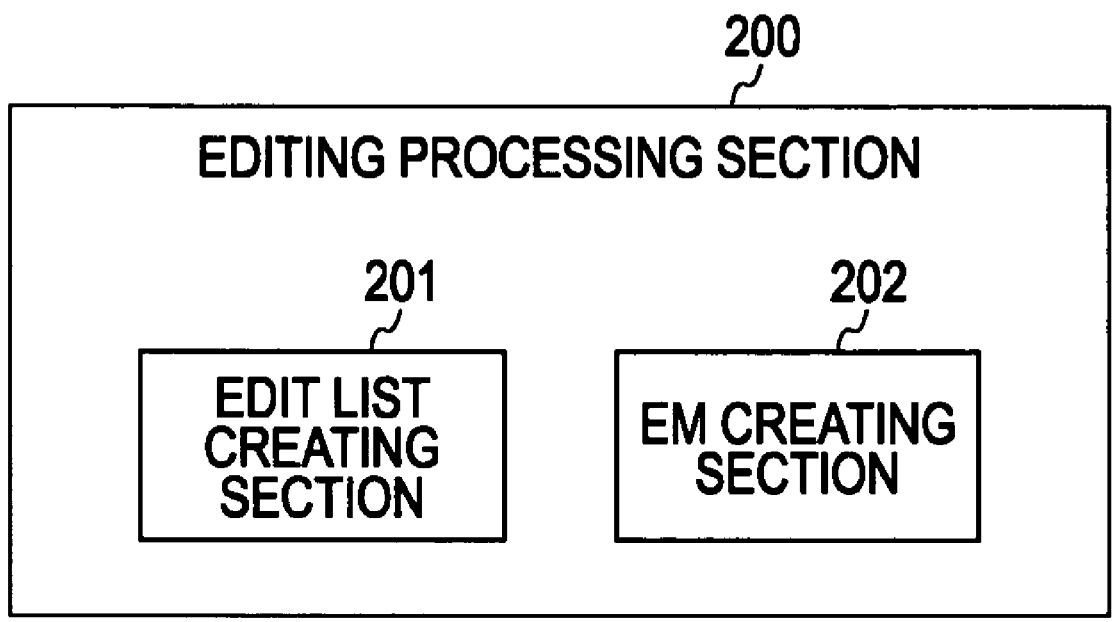
FIG. 30 is a block diagram showing an example of the functional configuration of an editing processing section in the editing device shown in FIG. 29.
Figure 31:
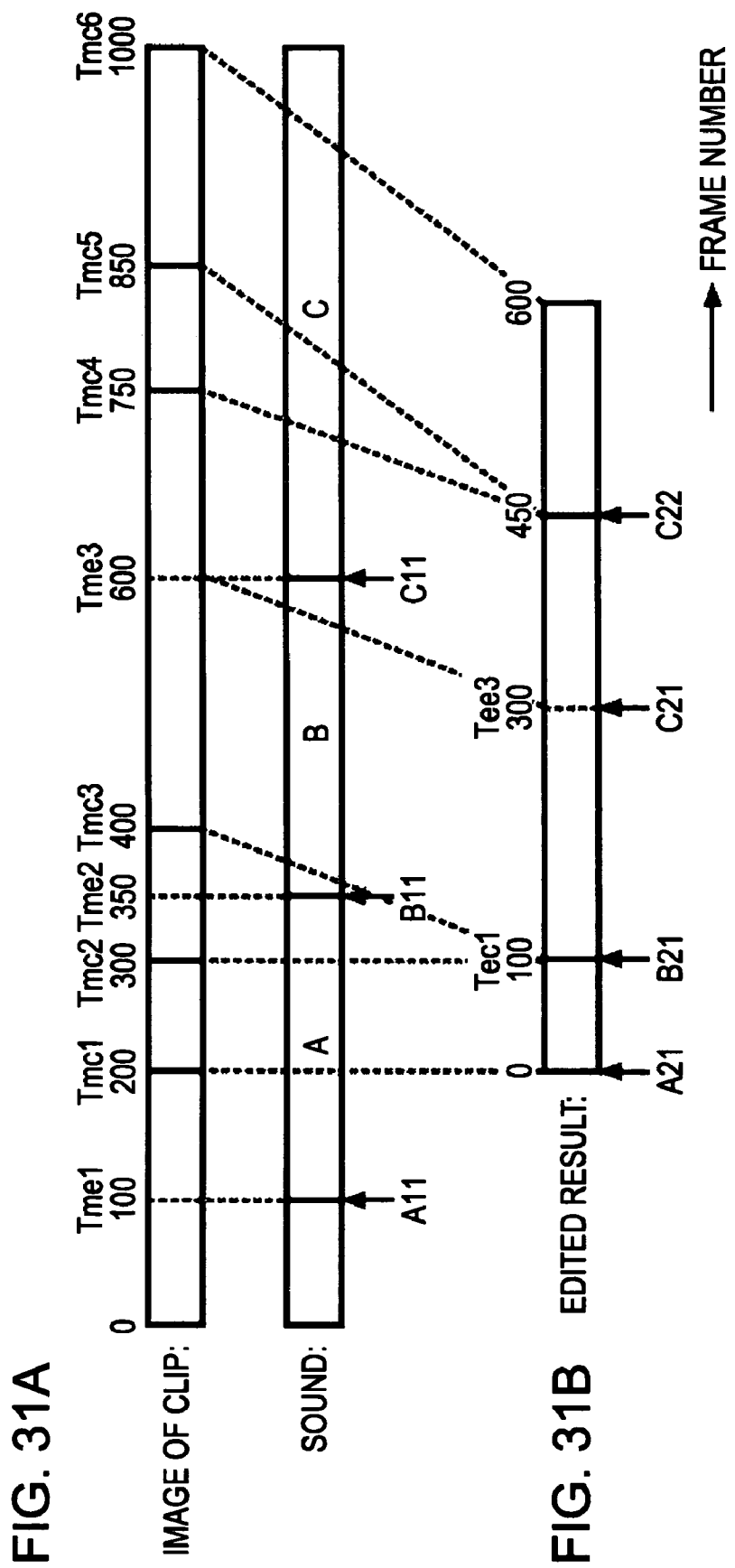
FIGS. 31A and 31B are diagrams illustrating clips to be edited and the edited result.

FIG. 30 shows an example of the functional configuration of a shooting processing section in the editing device 173 shown in FIG. 29.

A shooting processing section 200 shown in FIG. 30 includes an edit list creating section 201 and an EM creating section 202.

For example, like the edit list creating section 152, the edit creating section 201 supplies a clip read from the optical disc 172 and supplied from the optical disc drive I/F 113, to the temporary storage memory I/F 112.

Further, like the edit list creating section 152, the edit list creating section 201 supplies the sound data of proxy data supplied from the temporary storage memory I/F 112 to the sound output I/F 115, and causes the sound of a clip to be outputted from the loudspeaker 125. Also, the edit list creating section 201 supplies the image data of proxy data to the image display I/F 117, and causes a low-resolution image of a clip to be displayed on the display device 126 as an editing screen. At this time, the user performs an editing operation by operating the operating section 124 while listening to the sound from the loudspeaker 125 and looking at the editing screen.

Like the edit list creating section 152, the edit list creating section 201 performs nondestructive editing by creating an edit list, in response to an operation signal that is supplied from the operating section I/F 114 due to a user's editing operation. Then, like the edit list creating section 152, the edit list creating section 201 supplies the edit list to the optical disc drive I/F 113 for storage onto the optical disc 172, and also supplies the edit list to the EM creating section 202.

Also, like the edit list creating section 152, on the basis of an operation signal supplied from the operating section I/F 114, and electronic mark data of the edited result supplied from the EM creating section 202, the edit list creating section 201 changes the edit list in such a way that duck voice processing is applied to the speech of a speaker with a speaker ID specified by the user, of the sound of the edited result.

Like the EM creating section 153, the EM creating section 202 creates electronic mark data of the edited result on the basis of the edit list supplied from the edit list creating section 201, and electronic mark data of a clip, which is stored in the temporary storage memory I/F 112. Then, like the EM creating section 153, the EM creating section 202 records the electronic mark data into an NRT file for edit list on the optical disc 172, and also supplies the electronic mark data to the edit list creating section 201.

Also, in response to an operation signal supplied from the operating section I/F 114, the EM creating section 202 adds information indicating whether or not duck voice processing is applied, to a speaker EM(start) to which a speaker ID specified by the user has been added and which is described in the electronic mark data of the edited result.

Next, referring to FIGS. 31A to 34, nondestructive editing in the editing device 173 will be described.

It should be noted that in this example, the video camera 171 shoots three persons, a speaker "○○" with a speaker ID "A", a speaker "××" with a speaker ID "B", and a speaker "ΔΔ", with a speaker ID "C", as subjects and acquires the sound of their dialogue. Thus, a dialogue between three speakers is shot as a television material.

Then, the user cuts out the sound of a predetermined segment of the television material for use as the sound of the edited result and also cuts out the image of a predetermined segment for use as the image of the edited result, and performs nondestructive editing in such a way as to apply duck voice processing to the speech of at least one of the three speakers.

First, referring to FIGS. 31A and 31B and FIG. 32, a description will be given of clips to be edited which are recorded on the optical disc 172, and the edited result. It should be noted that in FIGS. 31A and 31B, the horizontal axis represents the frame number.

The bar at the top of FIG. 31A represents the length of the first clip to be edited which is shot by the video camera 171, and each numeral described above the bar represents the frame number of an image shot at the shooting time corresponding to its described position. That is, in the example of FIGS. 31A and 31B, the frame count of the image of the first clip is 1001 frames, and frame numbers are assigned to the individual frames in order from "0" to "1000".

The bar at the middle of FIG. 31A represents the length of the sound of the first clip, and each alphabet within the bar indicates the speaker ID of a speaker who uttered the sound corresponding to that position. Also, each arrow described below the bar represents a speaker EM(start).

Specifically, in the example of FIGS. 31A and 31B, in the first clip, a speaker EM(start) with a speaker ID "A" added thereto is assigned to the 100th frame, and a speaker EM(start) with a speaker ID "B" added thereto is assigned to the 350th frame. Also, a speaker EM(start) with a speaker ID "C" added thereto is assigned to the 600th frame.

Also, the bar in FIG. 31B represents the length of the edited result obtained as a result of nondestructive editing performed with respect to the first clip shown in FIG. 31A, and each numeral described above the bar represents the frame number on the edited result corresponding to its described position. That is, in the example of FIGS. 31A and 31B, the frame count of the edited result is 601 frames, and frame numbers are assigned to the individual frames in order from "0" to "600".

Specifically, in the example of FIGS. 31A and 31B, the 200th frame of the first clip is specified as the In point by the user, and the 300th frame is specified as the Out point. Therefore, the material data of frames from the 200th frame to the 300th frame of the first clip is the material data of frames from the 0th frame to the 100th frame of the edited result (hereinafter, referred to as first material sub-clip).

Also, in the example of FIGS. 31A and 31B, the 400th frame of the first clip is specified as the In point by the user, and the 750th frame is specified as the Out point. Therefore, the material data of frames from the 400th frame to the 750th frame of the first clip is the material data of frames from the 100th frame to the 450th frame of the edited result (hereinafter, referred to as second material sub-clip).

Further, in the example of FIGS. 31A and 31B, the 850th frame of the first clip is specified as the In point by the user, and the 1000th frame is specified as the Out point. Therefore, the material data of frames from the 850th frame to the 1000th frame of the first clip is the material data of frames from the 450th frame to the 600th frame of the edited result (hereinafter, referred to as third first material sub-clip).

In the case where nondestructive editing is performed with the In points and the Out points specified in this way, a speaker EM(start) assigned to a position immediately preceding each In point of the first clip is assigned to a position on the edited result corresponding to the In point.

In the example of FIGS. 31A and 31B, a speaker EM(start) with a speaker ID "A" assigned thereto, which is assigned to the 100th frame immediately preceding the 200th frame of the first clip specified as the In point, is assigned to the 0th frame that is a position on the edited result corresponding to that In point.

Also, a speaker EM(start) with a speaker ID "B" assigned thereto, which is assigned to the 350th frame immediately preceding the 400th frame of the first clip specified as the In point, is assigned to the 100th frame that is a position on the edited result corresponding to that In point.

Further, a speaker EM(start) with a speaker ID "C" assigned thereto, which is assigned to the 600th frame immediately preceding the 850th frame of the first clip specified as the In point, is assigned to the 450th frame that is a position on the edited result corresponding to that In point.

Also, a speaker EM(start) assigned to a position within an editing segment from each In point to each Out point of the first clip, is assigned to a position on the edited result corresponding to that position. In the example of FIGS. 31A and 31B, a speaker EM(start) assigned to the 600th frame within the editing section from the 400th frame of the first clip specified as the In point to the 750th frame of the second clip specified as the Out point, is assigned to the 300th frame that is a position on the edited result corresponding to that position.

It should be noted that a position Tee3 (300 in the example of FIGS. 31A and 31B) on the edited result where this speaker EM(start) is assigned is found by Equation (1) below using a position Tec1 (100 in the example of FIGS. 31A and 31B) on the edited result corresponding to the In point, a position Tme3 (600 in the example of FIG. 31A) on the clip where the speaker EM(start) is assigned, and an In point Tmc3 (400 in the example of FIGS. 31A and 31B).

$$Tee3 = Tec1 + Tme3 - Tmc3 \quad (1)$$

Figure 32:
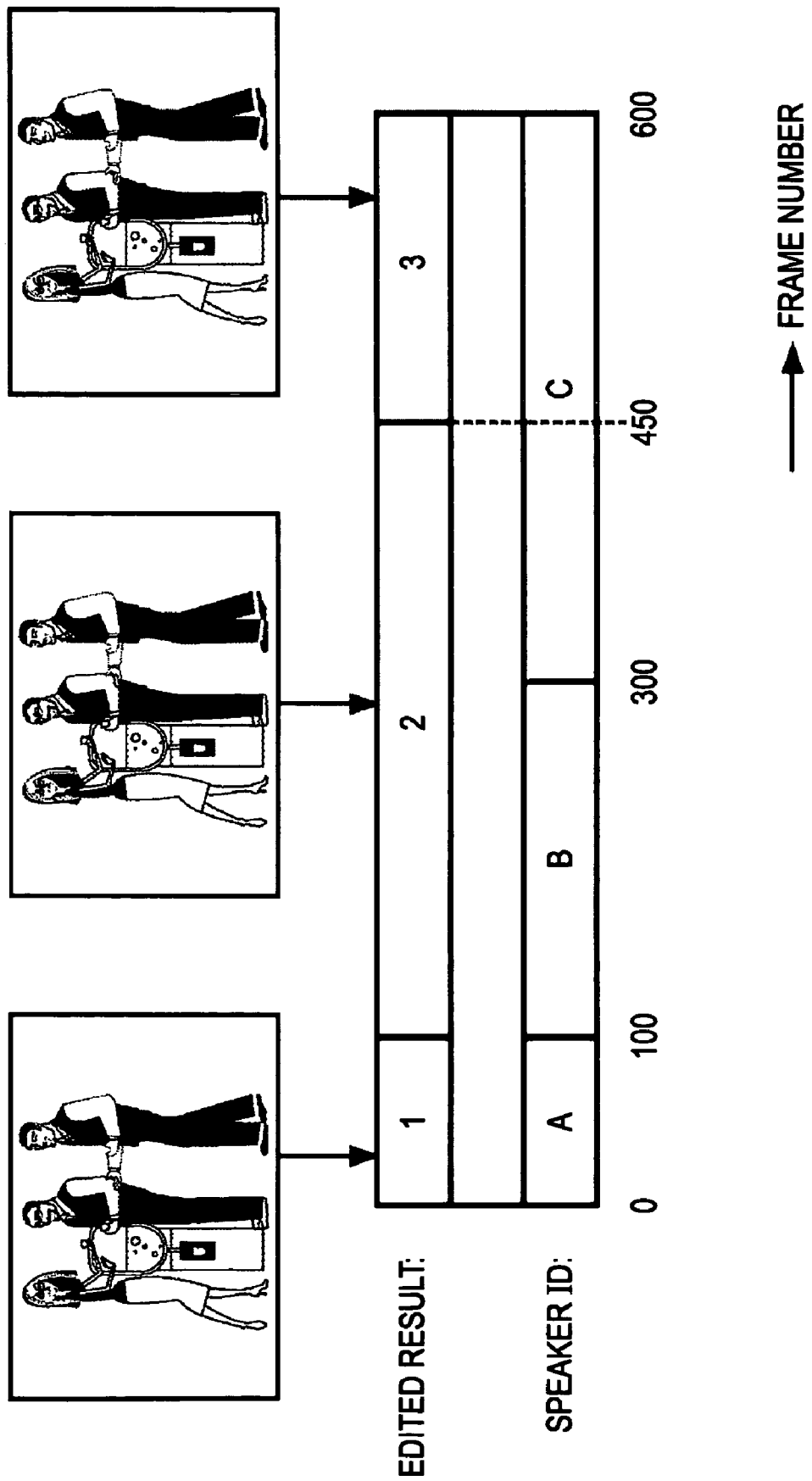
FIG. 32 is a diagram illustrating the edited result.

Also, the edited result, and speaker IDs corresponding to the sound of the edited result are as shown in FIG. 32. It should be noted that in FIG. 32, the horizontal axis represents the frame number.

That is, the edited result includes the first material sub-clip, the second material sub-clip, and the third material sub-clip which are arranged in order from the beginning. Also, the sound in frames from the frame numbers "0" to "100" of the edited result is the speech of a speaker with a speaker ID "A", and the sound in frames from the frame numbers "100", to "300" of the edited result is the speech of a speaker with a speaker ID "B". Further, the sound in frames from the frame numbers "300" to "600" of the edited result is the speech of a speaker with a speaker ID "C".

As described above, in the edited result shown in FIGS. 31B and 32, the Out point of the second material sub-clip, and the switching points of speakers differ from each other. That is, in the edited result shown in FIGS. 31B and 32, the speech of the speaker "xx" switches to the speech of the speaker "ΔΔ" at some midpoint in the second material sub-clip.

FIG. 33 shows electronic mark data of the first clip shown in FIGS. 31A and 31B, and FIG. 34 shows electronic mark data of the edited result shown in FIGS. 31A and 31B and 32.

In the example of FIG. 33, an electronic mark table portion enclosed by electronic mark tables (<EssenceMark Table></EssenceMark Table>) is described on the 2nd to 6th lines.

"targetMedia="Original-Material"" on the 2nd line in FIG. 33 indicates that this electronic mark data is electronic mark data describing an electronic mark assigned to the material data of a clip.

Also, the description "EssenceMark value="Speaker-A"frameCount="100"" on the 3rd line indicates that the characteristic feature indicated by this electronic mark is the start position of speech by a speaker with a speaker ID "A", and the assigned position of the electronic mark is the 100th frame from the beginning of a clip.

Likewise, the descriptions "EssenceMark value="Speaker-B"frameCount="350"" on the 4th line, and "EssenceMark value="Speaker-C"frameCount="600"" on the 5th line indicate that the characteristic features indicated by these electronic marks are the start positions of speech by a speaker with a speaker ID "B" and a speaker with a speaker ID "C", respectively, and the assigned positions of the electronic marks are the 350th frame and the 600th frame from the beginning of a clip, respectively.

In the example of FIG. 34, an electronic mark table portion enclosed by electronic mark tables (<EssenceMark Table></EssenceMark Table>) is described on the 2nd to 7th lines.

It should be noted that the description "targetMedia="Initial-EditList"" on the 2nd line indicates that this electronic mark data is electronic mark data describing an electronic mark assigned to the edited result.

Also, the description "EssenceMark value="Speaker-A"frameCount="0"" on the 3rd line indicates that the characteristic feature indicated by this electronic mark is the start position of speech by a speaker with a speaker ID "A", and the assigned position of the electronic mark is the 0th frame from the beginning of the edited result.

Likewise, the descriptions "EssenceMark value="Speaker-B"frameCount="100"" on the 4th line, "EssenceMark value="Speaker-C "frameCount="300"" on the 5th line, and "EssenceMark value="Speaker-C"frameCount="450"" on the 6th line indicate that the characteristic features indicated by these electronic marks are the start positions of speech by a speaker with a speaker ID "B", a speaker with a speaker ID "C", and a speaker with a speaker ID "C", respectively, and the assigned positions of the electronic marks are the 100th frame, 300th frame, and 450th frame from the beginning of the edited result, respectively.

It should be noted that in the above-mentioned description, speaker EMs(start) with the same speaker ID "C" added thereto are assigned successively to the 300th frame and 450th frame of the edited result. However, in a case where speaker EMs(start) with the same speaker ID added thereto succeed one another, only the first speaker EM(start) may be assigned.

Next, referring to FIG. 35, a description will be given of an editing operation performed by the user using the editing device 173.

The table of FIG. 35 describes, in association with the number of each step of editing operation, the contents of editing operation in that step, the contents of main processing by the editing device 173, and data to which the processing is applied.

As shown in FIG. 35, in step S131, the user mounts the optical disc 172 in the optical disc drive 41A of the editing device 173, and commands display of the editing screen by operating the operating section 124. At this time, on the basis of proxy data of a proxy file, the edit list creating section 201 causes the editing screen to be displayed on the display device 126, and causes the sound of a clip to be outputted from the loudspeaker 125.

In step S132, the user operates the operating section 124 to perform editing by specifying the In point and the Out point on the editing screen. At this time, the edit list creating section 201 creates an edit list on the basis of the In point and the Out point specified by the user. Then, the edit list creating section 201 records the edit list into an edit list file on the optical disc 172, and supplies the edit list to the EM creating section 202.

Also, the EM creating section 202 interpolates a speaker EM(start) at the Cut point, on the basis of the edit list supplied from the edit list creating section 201, and electronic mark data in which the speaker EM(start) of a clip is described, and copies the speaker EM(start) assigned to a position from the In point to the Out point, to a corresponding position on the edited result, thereby creating electronic mark data of the edited result. Then, the EM creating section 202 records the electronic mark data of the edited result into an NRT file for edit list on the optical disc 172.

Since the processing of steps S133 and S134 is the same as the processing of steps S56 and S57 in FIG. 21, description thereof is omitted.

Figure 23:
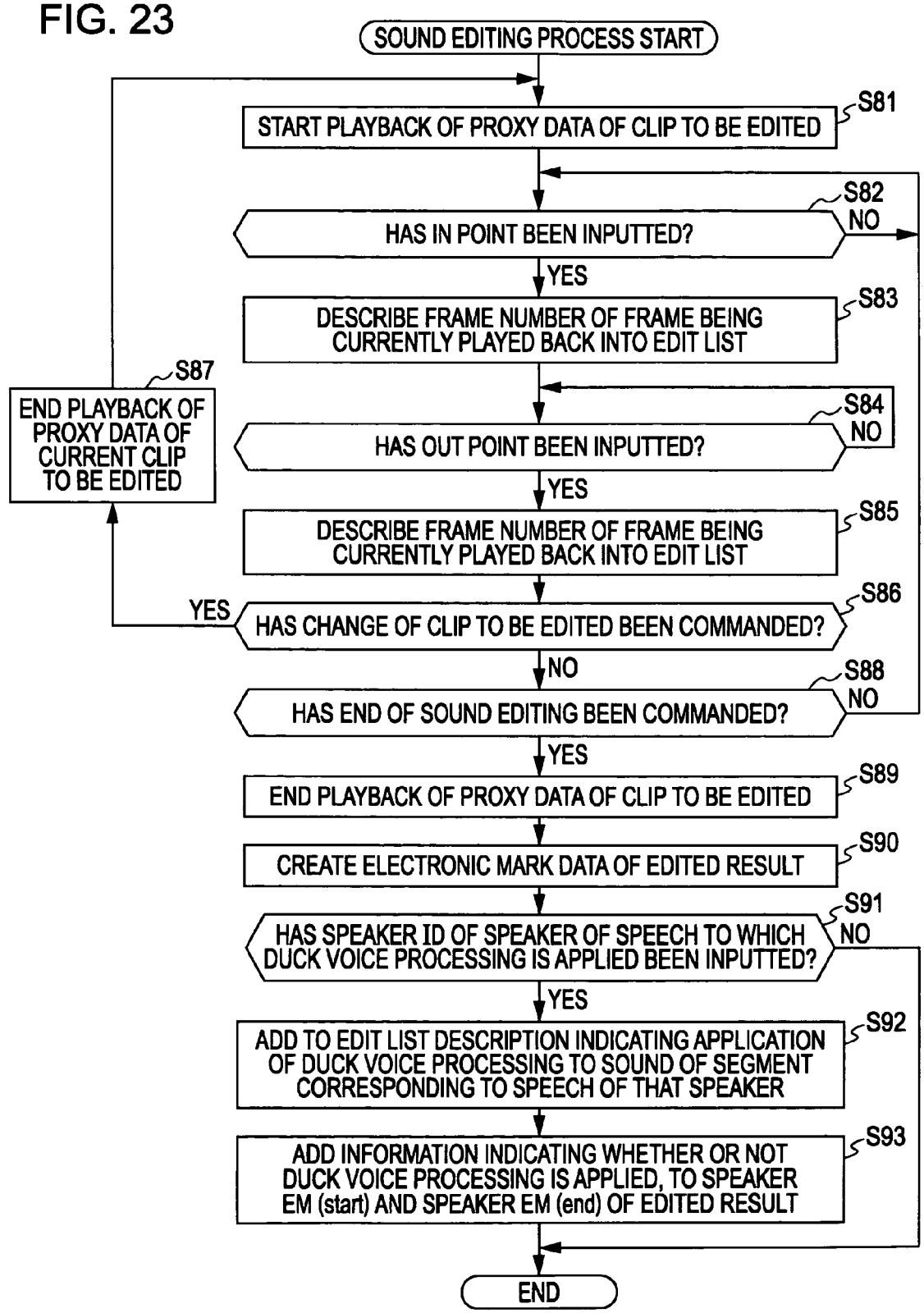
FIG. 23 is a flowchart illustrating a sound editing process by the editing processing section shown in FIG. 10.

Although not shown, the editing process for nondestructive editing of sound and image, which is performed by the editing processing section 200, is the same as the sound editing process in FIG. 23. It should be noted, however, that in the editing process by the editing processing section 200, in steps S83 and S85 in FIG. 23, the frame number of the frame being currently played back is described in the edit list as the position where playback of sound and image is started or ended as a material sub-clip.

In the shooting and editing system 170 in FIG. 24, both shooting and assigning of a speaker EM(start) are performed by the video camera 171. However, as shown in FIG. 36, an assigning device 206 that assigns a speaker EM(start) may be provided separately from a video camera 205 that performs shooting.

Further, in the shooting and editing system 170 in FIG. 24, a television material is shot by the single video camera 171. However, a television material may be shot by a plurality of video cameras.

In this case, like the editing device 41 in FIG. 1, the editing device 173 compiles clips shot by individual video cameras onto a single optical disc. Also, in this case, sound may be acquired by each of a plurality of video cameras, or sound may be acquired by one of the video cameras. In the case where sound is acquired by one of the video cameras, like the editing device 41, the editing device 173 performs nondestructive editing to the image and sound separately.

Next, FIG. 37 shows an example of the configuration of a shooting and editing system according to a third embodiment of the present invention. It should be noted that the same reference numerals are attached to the same components as those in FIGS. 1 and 24, and hence description thereof is omitted to avoid repetition.

In a shooting and editing system 210, the user inputs a speaker ID while the edited result is played back by an editing device 213.

Specifically, like the video camera 171 in FIG. 24, the video camera 211 is a device used for videotape recording of a television material. Like the video camera 171, the video camera 211 shoots the image of a television material, and acquires sound by the microphone 21A. Like the video camera 171, the video camera 211 records the resulting image data with sound into a clip file on an optical disc 212.

The optical disc 212 is mounted in the optical disc drive 41A of the editing device 213. Like the editing device 173, the editing device 213 is a device used for editing or the like of material data recorded on the optical disc 212 mounted in the optical disc drive 41A.

Like the editing device 173, in response to an input of the user, the editing device 213 performs nondestructive editing of material data recorded on the optical disc 212 to create an edit list, and records the edit list into an edit list file on the optical disc 212. Also, in response to an input of the user, the editing device 213 assigns a speaker EM(start) to the edited result, and records electronic mark data describing the speaker EM(start) into an NRT file for edit list on the optical disc 212 as electronic mark data of the edited result.

Further, like the editing device 173, the editing device 213 applies duck voice processing to the sound of a predetermined speaker of the edited result, in response to an input of the user.

While in FIG. 37 the video camera 211 and the editing device 213 are separate devices, the video camera 211 and the editing device 213 may be integrated together.

Also, in FIG. 37, the optical disc 212 is mounted in the optical disc drive 41A of the editing device 213, and reading or recording with respect to the optical disc 212 is performed. However, a configuration is also possible in which the editing device 213 is connected via a network to the video camera 211 in which the optical disc 212 is mounted, and reading or recording with respect to the optical disc 212 is performed via the network.

Figure 38:
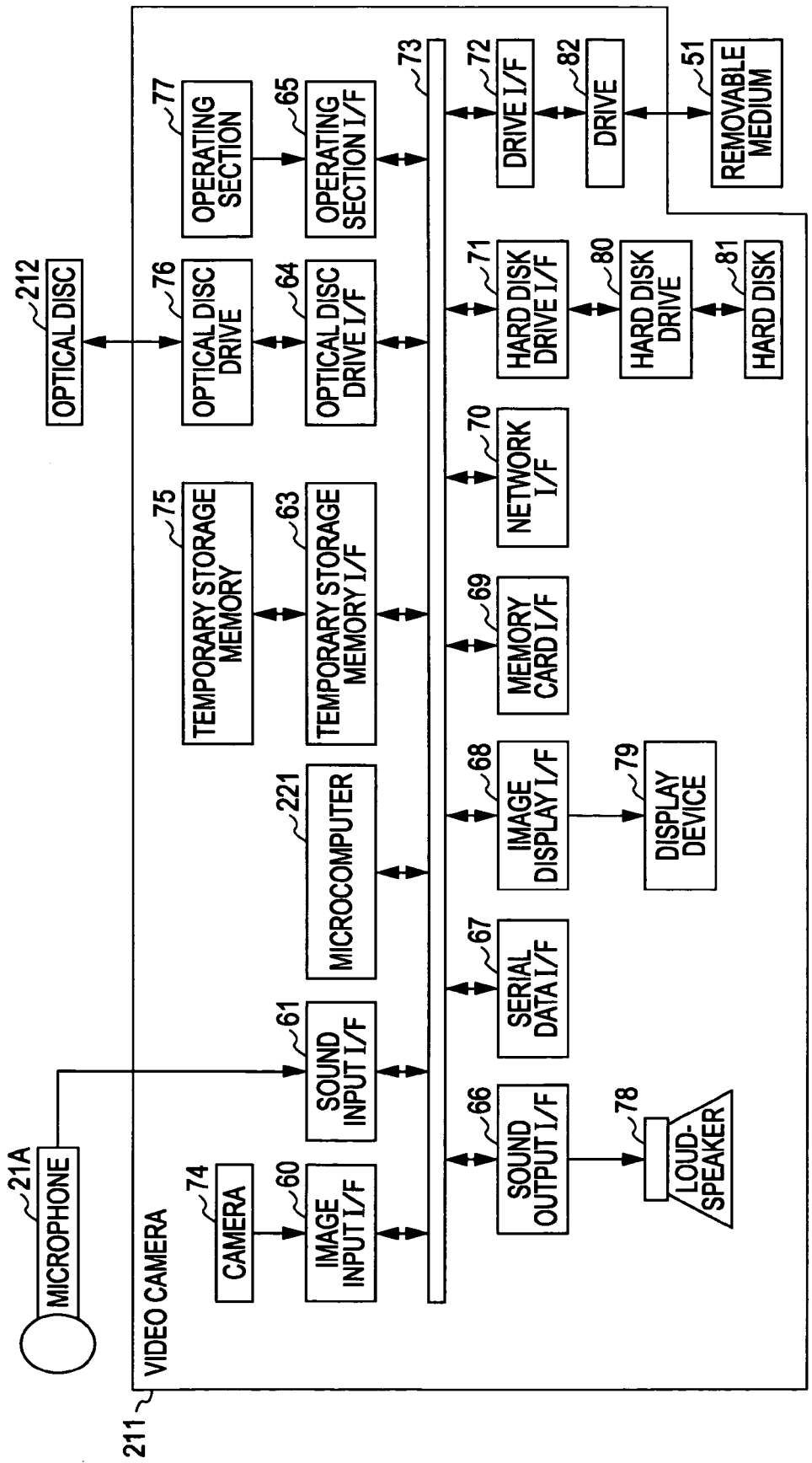
FIG. 38 is a block diagram showing an example of the hardware configuration of a video camera shown in FIG. 37.

FIG. 38 is a block diagram showing an example of the hardware configuration of the video camera 211 in FIG. 37.

In the video camera 211 in FIG. 38, the image input I/F 60, the sound input I/F 61, the temporary storage memory I/F 63, the optical disc drive I/F 64, the operating section I/F 65, the sound output I/F 66, the serial data I/F 67, the image display I/F 68, the memory card I/F 69, the network I/F 70, the hard disk drive I/F 71, the drive I/F 72, and a microcomputer 221 are connected to the system bus 73.

It should be noted that in FIG. 38, the same reference numerals are attached to the same components as those in FIGS. 2 and 25, and hence description thereof is omitted to avoid repetition.

The microcomputer 221 includes a CPU, a ROM, and a RAM. The CPU of the microcomputer 221 controls the respective sections of the video camera 211 in accordance with a program recorded in the ROM or the hard disk 81, in response to an operation signal or the like from the operating section I/F 65.

For example, like the CPU of the microcomputer 181 in FIG. 25, the CPU creates proxy data by using material data including image data supplied from the image input I/F 60, and sound data supplied from the sound input I/F 61, and stores the proxy data into the temporary storage memory 75. Also, like the CPU of the microcomputer 181, the CPU supplies sound data in the material data or proxy data supplied from the temporary storage memory I/F 63 to the sound output I/F 66 via the system bus 73, and causes a sound corresponding to the sound data to be outputted from the loudspeaker 78.

Also, like the CPU of the microcomputer 181, the CPU supplies image data in the material data or proxy data supplied from the temporary storage memory I/F 63 to the image display I/F 68 via the system bus 73, and causes an image corresponding to the image data to be displayed on the display device 79. A program, data, and the like to be executed by the CPU are stored in the RAM as appropriate.

Figure 39:
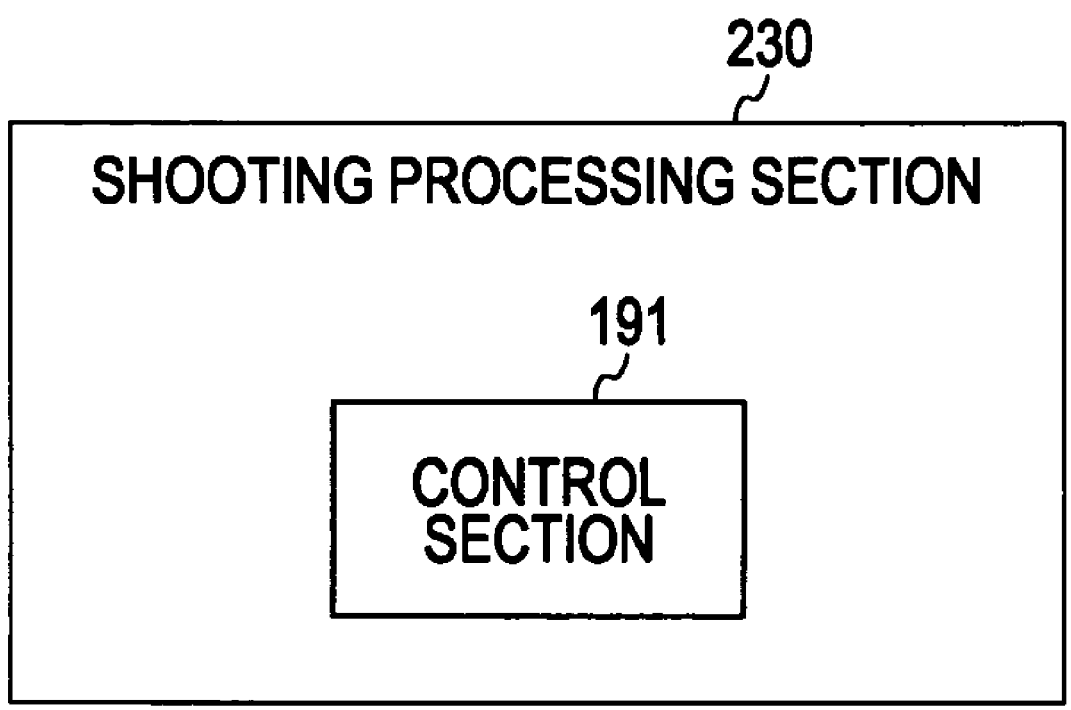
FIG. 39 is a block diagram showing an example of the functional configuration of a shooting processing section in the video camera shown in FIG. 38.

FIG. 39 shows an example of the functional configuration of a shooting processing section in the video camera 211 in FIG. 38. As shown in FIG. 39, a shooting processing section 230 is configured by the control section 191 in FIG. 26, so description thereof is omitted.

Next, referring to FIG. 40, a description will be given of a shooting operation performed using the video camera 211 by the user.

The table of FIG. 40 describes, in association with the number of each step of shooting operation, the contents of shooting operation in that step, the contents of main processing by the video camera 211, and data to which the processing is applied.

Steps S171 and S172 in FIG. 40 are the same as steps S102 and S104 in FIG. 27. That is, in the editing operation in FIG. 40, steps S101 and S103 that are operations related to the assigning of a speaker EM(start) are deleted from the editing operation in FIG. 27.

Figure 41:
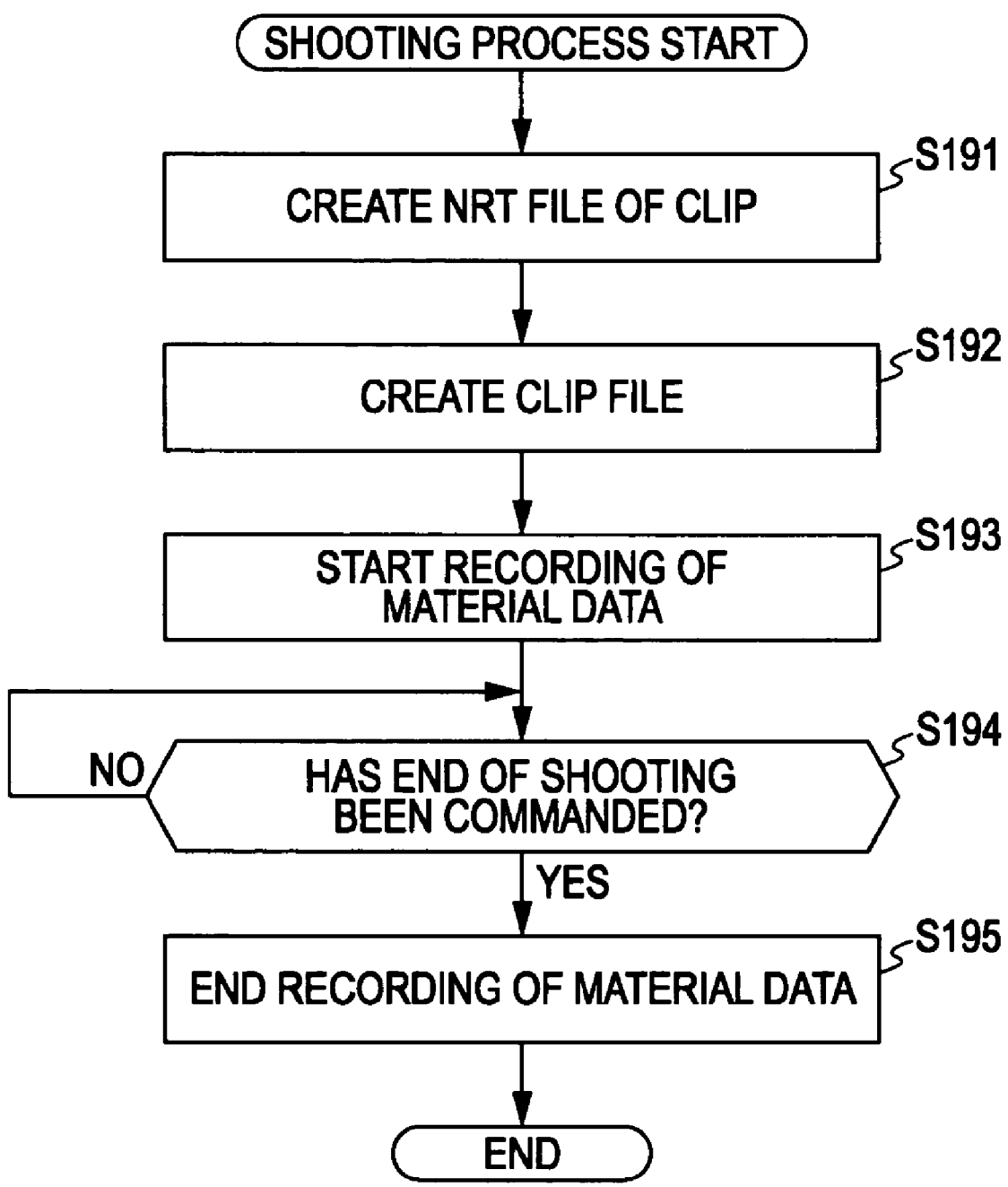
FIG. 41 is a flowchart illustrating a shooting process by the shooting processing section shown in FIG. 39.

Next, referring to the flowchart of FIG. 41, a shooting process by the shooting processing section 230 shown in FIG. 39 will be described. This shooting process is started when, for example, the user commands the start of shooting by operating the operating section 77.

Figure 28:
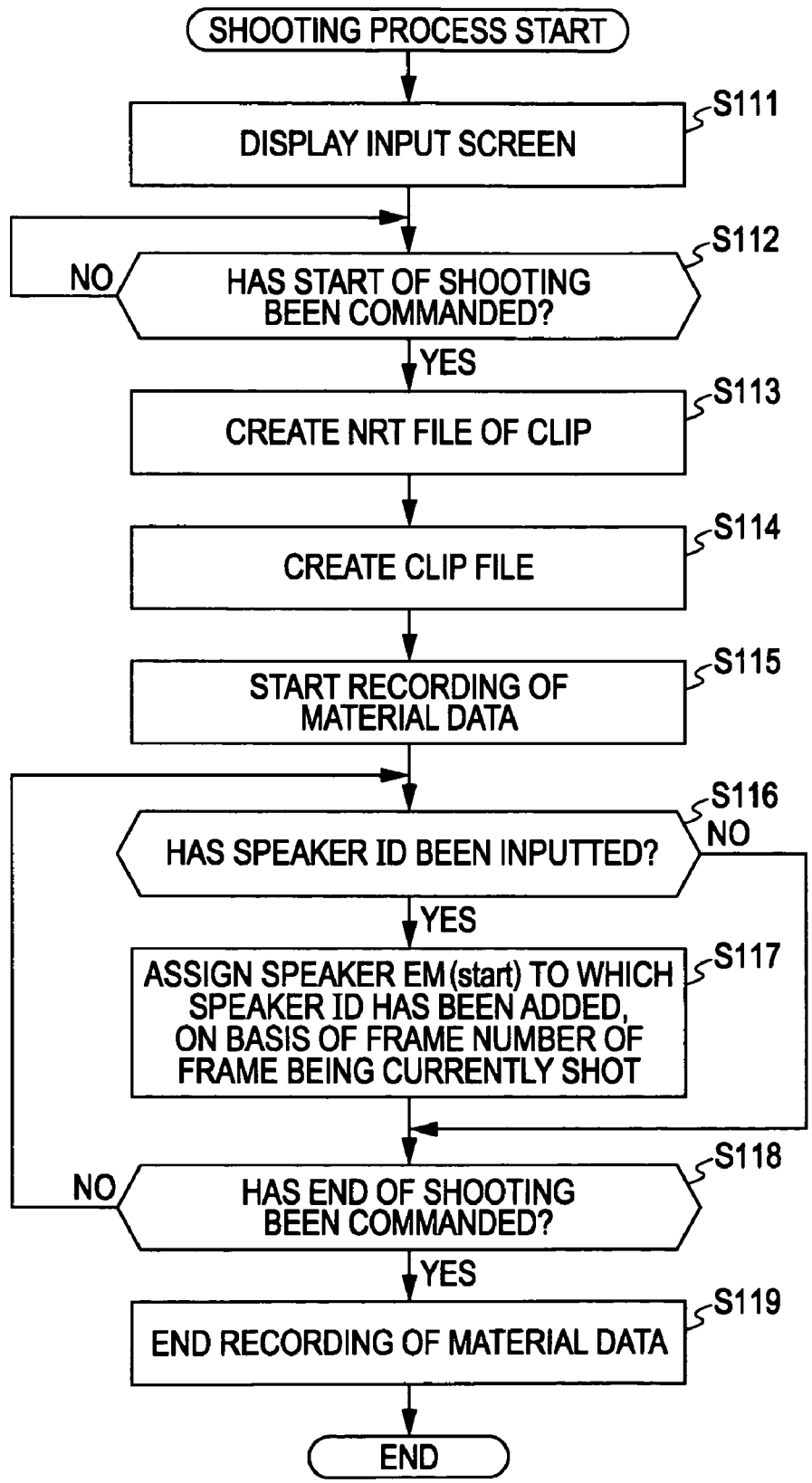
FIG. 28 is a flowchart showing the details of a shooting process by the shooting processing section shown in FIG. 26.

Since the processing of steps S191 to S195 are the same as processing of steps S113 to S115, S118, and S119 in FIG. 28, description thereof is omitted.

Figure 42:
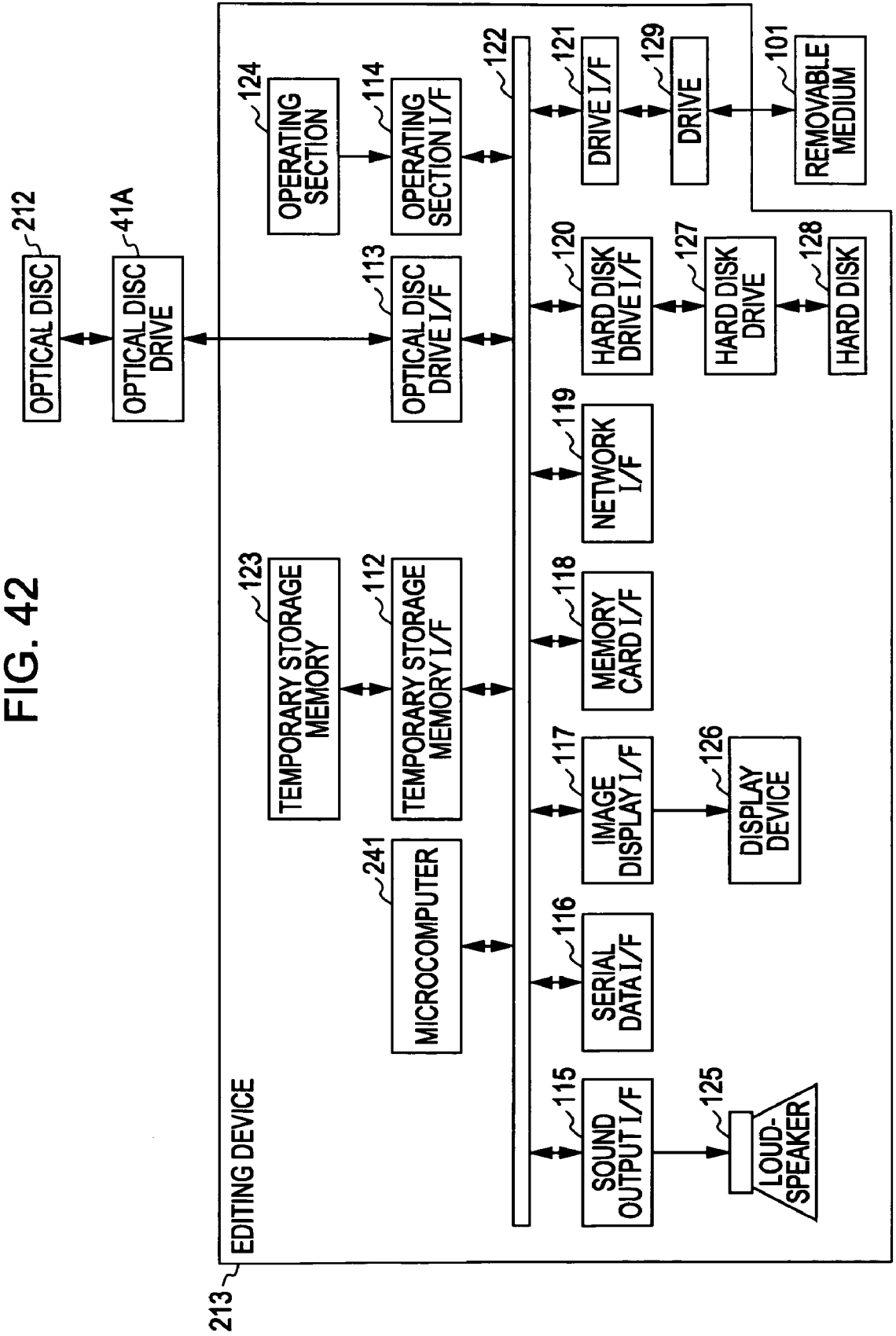
FIG. 42 is a block diagram showing an example of the hardware configuration of an editing device shown in FIG. 37.

FIG. 42 is a block diagram showing an example of the hardware configuration of the editing device 213 shown in FIG. 37.

In the editing device 213 shown in FIG. 42, the temporary storage memory I/F 112, the optical disc drive I/F 113, the operating section I/F 114, the sound input I/F 115, the serial data I/F 116, the image display I/F 117, the memory card I/F 118, the network I/F 119, the hard disk drive I/F 120, the drive I/F 121, and a microcomputer 241 are connected to the system bus 122. It should be noted that in FIG. 42, the same reference numerals are attached to the same components as those in FIGS. 9 and 29, and hence description thereof is omitted to avoid repetition.

The microcomputer 241 includes a CPU, a ROM, and a RAM. The CPU of the microcomputer 241 controls the respective sections of the editing device 213 in accordance with a program recorded in the ROM or the hard disk 128, in response to an operation signal or the like from the operating section I/F 114.

For example, like the CPU of the microcomputer 195 shown in FIG. 29, the CPU supplies a clip read from the optical disc 212 mounted in the optical disc drive 41A and supplied from the optical disc drive I/F 113, to the temporary storage memory I/F 112.

Also, like the CPU of the microcomputer 195, the CPU performs nondestructive editing by creating an edit list in response to an operation signal. Like the CPU of the microcomputer 195, the CPU records the edit list onto the optical disc 212.

Further, the CPU creates electronic mark data of the edited result, in response to an operation signal from the operating section I/F 114. Then, like the CPU of the microcomputer 195, the CPU records the electronic mark data into an NRT file for edit list on the optical disc 212.

Also, like the CPU of the microcomputer 195, on the basis of an operation signal and electronic mark data of the edited result, the CPU changes the edit list in such a way that duck voice processing is applied to the speech of a speaker with a speaker ID specified by the user, of the sound of the edited result.

Further, like the CPU of the microcomputer 195, the CPU supplies the sound data of a clip supplied from the temporary storage memory I/F 112 to the sound output I/F 115 via the system bus 122, and causes the sound of the clip to be outputted from the loudspeaker 125. Also, the CPU supplies the image data of a clip supplied from the temporary storage memory I/F 112 to the image display I/F 117 via the system bus 122, and causes the image of the clip to be displayed on the display device 126. A program, data, and the like to be executed by the CPU are stored in the RAM as appropriate.

Figure 43:
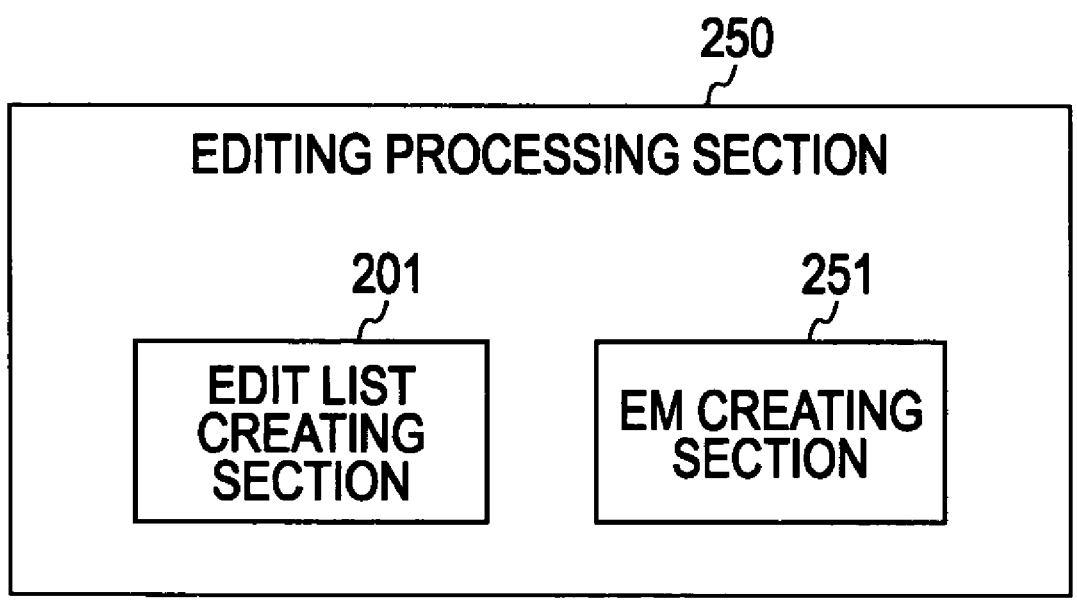
FIG. 43 is a block diagram showing an example of the functional configuration of an editing processing section in the editing device shown in FIG. 42.

FIG. 43 shows an example of the functional configuration of a shooting processing section in the editing device 213 shown in FIG. 42.

A shooting processing section 250 shown in FIG. 43 includes the edit list creating section 201 and an EM creating section 251. It should be noted that in FIG. 43, the same reference numerals are attached to the same components as those in FIG. 30, and hence description thereof is omitted to avoid repetition.

The EM creating section 251 creates electronic mark data of the edited result in response to an operation signal from the operating section I/F 114. Then, like the EM creating section 202 in FIG. 30, the EM creating section 251 records the electronic mark data into an NRT file for edit list on the optical disc 212, and also supplies the electronic mark data to the edit list creating section 201.

Also, like the EM creating section 202, in response to an operation signal supplied from the operating section I/F 114, the EM creating section 251 adds information indicating whether or not duck voice processing is applied, to a speaker EM(start) to which a speaker ID specified by the user has been added and which is described in the electronic mark data of the edited result.

Next, referring to FIG. 44, a description will be given of an editing operation performed by the user using the editing device 213.

The table of FIG. 44 describes, in association with the number of each step of editing operation, the contents of editing operation in that step, the contents of main processing of the editing device 213, and data to which the processing is applied.

As shown in FIG. 44, in step S211, as in step S131 in FIG. 35, the user mounts the optical disc 212 in the optical disc drive 41A of the editing device 213, and commands display of the editing screen by operating the operating section 124. At this time, on the basis of proxy data of a proxy file, the edit list creating section 201 of the editing device 213 causes the editing screen to be displayed on the display device 126, and causes the sound of a clip to be outputted from the loudspeaker 125.

In step S212, the user operates the operating section 124 to perform editing by specifying the In point and the Out point on the editing screen. At this time, the edit list creating section 201 creates an edit list on the basis of the In point and the Out point specified by the user. Then, the edit list creating section 201 records the edit list into an edit list file on the optical disc 212, and supplies the edit list to the EM creating section 251.

In step S213, the user operates the operating section 124 to command display of the input screen (FIG. 12). At this time, the EM creating section 251 causes the input screen to be displayed on the display device 126, on the basis of a speaker list that is registered on the hard disk 128 in advance.

In step S214, the user commands playback of the edited result. At this time, on the basis of the edit list, the EM creating section 251 plays back material data constituting the edited result from a clip file on the optical disc 212. As a result, the sound of the edited result is outputted from the loudspeaker 125, and an image is displayed on the display device 126.

In step S215, the user listens to the sound of the clip, and at the start of speech of each speaker, the user operates the operating section 124 to input a speaker ID of that speaker. At this time, the EM creating section 251 assigns a speaker EM(start) to which the inputted speaker ID has been added, to a frame corresponding to the sound being played back, and describes the speaker EM(start) into the electronic mark data of an NRT file for edit list.

Since the processing of steps S216 and S217 is the same as the processing of steps S133 and S134 in FIG. 35, description thereof is omitted.

Figure 45:
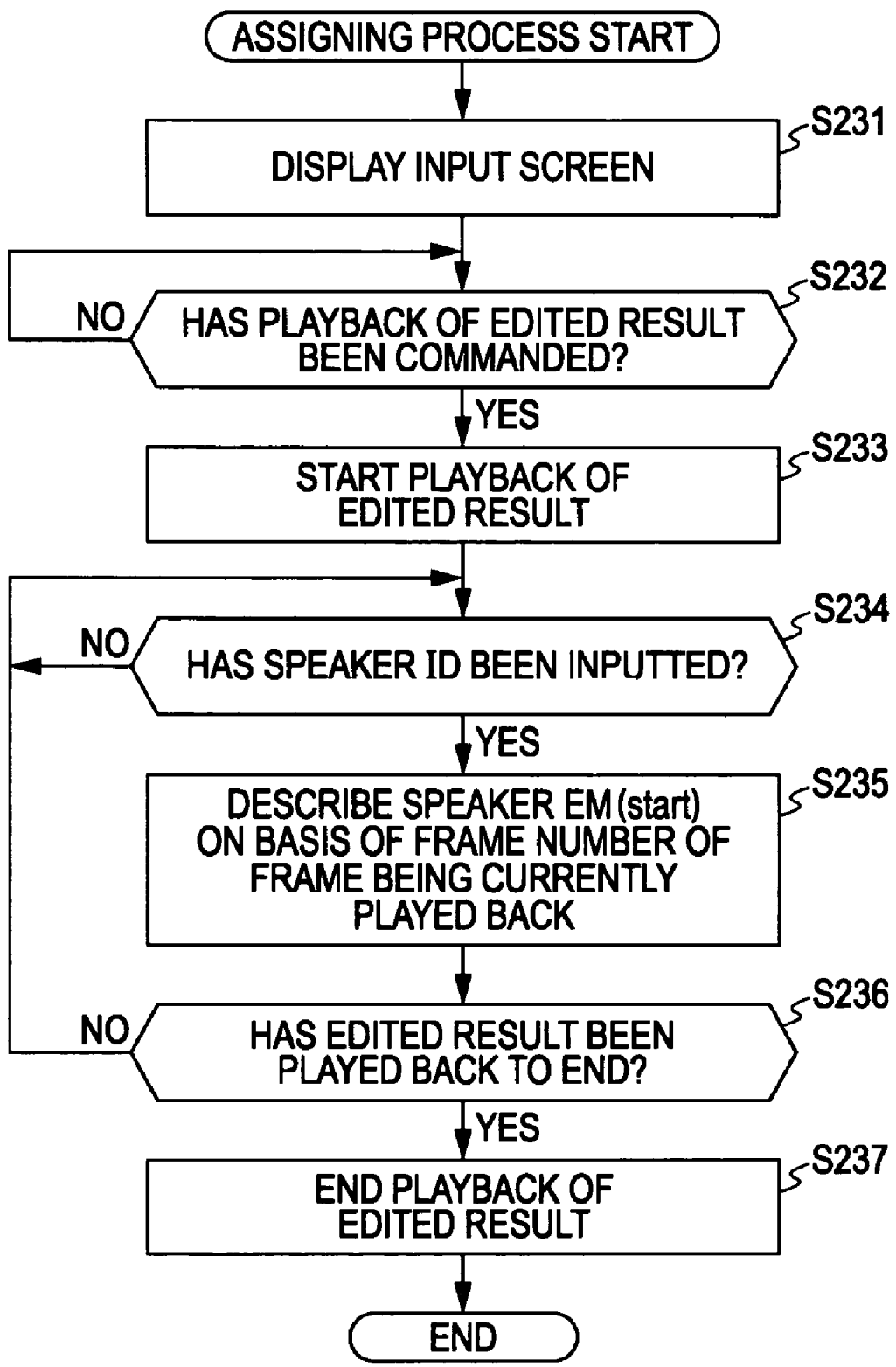
FIG. 45 is a flowchart illustrating an assigning process by an EM assigning section shown in FIG. 43.

Next, referring to the flowchart of FIG. 45, a description will be given of an assigning process by the EM creating section 251 in FIG. 43 in which a speaker EM(start) is assigned to the edited result. This assigning process is started when, for example, the user commands display of the input screen shown in FIG. 12 by operating the operating section 124.

In step S231, the EM creating section 251 causes the input screen to be displayed on the display device 126, on the basis of a speaker list that is registered on the hard disk 128 in advance. In step S232, the EM creating section 251 determines whether or not playback of the edited result has been commanded by the user. If it is determined in step S232 that playback of the edited result has not been commanded, the EM creating section 251 waits until the playback is commanded.

On the other hand, if it is determined in step S232 that the playback of the edited result has been commanded, in step S233, the EM creating section 251 starts the playback of the edited result. In step S234, the EM creating section 251 determines whether or not a speaker ID has been inputted by the user, in accordance with an operation signal supplied from the operating section I/F 114.

If it is determined in step S234 that a speaker ID has not been inputted by the user, the EM creating section 251 waits until a speaker ID is inputted. If it is determined in step S234 that a speaker ID has been inputted by the user, in step S235, on the basis of the frame number of the frame being currently played back, which represents a position corresponding to the input of the speaker ID, the EM creating section 251 assigns a speaker EM(start) with the inputted speaker ID added thereto, to the frame being currently played back, and describes the speaker EM(start) into the electronic mark data of an NRT file of edit list.

In step S236, the EM creating section 251 determines whether or not the edited result being currently played back has been played back to the end. If it is determined that the edited result has not been played back to the end, the processing returns to step S234, and the above-mentioned processing is repeated.

On the other hand, if it is determined in step S236 that the edited result being played back has been played back to the end, in step S237, the EM creating section 251 ends the playback of the edited result. Then, the processing ends.

In this way, the editing device 213 assigns the speaker EM(start) to the edited result in response to an input from the user. Thus, in a case where duck voice processing is applied to the sound of a desired speaker of the edited result, the segment of sound to which duck voice processing is to be applied can be easily recognized on the basis of this speaker EM(start).

Although not shown, the editing process for nondestructive editing of sound and image, which is performed by the editing processing section 250, is the same as the sound editing process in FIG. 23. It should be noted, however, that in the editing process by the editing processing section 250, in steps S83 and S85 in FIG. 23, the frame number of the frame being currently played back is described in the edit list as the position where playback of sound and image is started or ended as a material sub-clip.

Further, in the shooting and editing system 210 in FIG. 37, a television material is shot by the single video camera 211. However, a television material may be shot by a plurality of video cameras.

In this case, like the editing device 41 in FIG. 1, the editing device 213 compiles clips shot by individual video cameras onto a single optical disc. Also, in this case, sound may be acquired by each of a plurality of video cameras, or sound may be acquired by one of the video cameras. In the case where sound is acquired by one of the video cameras, like the editing device 41, the editing device 213 performs nondestructive editing to the image and sound separately.

Further, in the above description, clips are recorded on an optical disc. However, as a matter of course, the recording medium on which clips are recorded is not limited to an optical disc.

Also, in the above description, a speaker list is recorded on the hard disk. However, a speaker list may be recorded on a recording medium such as an optical disc together with clips.

Further, a mosaic may be applied to the image of the speaker of a speech to which duck voice processing has been applied.

Also, a speaker ID(start) is assigned in the shooting and editing system 170 in FIGS. 24 and 36 and the shooting and editing system 210 in FIG. 37. However, both a speaker ID(start) and a speaker ID(end) may be assigned.

Further, in the above description, when the speaker ID of the speaker of a speech to which duck voice processing is applied by the user is inputted, information indicating whether or not duck voice processing is applied is added to a speaker EM(start) and a speaker (end) described in the electronic mark data of the edited result, or to a speaker EM(start), this information may not be added.

It should be noted that in this specification, the steps describing the program recorded on the program recording medium include not only processes that are executed time sequentially in the order as they appear in the description, but also processes that are not executed time sequentially but executed in parallel or independently.

Also, in this specification, the term system refers to the whole of a device made up of a plurality of devices.

Further, embodiments of the present invention are not limited to the above-described embodiments, but various modifications are possible without departing from the scope of the present invention.

What is claimed is:

1. A shooting apparatus which shoots video segment with sound, the apparatus comprising:
   a shooting section that shoots a subject;
   an acquiring section that acquires sound of surroundings of the subject; and
   an assigning section that assigns an electronic mark indicating a start position of speech to a frame of the video segment when a level of the sound corresponding to that frame has become equal to a first threshold or more for a first period of time or more, and thereafter assigns another electronic mark indicating an end position of speech to another frame of the video segment when the level of the sound corresponding to the another frame has become less than a second threshold for a second period of time or more.

2. A shooting method for a shooting apparatus that shoots a video segment with sound, the method comprising:
   shooting a subject;

acquiring sound of surroundings of the subject; and assigning an electronic mark indicating a start position of speech to a frame of the video segment when a level of the sound corresponding to that frame has become equal to a first threshold or more for a first period of time or more, and thereafter assigns another electronic mark indicating an end position of speech to another frame of the video segment when the level of the sound corresponding to the another frame has become less than a second threshold for a second period of time or more.

3. A hardware processor storing a computer program causing the processor to perform a shooting process of shooting a video segment with sound, the shooting process comprising:

shooting a subject;

acquiring sound of surroundings of the subject; and assigning an electronic mark indicating a start position of speech to a frame of the video segment when a level of the sound corresponding to that frame has become equal to a first threshold or more for a first period of time or more, and thereafter assigns another electronic mark indicating an end position of speech to another frame of the video segment when the level of the sound corresponding to the another frame has become less than a second threshold for a second period of time or more.

* * * * *